(12) United States Patent
Hecht et al.

(10) Patent No.: US 9,622,615 B2
(45) Date of Patent: Apr. 18, 2017

(54) TOUCH SCREEN INTERFACE FOR A BEVERAGE DISPENSING MACHINE

(75) Inventors: Thomas R. Hecht, Winters, CA (US); Jun Feng, Davis, CA (US); Boris Brodsky, Vacaville, CA (US); Richard A. Martindale, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 134 days.

(21) Appl. No.: 13/168,875

(22) Filed: Jun. 24, 2011

(65) Prior Publication Data

US 2011/0315711 A1 Dec. 29, 2011

Related U.S. Application Data

(63) Continuation-in-part of application No. 12/611,788, filed on Nov. 3, 2009.

(60) Provisional application No. 61/358,858, filed on Jun. 25, 2010, provisional application No. 61/113,183, filed on Nov. 10, 2008.

(51) Int. Cl.
| | |
|---|---|
| B67D 7/74 | (2010.01) |
| A47J 31/52 | (2006.01) |
| B67D 1/08 | (2006.01) |
| G07F 13/06 | (2006.01) |
| B67D 1/16 | (2006.01) |
| B67D 1/00 | (2006.01) |
| B67D 1/12 | (2006.01) |

(52) U.S. Cl.
CPC .......... *A47J 31/52* (2013.01); *B67D 1/0888* (2013.01); *G07F 13/065* (2013.01); *B67D 1/0036* (2013.01); *B67D 1/0057* (2013.01); *B67D 1/0081* (2013.01); *B67D 1/0872* (2013.01); *B67D 1/0895* (2013.01); *B67D 1/1202* (2013.01); *B67D 1/1204* (2013.01); *B67D 1/1209* (2013.01); *B67D 1/16* (2013.01); *B67D 2210/00031* (2013.01); *B67D 2210/00091* (2013.01)

(58) Field of Classification Search
CPC .................................................. B67D 1/0888
USPC ......... 222/1, 52, 129.1, 129.4; 700/231, 240
See application file for complete search history.

(56) References Cited

U.S. PATENT DOCUMENTS

| | | | |
|---|---|---|---|
| 3,664,550 | A | 5/1972 | Carothers et al. |
| 4,590,975 | A | 5/1986 | Credle |
| 4,619,378 | A | 10/1986 | de Man |

(Continued)

FOREIGN PATENT DOCUMENTS

| | | |
|---|---|---|
| EP | 0 989 091 A1 | 3/2000 |
| EP | 1 955 977 A1 | 8/2008 |

(Continued)

OTHER PUBLICATIONS

International Search Report mailed on Feb. 9, 2012 for PCT Patent Application No. PCT/US2011/042053, 5 pages.

(Continued)

*Primary Examiner* — Patrick M Buechner
(74) *Attorney, Agent, or Firm* — Kilpatrick Townsend & Stockton LLP

(57) ABSTRACT

A beverage dispensing system including a control unit and a touch screen. Inputs are made to the touch screen to dispense beverages and apply system adjustments. The control unit controls a plurality of beverage dispensing valves according to inputs made to the touch screen.

14 Claims, 33 Drawing Sheets

(56) References Cited

U.S. PATENT DOCUMENTS

| | | | |
|---|---|---|---|
| 4,979,639 A | 12/1990 | Hoover et al. | |
| 5,027,284 A * | 6/1991 | Senghaas et al. | 700/240 |
| 5,033,651 A | 7/1991 | Whigham et al. | |
| 5,836,481 A | 11/1998 | Strohmeyer et al. | |
| 6,039,219 A | 3/2000 | Bach et al. | |
| 6,369,721 B1 | 4/2002 | Yang et al. | |
| 6,573,884 B1 | 6/2003 | Kinzie | |
| 6,698,621 B2 | 3/2004 | Landers et al. | |
| 6,892,762 B2 | 5/2005 | Porter et al. | |
| 7,658,006 B2 | 2/2010 | Schroeder | |
| 7,872,201 B1 * | 1/2011 | Whitney | 177/25.13 |
| 8,442,674 B2 * | 5/2013 | Tilton et al. | 700/233 |
| 2003/0098317 A1 | 5/2003 | McGuffey | |
| 2003/0208299 A1 | 11/2003 | Sudolcan et al. | |
| 2004/0118872 A1 | 6/2004 | Romanyszyn et al. | |
| 2005/0115989 A1 | 6/2005 | Ludovissie et al. | |
| 2006/0118581 A1 * | 6/2006 | Clark | 222/333 |
| 2006/0151529 A1 | 7/2006 | Crisp, III | |
| 2007/0029005 A1 | 2/2007 | Huang et al. | |
| 2008/0029541 A1 | 2/2008 | Wallace et al. | |
| 2008/0037232 A1 | 2/2008 | Schroetlin | |
| 2009/0070234 A1 * | 3/2009 | Peters et al. | 705/27 |
| 2009/0287348 A1 | 11/2009 | Fiume | |
| 2010/0282772 A1 | 11/2010 | Ionidis | |
| 2010/0314419 A1 | 12/2010 | Real et al. | |
| 2011/0017776 A1 * | 1/2011 | Metropulos et al. | 222/129.1 |
| 2011/0088568 A1 | 4/2011 | Farrell et al. | |
| 2012/0055954 A1 | 3/2012 | Hecht | |
| 2014/0188271 A1 | 7/2014 | Hernandez et al. | |

FOREIGN PATENT DOCUMENTS

| | | |
|---|---|---|
| GB | 2 442 223 A | 4/2008 |
| JP | 2003-026293 A | 1/2003 |
| JP | 2003-160196 A | 6/2003 |
| KR | 10-0135467 B1 | 5/1998 |
| KR | 10-2001-0029306 A | 4/2001 |
| KR | 20-2009-0004052 U | 4/2009 |
| WO | 92/08671 A1 | 5/1992 |
| WO | 98/46519 A1 | 10/1998 |
| WO | 2004/014781 A2 | 2/2004 |
| WO | 2004/030438 A2 | 4/2004 |
| WO | 2006/058692 A1 | 6/2006 |
| WO | 2008/082394 A1 | 7/2008 |
| WO | 2009/032686 A1 | 3/2009 |
| WO | 2011/011690 A1 | 1/2011 |

OTHER PUBLICATIONS

Written Opinion of the International Searching Authority mailed on Feb. 9, 2012 for PCT Patent Application No. PCT/US2011/042053, 8 pages.

Great Britain Search Report mailed on Mar. 9, 2010 for GB Patent Application No. GB0919683.3, 4 pages.

Great Britain Search Report mailed on May 27, 2010 for GB Patent Application No. GB0919683.3, 3 pages.

International Preliminary Report on Patentability mailed on Jan. 10, 2013, for PCT Patent Application No. PCT/US2011/042053, 10 pages.

International Search Report and Written Opinion of the International Searching Authority mailed on Jan. 30, 2013 for PCT Patent Application No. PCT/US2012/052697, 9 pages.

International Preliminary Report on Patentability mailed on Mar. 13, 2014, for PCT Patent Application No. PCT/US2012/052697, 6 pages.

Extended European Search Report mailed Jun. 3, 2014, from European Application No. 11799055.6 (6 pages).

Office Action mailed Feb. 12, 2015, for U.S. Appl. No. 14/331,122, 11 pages.

International Search Report and Written Opinion mailed Apr. 20, 2015, for International Patent Application No. PCT/US2014/073011, 19 pages.

Final Office Action mailed Sep. 1, 2015, for U.S. Appl. No. 14/331,122, 12 pages.

* cited by examiner

TOUCH SCREEN INTERFACE FOR A BEVERAGE DISPENSING MACHINE

This application claims benefit of U.S. Provisional Application No. 61/358,858, filed Jun. 25, 2010, and is a continuation-in-part of U.S. application Ser. No. 12/611,788, filed Nov. 3, 2009, which claims the benefit of U.S. Provisional Application No. 61/113,183, filed Nov. 10, 2008, the entireties of all being incorporated by reference herein.

BACKGROUND

A number of beverage dispenser designs are well known in the art. These include carbonated beverage dispensers, non-carbonated beverage dispensers, beverage brewing systems, and liquor distribution systems. Many beverage dispenser designs have separate nozzles to pour (dispense) different beverages. Some beverage dispensers are capable of dispensing a variety of beverages out of a single nozzle.

Beverage dispensers sometimes have an interface device (e.g., a keypad) for the selection of options such as cup size or beverage. Such an interface device is usually designed with appropriate beverage options for a particular establishment (e.g., a restaurant) and has a set number of buttons. Prior to installation, the buttons on the interface device are assigned to dispense the particular beverages chosen for that establishment.

However, the adaptability of such known beverage dispensers may be less than ideal. For example, once installed, it may be difficult to change the number of keys on the interface device. Also, it may be difficult to reprogram the keys to dispense different beverages without manually changing the interface device and/or switching beverage syrups at input valves. If a particular beverage is depleted, or no longer desired, it may be necessary to block out the associated input button or obtain a new interface device. To add a new beverage, it may be necessary to obtain a new interface device with a new button for the added beverage.

Embodiments of the invention address this less than ideal adaptability and other problems, individually and collectively.

BRIEF SUMMARY

Reconfigurable control systems for beverage dispensers, beverage dispensers with a reconfigurable control panel, beverage dispensers that sequence the dispensing of beverage fluids that make up a selected beverage, beverage dispensers that allow for the dispensing of user customized beverages, and related methods for dispensing a beverage are provided. Such control systems, beverage dispensers, and related methods may provide increased flexibility for a vender of beverages and the vendor's customers. For example, the vendor can reconfigure the disclosed beverage dispensers for different types and numbers of beverages. The vendor can set up a beverage dispenser to sequence the dispensing of constituent fluids of a selected beverage, for example, to terminate the flow of a beverage additive(s) prior to the termination of the flow of water, which may help to avoid cross-contamination between selected beverages. The disclosed beverage dispensers can be used to dispense a customized beverage having a customer selected combination of beverage fluids. For example, a customized beverage might be a cola with a selected extra flavor shot, such as lemon, cherry, or other desired flavor shot.

Thus, in a first aspect, a control system for a beverage dispenser is provided. The control system includes a control panel having a plurality of sensing regions, and a control unit electrically coupled with the sensing regions. The control unit is configured to receive a control panel configuration selected from a plurality of control panel configurations. Each of the plurality of control panel configurations includes one or more user input buttons corresponding to at least a subset of the sensing regions. The control unit monitors the sensing regions for a user input according to the selected control panel configuration. Each of the sensing regions is associated with an input button of the selected control panel configuration or with a non-active portion of the selected control panel configuration. The control unit controls a plurality of valves so as to dispense one or more beverage fluids in response to the user input according to the selected control panel configuration.

A control system for a beverage dispenser can have additional features. For example, the control system can include a plurality of user reconfigurable switches electrically coupled with the control unit to define the selected control panel configuration. The control unit can include a processor and a computer readable medium that includes instructions that when executed cause the processor to receive a control panel configuration, monitor the sensing regions, and control a plurality of valves.

The control unit can be further configured to control the valves to dispense a user customized beverage that includes a user selected beverage additive and a base selected beverage. The base selected beverage can include at least one beverage additive associated with the base selected beverage and at least one of water or soda. The user selected beverage additive can be dispensed during the dispensing of the at least one of water or soda.

In another aspect, a beverage dispenser is provided. The beverage dispenser includes a plurality of valves, a control panel having a plurality of sensing regions, a control unit electrically coupled with the sensing regions and with the valves, and a nozzle configured to dispense one or more beverage fluids discharged by the valves. Each of the valves is configured to control the discharge of one of a plurality of beverage fluids received from a one of a plurality of corresponding supply lines. The control unit is configured to receive a control panel configuration selected from a plurality of control panel configurations. Each of the plurality of control panel configurations includes one or more user input buttons corresponding to at least a subset of the sensing regions. The control unit monitors the sensing regions for a user input according to the selected control panel configuration. Each of the sensing regions is associated with an input button of the selected control panel configuration or with a non-active portion of the selected control panel configuration. The control unit controls the valves to discharge one or more of the beverage fluids in response to the user input according to the selected control panel configuration. The nozzle is in fluid communication with the plurality of supply lines through the valves.

A beverage dispenser can have additional control features. For example, a beverage dispenser can include reconfigurable switches electrically coupled with the control unit to define the selected control panel configuration. The plurality of control panel configurations can include a control panel configuration providing a user with the ability to select a customized beverage including a user selected combination of the beverage fluids. The control unit can include a processor and a computer readable medium including instructions that when executed cause the processor to receive a control panel configuration, monitor the sensing regions, and/or control the valves. A beverage dispenser can include an adjustable flow control device configured to control a flow rate of a corresponding beverage fluid. A beverage dispenser can include a flow control block that includes a fluid channel for each beverage fluid. Each fluid channel of the flow control block is in fluid communication with one of the valves and is configured to control the flow rate of a corresponding beverage fluid. A beverage dispenser can include a solenoid block including a channel for each beverage. The solenoid block can couple each of the valves with one of the channels of the solenoid block so that each of the valves can be selectively actuated to control the flow of one of the beverage fluids through the one of the channels of the solenoid block.

A beverage dispenser can include a diffuser coupled with the nozzle and with the valves so that the nozzle is in fluid communication with the valves through the diffuser. The diffuser can be proximally located to the nozzle. The diffuser can be configured to receive one or more beverage fluids discharged from the valves. The diffuser can be configured to provide each of the one or more beverage fluids to a separate discharge orifice of the nozzle.

The plurality of beverage fluids can include water and a beverage additive. A dispensed beverage can include water mixed with the beverage additive. The control unit can be further configured to sequence the delivery of the water and the beverage fluid to terminate the flow of the beverage fluid additive prior to terminating the flow of water.

A beverage dispenser can include a heater coupled with the valves and with the nozzle so that the nozzle is in fluid communication with the valves through the heater. The heater can be configured to receive one or more beverage fluids discharged from the valves. The heater can be configured to heat the one or more beverage fluids. The heater can be configured to provide the one or more beverage fluids to the nozzle.

The plurality of selectable control panel configurations can include a control panel configuration providing a user the ability to select a customized beverage. The user customized beverage can include a user selected combination of beverage fluids. The user customized beverage can include a user selected beverage additive and a base selected beverage. The base selected beverage can include at least one beverage additive associated with the base selected beverage and at least one of water or soda. The user selected beverage additive can be dispensed during the at least one of water or soda.

In another aspect, a method for dispensing a selected beverage is provided. The method includes receiving a control panel configuration selected from a plurality of control panel configurations that include one or more input buttons, associating each sensing region of a control panel with an input button of the selected control panel configuration or with a non-active portion of the selected control panel configuration, monitoring the sensing regions of the control panel for a user input according to the selected control panel configuration, receiving the user input from the control panel, determining the selected beverage based on the user input and the selected control panel configuration, and dispensing the selected beverage.

A method for dispensing a selected beverage can include additional steps. For example, the step of receiving a control panel configuration can include determining the control panel configuration from a plurality of user reconfigurable switches configured to define the selected control panel configuration. The method can further include receiving water and at least one beverage additive from a plurality of sources. The method can further include controlling the dispensing of the water and the at least one beverage additive by selectively actuating valves associated with the water and the at least one beverage additive. The method can further include programming into the control panel the volumes of the water and the at least one beverage additive for the selected beverage.

In a method for dispensing a selected beverage, the step of dispensing a beverage can include dispensing a user customized beverage. For example, the user customized beverage can include a user selected beverage additive and a base selected beverage. The base selected beverage can include at least one beverage additive associated with the base selected beverage and at least one of water or soda. The user selected beverage additive can be dispensed during the dispensing of the at least one of water or soda.

In another aspect, a beverage dispenser is provided. The beverage dispenser includes supply lines, valves, a nozzle in fluid communication with the supply lines through the valves, and a control unit coupled with the valves to selectively control the actuation of the valves. Each of the supply lines supply a beverage fluid from one of multiple beverage fluid sources. The nozzle dispenses beverage fluids discharged by the valves. The control unit is configured to dispense a selected beverage that includes a first beverage fluid and a second beverage fluid. The first beverage fluid is discharged from a first valve of the valves during a first time period. The second beverage fluid is discharged from a second valve of the valves during a second time period. The first time period is different from the second time period.

A beverage dispenser can further include a reconfigurable control panel that includes sensing regions. The control unit can be further configured to receive a control panel configuration selected from multiple control panel configurations. Each of the multiple control panel configurations can include one or more user input buttons. The control unit can be further configured to monitor the sensing regions for a user input according to the selected control panel configuration. Each of the sensing regions can be associated with an input button of the selected control panel configuration or with an non-active portion of the selected control panel configuration. The control unit can be further configured to control the valves so as to dispense one or more beverage fluids in response to the user input according to the selected control panel configuration.

In another aspect, a control system for a beverage dispenser is provided. The control system may include a touch screen. A control unit may be electrically coupled to the touch screen. The control unit may be electrically coupled to a plurality of beverage dispensing valves.

In one aspect, the control unit may be configured to send a first graphical configuration to the touch screen for display. A first command may be received from the touch screen. A second graphical configuration may be sent to the touch screen for display in response to the first command. A second command may be received from the touch screen with respect to the second graphical configuration. A plurality of beverage dispensing valves may be controlled in response to the second command.

In one aspect, the first graphical configuration is a sleep mode screen.

In another aspect, the first command may be derived from receiving a single user touch on the touch screen.

In another aspect, the second graphical configuration may include a plurality of selectable beverage choices.

In another aspect, the second command may be derived from receiving a user selection of one of the selectable beverage choices.

In another aspect, the user selection may include a continuous user touch on the touch screen determined to last for a predetermined time period.

In another aspect, controlling the plurality of valves may include dispensing one or more beverage fluids in response to the continuous user touch.

In another aspect, a third graphical configuration may be sent to the touch screen for display in response to the second command.

In another aspect, the third graphical configuration may include a plurality of selectable flavor additions.

In another aspect, the third graphical configuration may include a plurality of selectable beverage sizes.

In another aspect, the second command may be derived from receiving a plurality of selections from hidden buttons on the second graphical configuration.

In another aspect, a calibration screen may be displayed on the touch screen in response to the second command. A third command may be received from the touch screen with respect to the calibration interface.

In another aspect, controlling the plurality of valves may include dispensing one or more beverage fluids in response to the third command from the touch screen.

In one aspect, the control unit may be configured to display a graphical configuration on the touch screen for dispensing beverages via the plurality of valves. The graphical configuration may have at least one displayed button to dispense a beverage and at least one hidden button. A first user input may be received from the at least one hidden button. All user input may be ignored from the at least one displayed button for a predetermined amount of time based on the first user input.

In another aspect, user inputs from the at least one displayed button are accepted after the predetermined amount of time expires.

In another aspect, the first user input includes a plurality of inputs made to the hidden button.

In another aspect, the graphical configuration includes a plurality of hidden buttons, and the first user input includes a pattern of inputs made to the plurality of hidden buttons.

In one aspect, the control unit is configured to display a graphical configuration on the touch screen for sanitizing the plurality of fluid lines. An input may be received from the touch screen to sanitize at least one fluid line. The plurality of valves may be controlled to provide sanitizing fluid to the at least one fluid line for a predetermined time interval.

In another aspect, the plurality of valves are controlled to flush the sanitizing fluid through the at least one fluid line.

In another aspect, the plurality of valves are controlled to statically hold the sanitizing fluid within the at least one fluid line.

In another aspect, the control unit is further configured to purge the at least one fluid line of the sanitizing fluid after the predetermined time interval.

In another aspect, the control unit is further configured to display a count down of the beginning to the end of the time interval.

In another aspect, user inputs made to the touch screen are ignored by the control system during the time interval.

In one aspect, the control system is configured to display a graphical configuration on the touch screen for controlling the ratio of the water line to the carbonated water line. An input may be received from the touch screen to adjust the ratio. A beverage may be dispensed based on a user selection made to the touch screen. The dispensed beverage being a combination of respective fluids from the flavored fluid line, water line, and carbonated water line according to the adjusted ratio.

In another aspect, the graphical configuration of the touch screen comprises a numerical indicator of a ratio value.

In another aspect, the graphical configuration of the touch screen further comprises user selectable buttons to change the ratio value of the numerical indicator.

In another aspect, the buttons may be directional arrows.

In another aspect, the graphical configuration of the touch screen includes controls for adjusting beverage dispensing time.

In another aspect, the graphical configuration of the touch screen includes controls for calibrating beverage dispensing values.

In one aspect, the control system is configured to receive a continuous user input from the touch screen to dispense fluid for a period of time. The plurality of valves are controlled to dispense fluid according to the period of time of the continuous user input. A beverage dispensing time is then set for the at least one beverage size according to the period of time of the continuous user input.

In another aspect, the graphical configuration includes buttons for a plurality of beverage sizes, each button corresponding to setting a respective beverage dispensing time.

In another aspect, the graphical configuration includes a visual indicator that is animated during the continuous user input.

In another aspect, the visual indicator may be a linear scale.

In another aspect, the visual indicator may be a numerical indicator.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION

Figure 1:
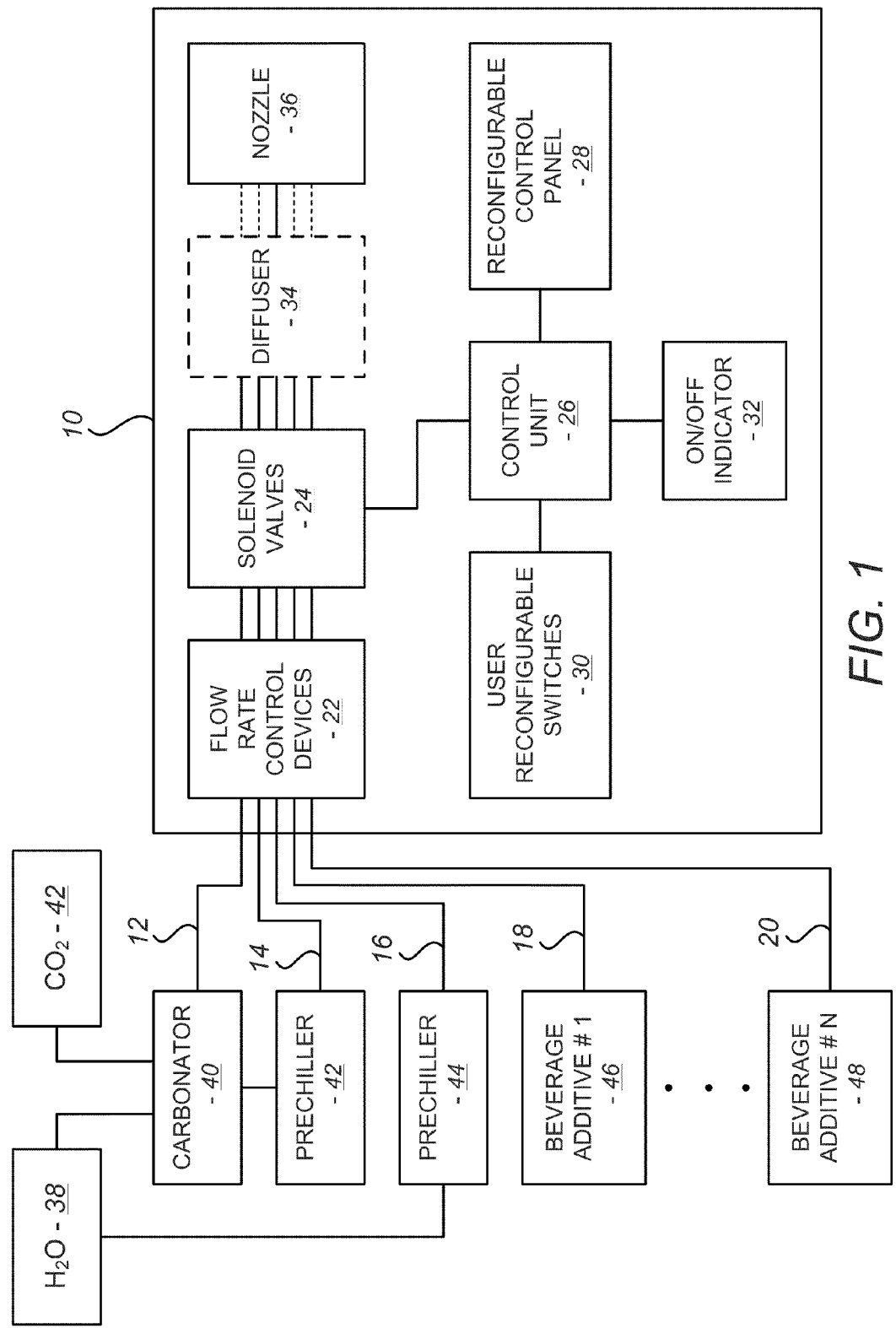
FIG. 1 diagrammatically illustrates a reconfigurable beverage dispenser, in accordance with many embodiments.

The embodiments described herein provide reconfigurable control systems for beverage dispensers, beverage dispensers with a reconfigurable control panel, beverage dispensers that sequence the dispensing of beverage fluids that make up a selected beverage, beverage dispensers that allow for the dispensing of user customized beverages, and related methods for dispensing a beverage fluid. In many embodiments, the number of buttons on a control panel can be easily changed, which makes it more easy to change the beverages dispensed (e.g., number, type, size) by a beverage dispenser. In many embodiments, to reconfigure the control panel buttons, user reconfigurable switches are set to select a control panel configuration. Each sensing region of a control panel is associated with an input button of the selected control panel configuration or with a non-active portion of the selected control panel configuration. A selected control panel configuration can combine sensing regions to react as a single button to form large buttons, which may be used to reduce the number of buttons on the control panel. A selected control panel configuration can also form smaller buttons by assigning fewer sensing regions to the buttons. A cover plate corresponding to the selected control panel configuration can be placed over the sensing regions. The cover plate can include graphics indicating the locations of the buttons and the beverages associated with the buttons. In this way, the number of buttons of a control panel and the beverages available can be increased or decreased without having to obtain a new control panel.

Further, embodiments of a reconfigurable beverage dispenser have additional dispensing modes. For example, a button on the control panel can be pressed and held to deliver a flavor shot. As another example, one or more buttons on the control panel can be activated to dispense a beverage and a flavor shot.

In addition, some embodiments of a beverage dispenser include a diffuser located immediately upstream of a dispensing nozzle. In some embodiments, the diffuser delivers each of the beverage fluids dispensed to separate output orifices of a discharge nozzle for the beverage dispenser. Discharging each of the beverage fluids from separate output orifices may decrease contamination of a beverage from previously dispensed beverages. In some embodiments, the diffuser includes a provision for a solenoid valve for carbonated water and/or a provision for a solenoid valve for non-carbonated water. Placing a solenoid valve on the diffuser reduces the distance between the solenoid valve and the nozzle. Reducing the distance from a solenoid valve for carbonated water to the nozzle may decrease the loss of carbonation in a carbonated beverage.

Embodiments may provide one or more of advantages to sellers (e.g., retailers) of beverage dispensers, users of beverage dispensers, establishments that sell beverages, and other entities. For example, an advantage to beverage selling establishments may be a more adaptable beverage dispenser that includes a control panel that can be conveniently reconfigured after installation. This allows the control panel to be reconfigured to accommodate variations not intended or realized at the time of installation. The control panel can also be reconfigured to reflect the types of beverages currently available or otherwise change the number of beverages available. For example, if a beverage X is not available, the option of selecting beverage X can be removed from the control panel. If a new beverage Y becomes available, the option of selecting beverage Y can be added to the control panel.

Advantages to beverage dispenser sellers may include a more marketable product, increased revenue from sales, and/or reduced inventory. For example, a reconfigurable beverage dispenser may provide a more convenient and/or adaptable way of marketing beverage products. A reconfigurable beverage dispenser may have a wider market since the beverage dispenser can be reconfigured to a wide variety of establishments (e.g., restaurant or bar). A wider market for the beverage dispensers may result in increased sales revenues. A seller of such beverage dispensers may be able to stock fewer versions instead of stocking different versions for each type of establishment and thus, reduce their inventory.

Certain embodiments described herein may provide one or more of the above advantages. One or more other advantages may be readily apparent to one skilled in the art from the disclosure.

Reconfigurable Beverage Dispensers

FIG. 1 diagrammatically illustrates a reconfigurable beverage dispenser 10, in accordance with many embodiments. The beverage dispenser 10 receives a plurality of beverage fluids from a corresponding plurality of supply lines 12, 14, 16, 18, 20. The beverage dispenser 10 includes flow rate control devices 22, solenoid valves 24, a control unit 26, a reconfigurable control panel 28, user reconfigurable switches 30, an on/off indicator 32, and a nozzle 36. The beverage dispenser can also include a diffuser 34, or other suitable beverage fluid distribution component for distributing beverage fluid(s) discharged from the solenoid valves 24 to the nozzle 36.

The supply lines 12, 14, 16, 18, 20 are in fluid communication with associated beverage fluid sources. The supply line 12 is in fluid communication with a water source 38 through a carbonator 40. The carbonator 40 is connected to a source of carbon dioxide ($CO_2$) 42 to carbonate the water supplied by the water source 38. The carbonated water can be directly supplied to the beverage dispenser 10 via the supply line 12, or it can be cooled by a prechiller 42 connected to the carbonator 40. Prechilled carbonated water is supplied to the beverage dispenser 10 via the supply line 14. The supply line 16 is in fluid communication with the water source 38 through a prechiller 44 and supplies chilled non-carbonated water to the beverage dispenser 10. The prechiller 44 can be omitted in some embodiments so that the supply line 16 provides water from the water source 38 directly to the beverage dispenser 10. The beverage dispenser 10 can also have a heater (not shown). For example, a heater can be located a suitable location (e.g., upstream of the flow control devices 22, downstream of the solenoid valves 24) to heat one or more of the beverage fluids dispensed by the beverage dispenser 10.

The flow rate control devices 22 can include a flow rate control device coupled with each of one or more of the supply lines 12, 14, 16, 18, 20. Each flow rate control device can be used to control the rate of flow of a beverage fluid communicated by one of the supply lines. Each of the flow rate control devices can be an adjustable device (e.g., an adjustable valve) configurable to provide a desired flow rate for the beverage fluid. Example flow rate control devices 22 will be described in greater detail below with reference to FIG. 10.

The solenoid valves 24 include a solenoid valve for each of the beverage fluid supply lines. Each of the solenoid valves 24 can be individually controlled to control the discharge of an associated beverage fluid. For example, one solenoid valve can be opened to discharge a quantity of carbonated water, and another solenoid valve can be opened to discharge an appropriate quantity of beverage additive. The discharged quantities of carbonated water and beverage additive can be mixed in the diffuser 34 and dispensed from the nozzle 36 as a mixed beverage. The discharged quantities can also be separately dispensed from separate discharge ports in the nozzle. Such separate dispensing may help to reduce cross contamination between beverage fluids.

The solenoid valves 24 are controlled by the control unit 26. The control unit 26 is electrically coupled to the reconfigurable control panel 28. The control unit 26 receives user input from the reconfigurable control panel 28 and controls the solenoid valves to discharge quantities of one or more beverage fluids so as to dispense a selected beverage from the nozzle 36. The control unit 26 is also electrically coupled to the on/off indicator 32 and controls the on/off indicator 32 to indicate the on/off status of the beverage dispenser 10.

The control unit 26 is electrically coupled with the user reconfigurable switches 30. The user reconfigurable switches 30 can be configured to define a selected control panel configuration. As will be described in greater detail below with reference to FIGS. 2A through 4B, a selected control panel configuration is used by the control unit 26 to reconfigure and monitor the reconfigurable control panel 28 in accordance with the selected control panel configuration.

The beverage dispenser 10 is capable of receiving water from the water source 38, carbonated water from the carbonator 40, and/or one or more beverage additives from beverage additive sources 46, 48. A beverage additive can include flavorings or syrups such as, for example, tea flavorings, coffee flavorings, vitamin shots, sweetener shots, soft drink syrups, etc. One or more beverage additives can be transferred from the beverage additive sources 46, 48 to the beverage dispenser 10 by the supply lines 18, 20 (e.g., input tubing), as described in greater detail below with reference to FIG. 8. The one or more beverage sources 46, 48 can include bag-in-box systems, as will be understood by those of ordinary skill in the art.

Water supplied to the beverage dispenser 10 can be supplied from any water source through input tubing, as described in greater detail below with reference to FIG. 8. The water and/or the carbonated water can be circulated through the prechillers 42, 44 before being supplied to the beverage dispenser 10. The prechillers 42, 44 can be any suitable device for lowering the temperature of the water and/or the carbonated water supplied to the beverage dispenser 10. The prechillers 42, 44 can be incorporated into the beverage dispenser 10. The prechillers 42, 44 can be separate devices or integrated into a single device.

The beverage dispenser 10 can be configured to receive non-carbonated water and/or carbonated water. In order to receive carbonated water, the water supplied to the beverage dispenser 10 can have carbon dioxide ($CO_2$) added to it by the carbonator 40. The carbonator 40 can be any suitable device that is capable of dissolving carbon dioxide in water or any other liquid or aqueous solution. Carbonated water can be supplied directly to the beverage dispenser 10 by the carbonator 40 or, alternatively, the carbonated water can be circulated through the prechiller 42 before it is supplied to the beverage dispenser 10. The water can additionally or alternatively be circulated through the prechiller 42 before it is supplied to the carbonator 40. The carbonator 40 can be incorporated into the beverage dispenser 10 or, alternatively, the carbonator 40 can be a separate device. For purposes of illustration, both carbonated water and non-carbonated water are illustrated in FIG. 1 as being supplied to the beverage dispenser 10. However, supplying both carbonated and non-carbonated water is not required.

The beverage dispenser 10 can be capable of dispensing one or more beverage fluids used to make a beverage. As used herein, a "beverage fluid" refers to any fluid constituent of a beverage, for example, a beverage additive, water, carbonated water, various types of alcohol, or any other beverage fluid constituent. The beverage dispenser 10 can also be capable of dispensing a blended beverage by mixing one or more beverage additives with non-carbonated water and/or carbonated water. The beverage dispenser 10 can also be capable of dispensing a beverage that does not necessarily require mixing. For example, the beverage dispenser 10 can be capable of dispensing wine or beer. In addition, the beverage dispenser 10 can be capable of dispensing non-carbonated water or carbonated water.

Additionally, the beverage dispenser 10 can be capable of dispensing carbonated beverages by adding carbon dioxide to a blended beverage or by mixing carbonated water with a beverage additive. The beverage dispenser 10 can be implemented to dispense many different types of flavorings or beverage additives, flavored beverages, and blended beverages. For instance, different tea flavorings can be provided to the beverage dispenser 10 to create a variety of blended tea beverages. The beverage dispenser 10 can be used to dispense various flavorings and beverages, including but not limited to water, tea, coffee, juices, energy drinks, vitamin-fortified beverages, high fructose corn syrup beverages, or diet beverages.

Example Control Panel for Reconfigurable Beverage Dispenser

Figure 2A:
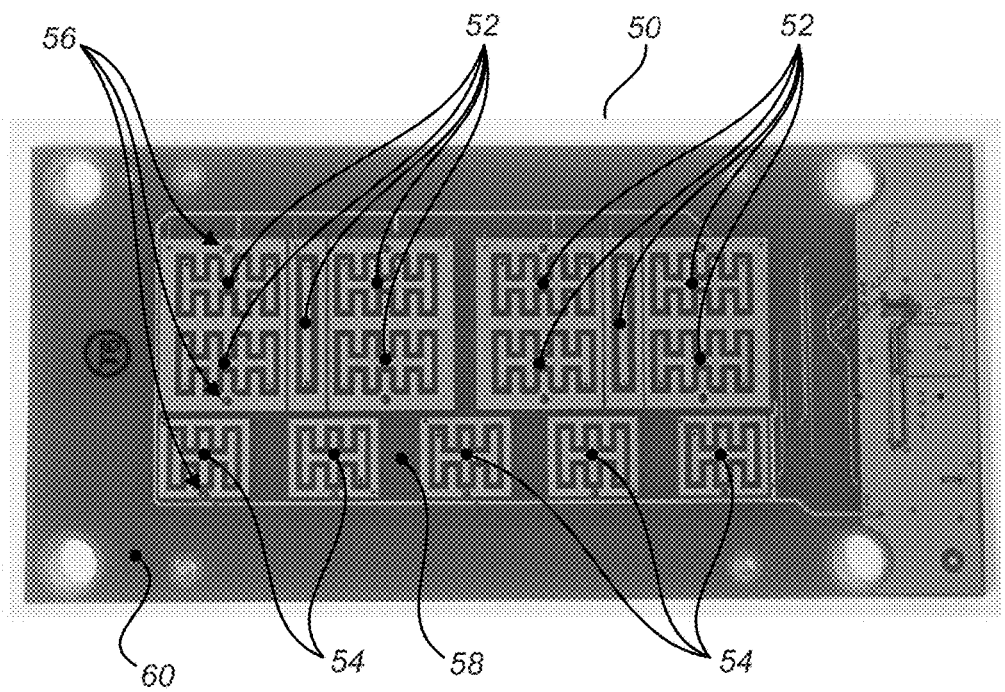
FIG. 2A shows a reconfigurable control panel component that includes sensing regions, in accordance with many embodiments.

FIG. 2A shows an example reconfigurable control panel component 50 for the reconfigurable control panel 28. The reconfigurable control panel component 50 includes grouped sensing regions 52, isolated sensing regions 54, and visual indicators 56 that can be associated with corresponding sensing regions 52, 54. In many embodiments, the grouped sensing regions 52 are reconfigurable sensing regions and the isolated sensing regions 54 are non-reconfigurable sensing regions. The user reconfigurable switches 30 (described in greater detail below with reference to FIGS. 6A through 7C) can be used to configure the sensing regions 52, 54 so as to reconfigure the reconfigurable control panel 28. Although the reconfigurable control panel component 50 includes ten grouped sensing regions 52 and five isolated sensing regions 54, any suitable number and combination of grouped sensing regions 52 and isolated sensing regions 54 can be used.

The user reconfigurable switches 30 can be used to correlate one or more of the grouped sensing regions 52 to buttons of a selected control panel configuration for the reconfigurable control panel 28. The user reconfigurable switches 30 can also be used to activate and deactivate sensing regions, for example, one or more of the grouped sensing regions 52 and/or one or more of the isolated sensing regions 54.

The grouped sensing regions 52 and the isolated sensing regions 54 can be of any suitable size or shape. In the illustrated embodiment, isolated sensing regions 54 are of similar size and a square shape. The grouped sensing regions 52 are rectangular but have different sizes. The outer sensing regions of the grouped sensing regions 52 have a larger area and the inner regions of the grouped sensing regions 52 have a smaller area.

The sensing regions 52, 54 are formed in an array on a front sensing surface 58 of the reconfigurable control panel component 50. In many embodiments, each sensing region 52, 54 is connected to a voltage drive source (not shown) and to a charge detector (not shown) in accordance with capacitance resistance technology. When an object such as, for example, a user's finger comes into close proximity with a sensing region, the electric field generated by the sensing region is disturbed and the charge detector indicates a sensing region or button activation. The front sensing surface 58 of the reconfigurable control panel component 50 does not need to physically contact an object used to activate a sensing region. This may assist in minimizing any wear on the sensing regions and may further increase the overall reliability and lifetime of the beverage dispenser 10.

In many embodiments, the reconfigurable control panel component 50 includes a front surface 60, which prevents objects from directly contacting the front sensing surface 58. The front surface 60 can be situated in front of the front sensing surface 58 to protect the front sensing surface 58. Additionally, the reconfigurable control panel component 50 can be configured with a gap between the front surface 60 and the front sensing surface 58. An object can contact the front surface 60 and disturb the electric field generated by an individual sensing region, thereby causing a button activation to be recognized by the control unit 26. The front surface 60 can be composed of a clear acrylic sheet that can be surrounded by a black ABS bezel along its outside edge or, alternatively, it can be constructed from any material through which an electric field may pass, such as plastic or glass. A seal may encircle the outer edge of the front surface 60 along a line of contact between the front surface 60 and the front sensing surface 58. The seal may help to prevent dirt and moisture from damaging the reconfigurable control panel component 50.

Rather than making use of capacitive switching technology, many other types of buttons or switches can be used. These switches include, but are not limited to, electric contact switches, debounced contact switches, and any mechanical switch, toggle, or button that can be activated by a user.

The visual indicators 56 can be light emitting diodes (LEDs) that indicate when a sensing region 52, 54 has been selected. While the visual indicators 56 are not required, a variety of visual indicators can be used, for example, an LED display or a liquid crystal display (LCD). In some embodiments, the visual indicators 56 communicate different messages via different visual signals. For example, the visual indicators 56 can flash in a constant or patterned fashion, provide a constant signal, use different colors, provide a patterned display, or provide other suitable visual indications. A constant flashing light can indicate that a beverage is sold out, for example. As another example, a red light can indicate that a beverage additive associated with the beverage selected has been depleted.

The reconfigurable beverage dispenser 10 can be reconfigured in various ways. Some examples of suitable ways of reconfiguring the beverage dispenser 10 include enabling or disabling a "sold out" mode of the beverage dispenser 10, using subsets of the grouped sensing regions 52 to form buttons of a selected control panel configuration, calibrating the timed dispense of the solenoid valves 24, and resetting the system defaults.

The user reconfigurable switches 30 can be used to reconfigure the reconfigurable control panel 28. For example, the grouped sensing regions 52 can be grouped to form buttons, and a "sold out" mode can be enabled/disabled using the user reconfigurable switches 30.

Figure 2B:
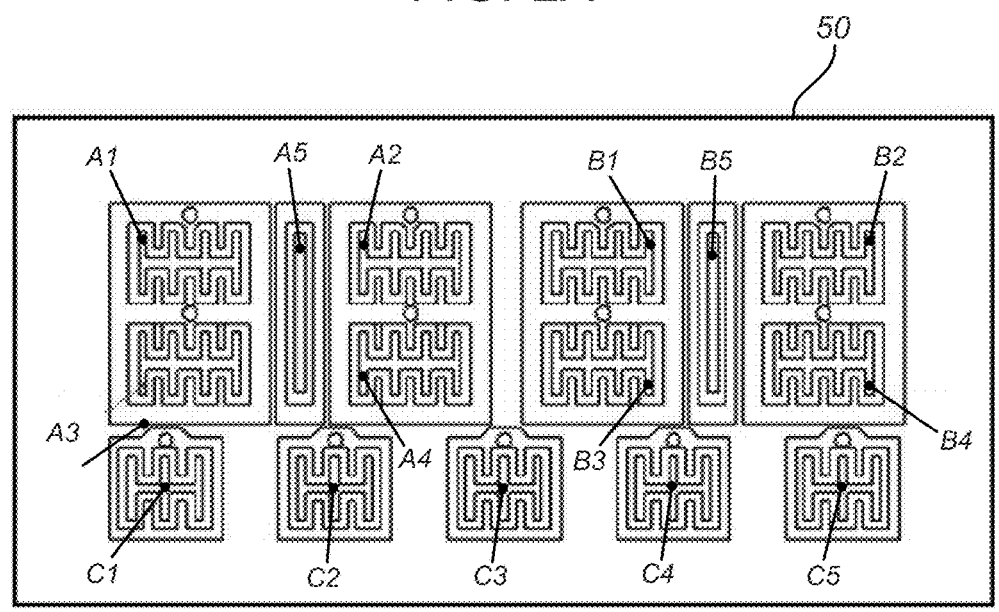
FIG. 2B illustrates and labels the sensing regions of the reconfigurable control panel component of FIG. 2A.

FIG. 2B illustrates and labels the sensing regions 52, 54 of the reconfigurable control panel component 50 of FIG. 2A. The reconfigurable control panel component 50 includes the ten grouped sensing, regions 52 and the five isolated sensing regions 54. In many embodiments, each of the ten grouped sensing regions 52 are grouped into one or more groups or deactivated via the user reconfigurable switches 30. The ten grouped sensing regions 52 cover two areas: Area "A" and Area "B." Each area has five sensing regions 52. The sensing regions 52 within Area "A" are labeled: A1, A2, A3, A4, and A5. The sensing regions 52 within Area "B" are labeled: B1, B2, B3, B4, and B5. The reconfigurable control panel component 50 includes five isolated sensing regions 54. The isolated sensing regions 54 are labeled as: C1, C2, C3, C4, and C5.

Figure 3:
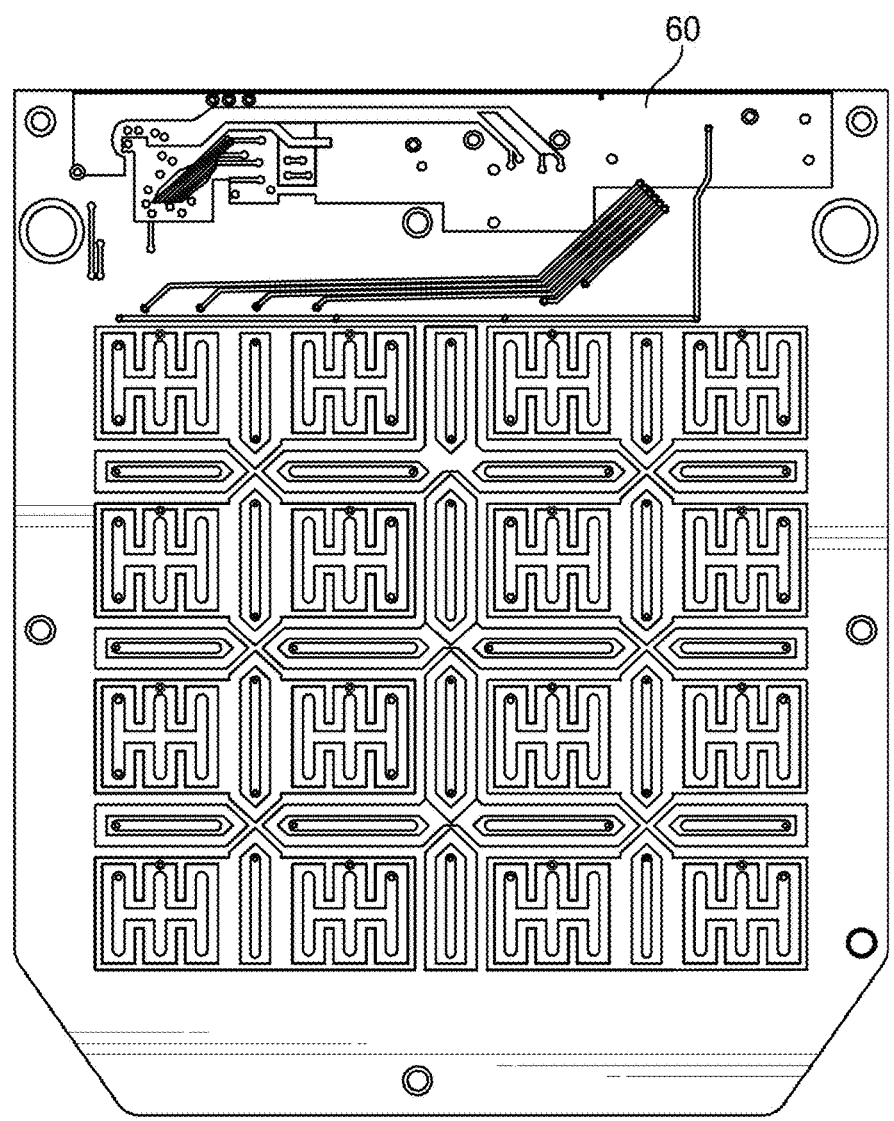
FIG. 3 shows a reconfigurable control panel component that can be used in an input device having from one to sixteen input buttons, in accordance with many embodiments.

FIG. 3 shows a reconfigurable control panel component 60, in accordance with many embodiments. The reconfigurable control panel component 60 is similar to the reconfigurable control panel component 50 described above, but can be used in an input device having from one to sixteen input buttons.

Example Control Panel Cover Plates for Reconfigurable Beverage Dispenser

Figure 4A:
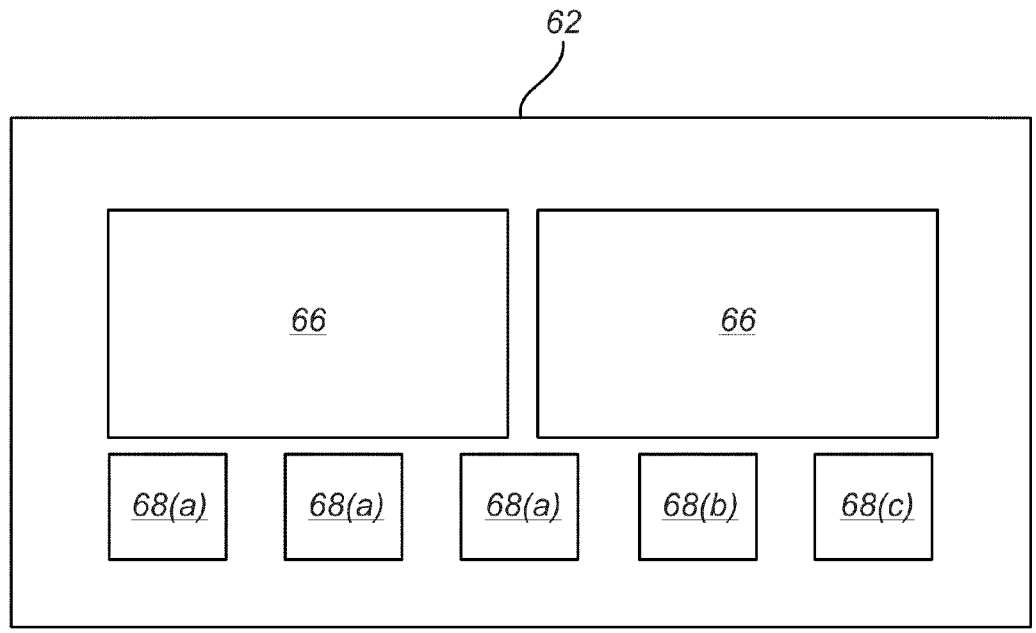
FIG. 4A diagrammatically illustrates a control panel cover plate for a control panel configuration compatible with the reconfigurable control panel component of FIG. 2A, in accordance with many embodiments.
Figure 4B:
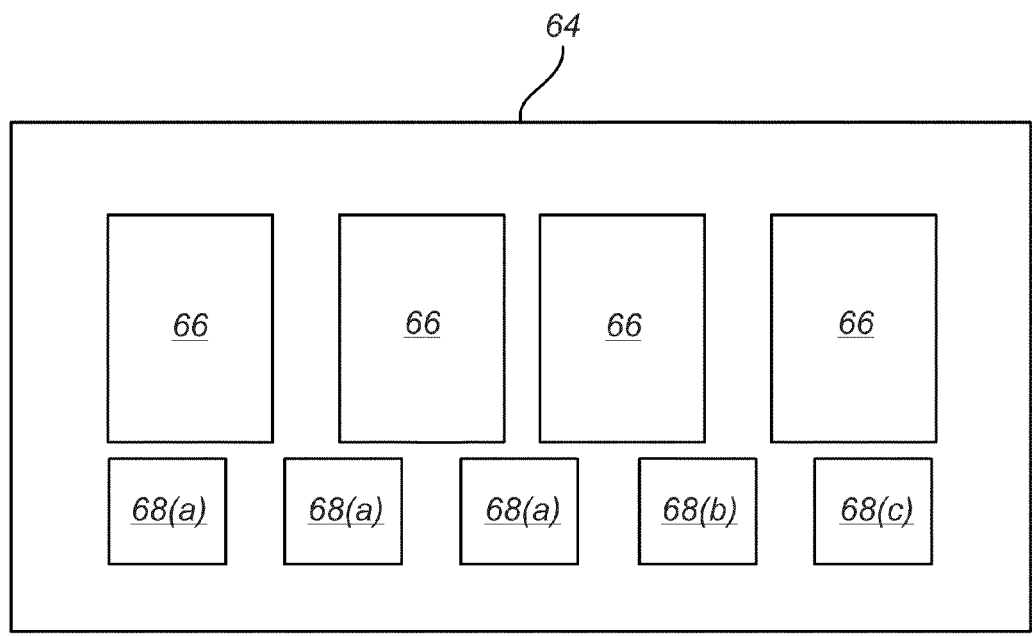
FIG. 4B diagrammatically illustrates another control panel cover plate for a control panel configuration compatible with the reconfigurable control panel component of FIG. 2A, in accordance with many embodiments.

FIGS. 4A and 4B show front views of example cover plates 62, 64, respectively, for the reconfigurable control panel 28 of the beverage dispenser 10, in accordance with many embodiments. Each of the example cover plates 62, 64 includes delineated button areas 66, 68 corresponding to a selectable control panel configuration for the beverage dispenser 10. The delineated button areas 66, 68 match the corresponding sensing region groupings for a selectable control panel configuration, and are associated with dispensing and beverage options. The cover plate can also display visual indicators (e.g., labels) that indicate the dispensing and beverage options associated with the delineated button areas 66, 68. Some examples of dispensing and beverage options include cup sizes, type of beverage, pour, cancel, flavor shot, or other suitable option. Dispensing and beverage options can be indicated by abbreviations. For example, Small can be abbreviated as "S," Medium can be abbreviated as "M," and Large can be abbreviated as "L." In many embodiments, the cover plate is removable and interchangeable, for example a removable and interchangeable card. The cover plate can also include gaps or transparent areas that correspond to or are associated with the visual indicators 56 of the reconfigurable control panel component 50.

The cover plate can be located in a gap between the front surface 60 and the front sensing surface 58 of the reconfigurable control panel component 50. In such a configuration, the cover plate may not make contact with an object used to activate a sensing region 52, 54 of the reconfigurable control panel component 50. Alternatively, the cover plate can be positioned in front of the reconfigurable control panel component 50. An example mounting of the cover plate with be described in greater detail below with reference to FIG. 9.

The cover plate 62, 64 can be of any suitable material and have any suitable thickness. Some examples of suitable materials include mylar polycarbonate film, paper, cardboard, polycarbonate materials, plastic, glass, and acrylic. In many embodiments, the cover plate includes mylar polycarbonate film. Mylar may provide superior strength, heat resistance, and insulating properties. In addition, mylar may resist sticking to either the front surface 60 or the front sensing surface 58 and, as a result, may be easily removable. In one exemplary embodiment, the cover plate is constructed from a mylar polycarbonate film of approximately 0.010 millimeters thick. If the cover plate is situated between the front surface 60 and the front sensing surface 58 of the reconfigurable control panel component 50, the thickness of the cover plate can be thin enough to allow the cover plate to fit in the gap between the front surface 60 and the front sensing surface 58 and allow the electric field generated by the sensing regions 52, 54 to pass through it.

The cover plate 62, 64 can have any suitable number or combination of delineated button areas 66, 68 corresponding to the grouped sensing regions 52 and delineated button areas corresponding to the isolated sensing regions 54. In many embodiments, a delineated button area 66 refers to a button associated with one or more of the grouped sensing regions 52, and a delineated button area 68 refers to a button associated with one or more of the isolated sensing regions 54. In FIG. 4A, the cover plate 62 includes two delineated button areas 66 and five delineated button areas 68(a), 68(b), 68(c). The cover plate 64 in FIG. 4B includes four delineated button areas 66 and five delineated button areas 68(a), 68(b), 68(c). In many embodiments, the delineated button areas 68(a) are used to select a cup size: Small (S); Medium (M); or Large (L). In many embodiments, the delineated button area 68(b) is used as a pour button that, when pushed, causes the beverage dispenser 10 to dispense a beverage in a normal dispense mode. In some embodiments, holding down a delineated button area 66 for a predefined period of time can cause beverage dispenser 10 to dispense in other dispense modes. For example, holding down a delineated button area 66 can be used to dispense a flavor shot. In many embodiments, the delineated button area 68(c) is used as a cancel button that can be used to cancel the dispensing or cancel the beverage selection.

The cover plate can include additional, fewer, or different delineated button areas. For example, the cover plate can include a water button that may be used to dispense water containing no beverage additive(s) 46, 48 from the beverage dispenser 10. In another example, a delineated button area can be used as a top-off button (shown in FIG. 8) that, when pressed during the normal dispense mode of the beverage dispenser 10, causes the beverage dispenser to dispense either water or a blended beverage if either was the last substance dispensed by the beverage dispenser. However, in many embodiments, the beverage dispenser will not dispense a flavor shot when the top-off button is pressed if a flavor shot was the last substance dispensed by the beverage dispenser. When programming the control unit 26, the top off button can also be used as an enter button, confirming selections and saving options chosen during programming and, for purposes of this disclosure, the top off button is also referred to as the enter button.

The delineated button areas 66, 68(a), 68(b), 68(c), and the corresponding sensing areas 52, 54, can be of any suitable shape or size. In FIG. 4A, the delineated button areas 66 are large and rectangular, and the delineated button areas 68(a), 68(b), 68(c) are small and square. In FIG. 4B, the delineated button areas 66 are medium sized and rectangular, and the delineated button areas 68(a), 68(b), 68(c) are small and square.

Control System for Reconfigurable Beverage Dispenser

Figure 5:
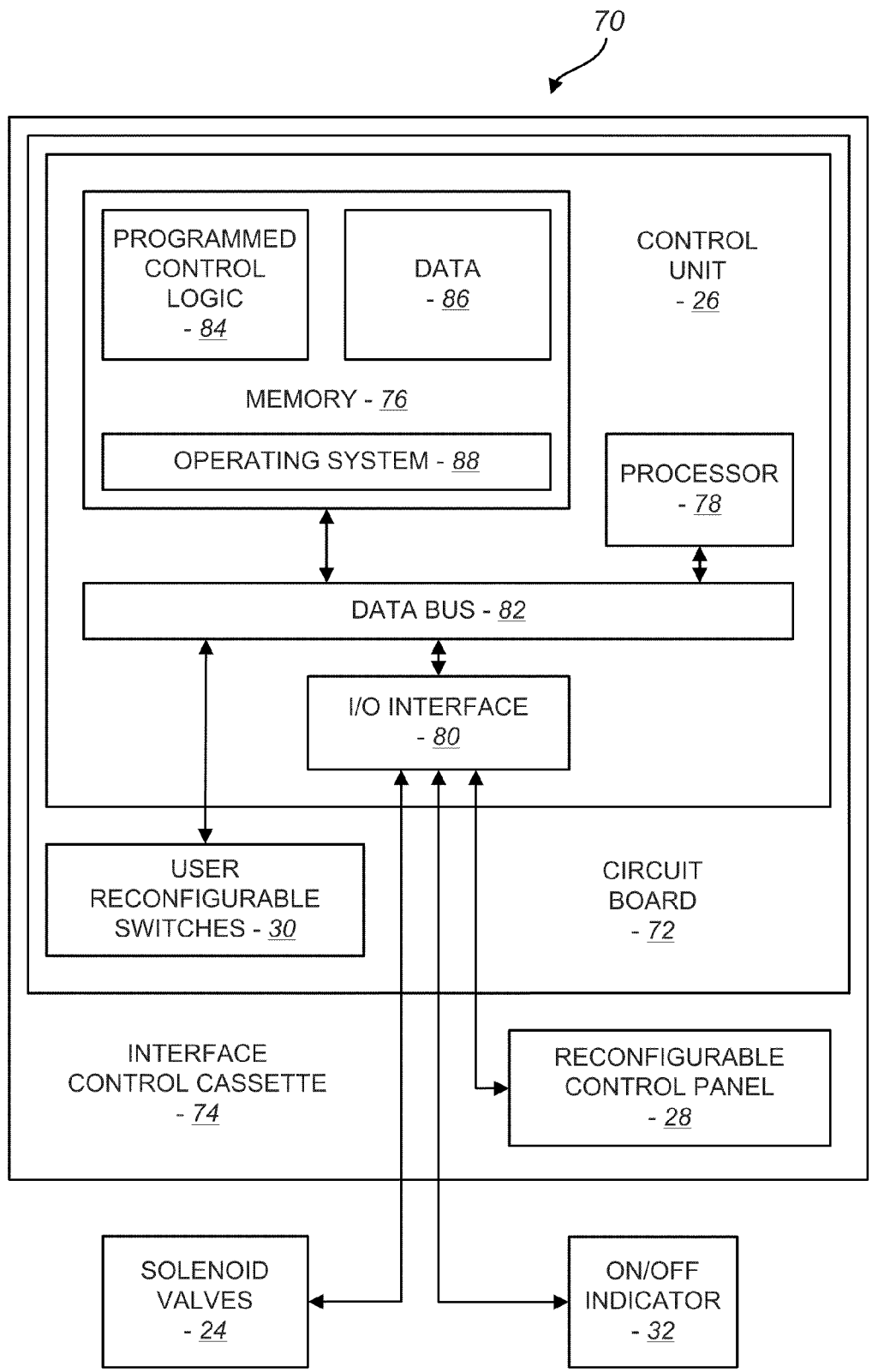
FIG. 5 diagrammatically illustrates a control system for the beverage dispenser of FIG. 1, in accordance with many embodiments.
Figure 6A:
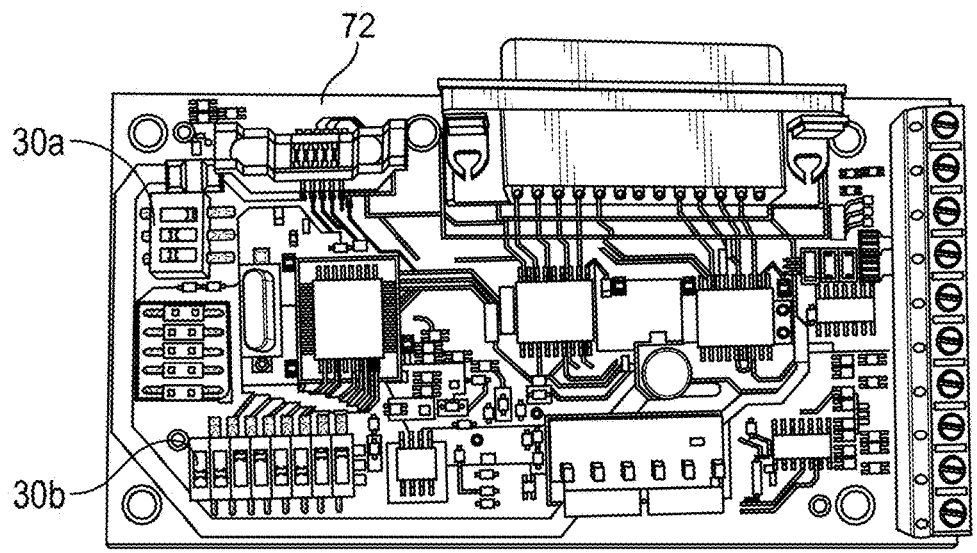
FIG. 6A shows a circuit board that includes a control unit and user reconfigurable switches, in accordance with many embodiments.
Figure 6B:
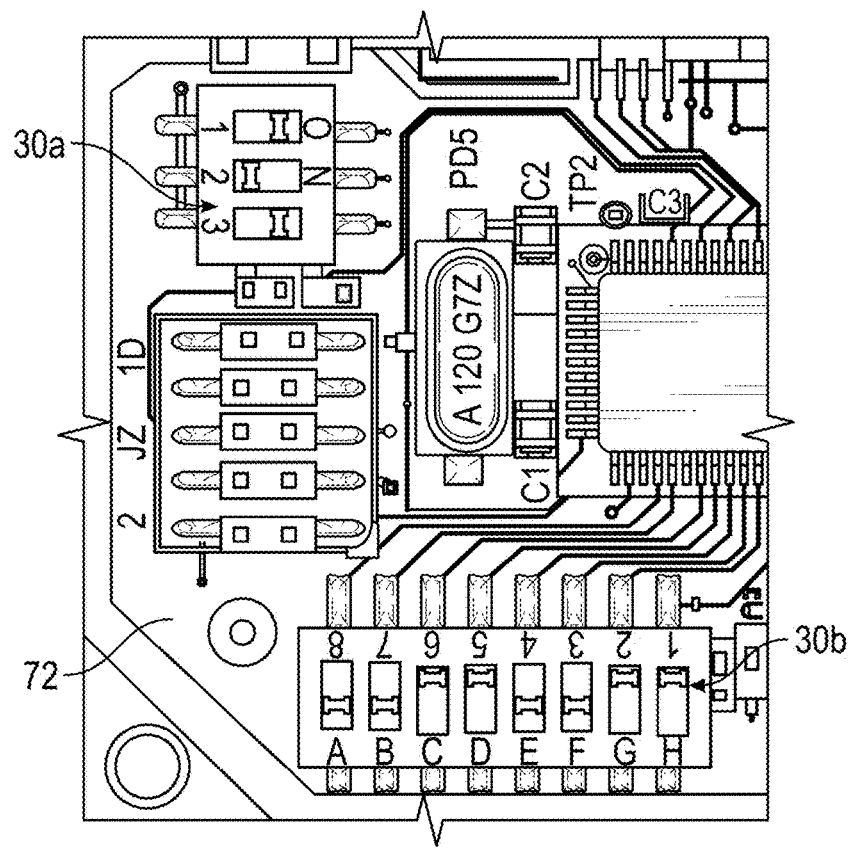
FIG. 6B shows a portion of the circuit board of FIG. 6A, showing a three-switch bank of user reconfigurable switches and an eight-switch bank of user reconfigurable switches.

FIG. 5 diagrammatically illustrates a control system 70 for the beverage dispenser 10 of FIG. 1. The control system 70 includes the solenoid valves 24, the control unit 26, the reconfigurable control panel 28, the user reconfigurable switches 30, and the on/off indicator 32. The components of the control system 70 can be conveniently grouped. For example, as shown in FIGS. 6A and 6B, a circuit board 72 can include the control unit 26 and the user reconfigurable switches 30. As will be described in greater detail below with reference to FIG. 9, the circuit board 26 can be coupled with the reconfigurable control panel 28 to form an interface control cassette 74. Although the circuit board 72 is shown separately from and in communication with the user reconfigurable control panel 28, the circuit board 72 can be integrated with the user reconfigurable control panel 28.

The circuit board 72 includes a memory 76, the user reconfigurable switches 30, a processor 78, and an I/O interface 80 coupled to a data bus 82. The memory 76 or other suitable computer readable media can store programmed control logic 84 (e.g., software code) for performing the functions of the control unit 26. For example, the computer readable medium can comprise programmed control logic 84 or software code for receiving and processing information such as a user selected control panel configuration and other user input, code for actuating the solenoid valves 24 based on various dispensing options for a selected control panel configuration, and any other suitable code associated with the operations of the beverage dispenser 10. The memory 76 can also store data 86 and an operating system 88 used in the operation of the beverage dispenser 10. For example, the memory 76 can store a user selected control panel configuration for reconfiguring the buttons on the reconfigurable control panel 28. The processor 78 can use the operating system 88 to execute the programmed control logic 84, and in doing so, can also use any stored data 86. The data bus 82 provides communication between the memory 76, the processor 78, and the user reconfigurable switches 30. The circuit board 72 can also be in communication with other components of the beverage dispenser 10 and/or other external devices, such as the prechillers 42, 44, the carbonator 40, and/or buttonboards or other user interface devices, via the I/O interface 80. The circuit board 72 also communicates with the reconfigurable control panel 28, the solenoid valves 24, and the on/off indicator 32 of the beverage dispenser 10 via the I/O Interface 80. The control unit 26 and the programmed control logic 84 can comprise software, hardware, firmware or any combination thereof.

The reconfigurable control panel 28 receives user input associated with the operation of the beverage dispenser 10. The user input can then be communicated to the control unit 26.

FIGS. 6A and 6B are photographic illustrations of an example circuit board 72, in accordance with many embodiments. The circuit board 72 includes the control unit 26 (shown in FIG. 5) and the user reconfigurable switches 30. The user reconfigurable switches 30 include a first switch bank 30(a) and a second switch bank 30(b). In the illustrated example circuit board 72, the first switch bank 30(a) and the second switch bank 30(b) are DIP ("dual in-line package") switches. Although DIP switches are illustrated, any suitable number or type of switches can be used for the user reconfigurable switches 30. The first switch bank 30(a) includes three individual switches labeled "1," "2," and "3." The second switch bank 30(b) includes eight individual switches labeled "1," "2," "3," "4," "5," "6," "7," and "8." Each of the individual switches can be placed in an "ON" (up) or "OFF" (down) position. The eight switches on the second switch bank 30(b) correspond to eight of the ten grouped sensing regions 52, labeled A1, A2, A3, A4, B1, B2, B3, and B4 (shown in FIG. 2B).

Examples of Reconfiguring a Reconfigurable Beverage Dispenser

A reconfigurable beverage dispenser can be reconfigured in various ways. Some examples of suitable ways of reconfiguring a reconfigurable beverage dispenser include enabling or disabling a "sold out" mode of the beverage dispenser, programming the control panel sensing regions to form control panel buttons using the user reconfigurable switches, calibrating the timed dispense of the solenoid valves using the buttons on the reconfigurable control panel, and resetting the system defaults. These examples are described below in further detail.

A user can use the user reconfigurable switches to reconfigure the control panel. In one exemplary embodiment, a user can reconfigure the control panel sensing regions to form buttons and/or enable or disable the "sold out" mode using the user reconfigurable switches.

Figure 7A:
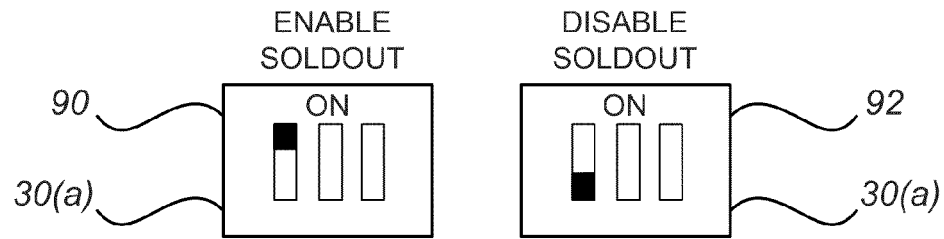
FIG. 7A illustrates positions of a user reconfigurable switch used to enable/disable a beverage sold-out configuration, in accordance with many embodiments.
Figure 7B:
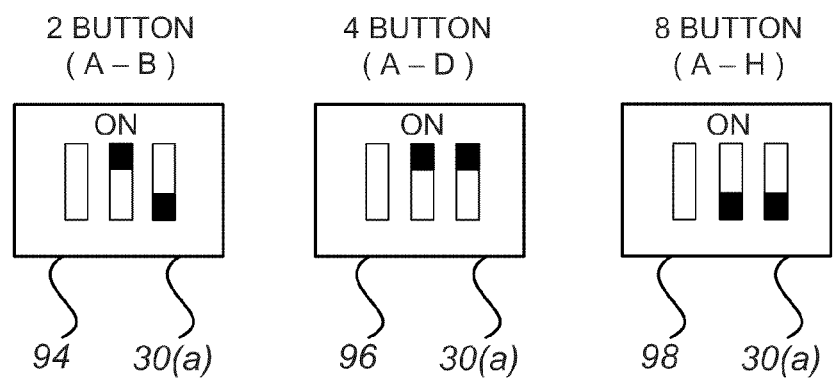
FIG. 7B illustrates user reconfigurable switch positions to select a two button control panel configuration, a four button control panel configuration, and an eight button control panel configuration, in accordance with many embodiments.
Figure 7C:
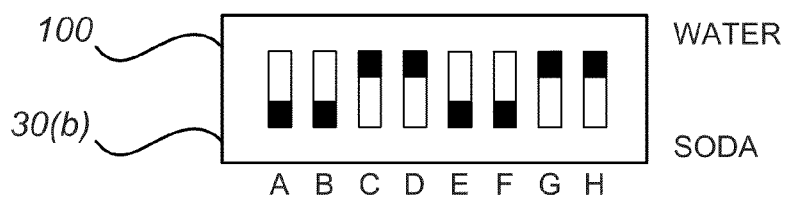
FIG. 7C illustrates user reconfigurable switch positions to select whether water or soda is used as a base fluid for specific beverages, in accordance with many embodiments.

FIGS. 7A, 7B, and 7C illustrate example switch settings for the first switch bank 30(a) and the second switch bank 30(b) of the user reconfigurable switches 30 on the circuit board 72. As will be described in greater detail below, the user reconfigurable switches 30 can be used to enable/disable a "sold out" configuration, select a control panel configuration for the reconfigurable control panel 28, and select a base fluid for beverage selections (e.g., non-carbonated water or carbonated water).

FIG. 7A illustrates settings 90, 92 for switch "1" of the first switch bank 30(a). In many embodiments, switch "1" of the first switch bank 30(a) is used to enable/disable a "sold out" configuration for the beverage dispenser 10. A "sold out" configuration can be associated with a supply of beverage additive being depleted. In setting 90, switch "1" of the first switch bank 30(a) is in the "ON" (up) position, and the reconfigurable control panel 28 is enabled in a "sold out" configuration. In setting 92, switch "1" of the first switch bank 30(a) is in the "OFF" (down) position, and the "sold out" configuration is disabled. In some embodiments, the user can move switch "1" of the first switch bank 30(a) from setting 90 to setting 92, and from setting 92 to setting 90. In some embodiments, a sensing switch (e.g., a vacuum switch) is attached to the input supply of a beverage additive, for example, an input supply in a bag-in-box system. When the beverage additive is empty (L e. "sold out"), a vacuum is generated by the pump conveying the beverage or beverage additive. This vacuum opens the sensing switch, which can be coupled to switch "1" of the first switch bank 30(a) so as to place switch "1" in the "sold out" configuration.

FIG. 7B illustrates settings 94, 96, 98 for switches "2" and "3" of the first switch bank 30(a). In many embodiments, switches "2" and "3" of the first switch bank 30(a) are used to select a control panel configuration (e.g., the number of buttons) for the reconfigurable control panel 28. Setting 94 has the switch "2" of the first switch bank 30(a) in the "ON" (up) position and switch "3" of the first switch bank 30(a) in the "OFF" (down) position. Setting 96 has the switch "2" of the first switch bank 30(a) in the "ON" (up) position and switch "3" of the first switch bank 30(*a*) in the "ON" (up) position. Setting 98 has the switch "2" of the first switch bank 30(*a*) in the "OFF" (down) position and switch "3" of the first switch bank 30(*a*) in the "OFF" (down) position.

In many embodiments, moving switches "2" and "3" of the first switch bank 30(*a*) into setting 94 reconfigures the reconfigurable control panel 28 into a two-button configuration. In this two-button configuration, the grouped sensing regions 52 within Area "A" labeled A1, A2, A3, A4, and A5 correspond to a single beverage option or beverage additive (e.g., flavor shot), and the grouped sensing regions 52 within Area "B" labeled B1, B2, B3, B4, and B5 also correspond to a single beverage option or beverage additive (e.g., flavor shot). In this two-button configuration, a first button is formed by the sensing regions 52 in Area "A" and a second button is formed by the sensing regions 52 in Area "B." In this two-button configuration, pressing any of the sensing regions labeled A1, A2, A3, A4, or A5 in Area "A" causes the entire Area "A" to react as a single selection when any part of Area "A" is pressed. Pressing any of the sensing regions labeled B1, B2, B3, B4, and B5 in Area "B" causes the entire Area "B" to react as a single selection when any part of Area "B" is pressed. When the reconfigurable control panel 28 is in a two-button configuration, only two solenoid valves associated with the two beverages (or beverage additive) and the water solenoid valve and/or the soda solenoid valve are used.

In many embodiments, moving switches "2" and "3" of the first switch bank 30(*a*) into setting 96 reconfigures the reconfigurable control panel 28 into a four-button configuration. In this four-button configuration, the sensing regions 52 labeled A1 and A3 correspond to a single beverage or beverage additive, the sensing regions 52 labeled A2 and A4 correspond to a single beverage or beverage additive, the sensing regions 52 labeled B1 and B3 correspond to a single beverage or beverage additive, the sensing regions 52 labeled B2 and B4 correspond to a single beverage or beverage additive, and the sensing regions 52 labeled A5 and B5 are disabled. In this four-button configuration, a first button is formed by sensing regions labeled A1 and A3, a second button is formed by sensing regions labeled A2 and A4, a third button is formed by sensing regions labeled B1 and B3, and a fourth button is formed by sensing regions labeled B2 and B4. In this four-button configuration, pressing either of the sensing regions labeled A1 and A3 causes a reaction as a single selection, pressing either of the sensing regions labeled A2 and A4 causes a reaction as a single selection, pressing either of the sensing regions labeled B1 and B3 causes a reaction as a single selection, and pressing either of the sensing regions labeled B2 and B4 causes a reaction as a single selection. When the reconfigurable control panel 28 is in a four-button configuration, four solenoid valves associated with the four beverages (or beverage additives) and the water solenoid valve and/or the soda solenoid valve are used.

In many embodiments, moving switches "2" and "3" of the first switch bank 30(*a*) into setting 98 reconfigures the reconfigurable control panel 28 into an eight-button configuration. In this eight-button configuration, each of the sensing regions 52 labeled A1, A2, A3, A4, B1, B2, B3, and B4 forms a separate button and corresponds to dispensing a beverage or beverage additive, and the sensing regions 52 labeled A5 and B5 are disabled. Pressing each of the sensing regions 52 labeled A1, A2, A3, A4, B1, B2, B3, and B4 causes a reaction as a separate selection. When reconfigurable control panel 28 is in an eight-button configuration, eight solenoid valves associated with the eight beverages (or beverage additives) and the water solenoid valve and/or the soda solenoid valve are used.

FIG. 7C illustrates a setting 100 for the switches of the second switch bank 30(*b*). In many embodiments, the second switch bank 30(*b*) is used to select a base fluid for each beverage selection. For example, the second switch bank 30(*b*) can be used to associate the sensing regions 52 used to make beverage selections with carbonated or non-carbonated beverages. The second switch bank 30(*b*) includes eight individual switches labeled "1," "2," "3," "4," "5," "6," "7," and "8." In many embodiments, each individual switch can be set to either "WATER" by placing the individual switch in the up position or "SODA" by placing the individual switch in the down position. Setting a switch of the second switch bank 30(*b*) to "WATER" can cause dispensing of non-carbonated water from the water solenoid valve when dispensing the corresponding beverage so that the beverage is non-carbonated. Setting a switch of the second switch bank 30(*b*) to "SODA" can cause dispensing of carbonated water from the carbonated water solenoid valve so that the corresponding beverage is carbonated.

A timed dispense can refer to a volume of liquid dispensed by each solenoid valve. A timed dispense is controlled by the preprogrammed time that a solenoid valve 24 is open during dispense and the flow rate into the solenoid valve 24 controlled by a flow rate control device 22. The user can calibrate a timed dispense of each solenoid valve by using buttons on the reconfigurable control panel 28 to determine the current amount of volume dispensed by each solenoid valve and then by adjusting the flow rate control device 22 (shown in FIG. 10) associated with each solenoid valve to achieve the target volume. Some examples of timed dispenses that can be calibrated include the timed dispense of the non-carbonated and carbonated water in a beverage, the timed dispense of a beverage additive for beverages or flavor shots, the timed dispense associated with cup size amounts, and other suitable timed dispenses. These exemplary calibrations are described in further detail below.

In one example, the user can calibrate the timed dispense of non-carbonated water in a beverage. In one case, the user simultaneously activates (e.g., presses) and holds for a predefined period of time any portion of Area "A" and any portion of Area "B." If the calibration mode is activated, the visual indicator 56 associated with the "Pour" button 68(*b*) indicates (e.g., flashes) that the beverage dispenser is in calibration mode. The user can place a measuring device (e.g., graduated cylinder or brix cup) under the nozzle. The user then selects the "Pour" button 68(*b*). The volume of non-carbonated water for the current timed dispense of the associated solenoid valve will be dispensed into the measuring device. The user can adjust the flow rate into the associated solenoid valve using the associated flow rate control device 22 (shown in FIG. 10) to achieve the target volume for the non-carbonated water.

In another example, the user can calibrate the timed dispense of carbonated water in a beverage. In one case, the user simultaneously activates (e.g., presses) and holds for a predefined period of time any portion of Area "A" and any portion of Area "B." If the calibration mode is activated, the visual indicator 56 associated with the "Pour" button 68(*b*) indicates (e.g., flashes) that the beverage dispenser is in calibration mode. The user can place a measuring device (e.g., graduated cylinder or brix cup) under the nozzle. The user then selects the "Cancel" button 68(*c*). The volume of carbonated water for the current timed dispense of the associated solenoid valve will be dispensed into the measuring device. The user can adjust the flow rate into the associated solenoid valve using the associated flow rate control device to the target volume for the carbonated water.

In another example, the user can calibrate the timed dispense of beverage additive in a beverage. In one case, the user simultaneously activates (e.g., presses) and holds for a predefined period of time any portion of Area "A" and any portion of Area "B." If the calibration mode is activated, the visual indicator 56 associated with the "Pour" button 68(*b*) indicates (e.g., flashes) that the beverage dispenser is in calibration mode. The user can place a measuring device (e.g., graduated cylinder or brix cup) under the nozzle. The user then selects the button 66 associated with the beverage having the beverage additive (e.g., flavor shot) that is being calibrated. For example, if the user is calibrating a cherry flavor shot, the user selects the button associated with the cherry beverage. The user can select the "Pour" button 68(*b*). The volume of the beverage additive for the current timed dispense of the associated solenoid valve will be dispensed into the measuring device. The user can adjust the flow rate into the associated solenoid valve 24 using the associated flow rate control device 22 to the target volume of the beverage additive.

Another example allows the user to calibrate the timed dispense of the beverages for each cup size. In this way, the user can adjust the portion or volume of each beverage for each cup size. In one case, the user enters this portion control calibration mode by activating (e.g., pressing and holding) the one or more of the cup size buttons 68(*a*) for a predetermined amount of time until one of the cup size buttons 68(*a*) and the visual indicator 56 associated with the "Pour" button 68(*b*) indicates portion control calibration mode (e.g., flashes). The user selects a button 66 on the reconfigurable control panel 28 associated with the beverage for which the timed dispense will be set. A visual indicator 56 associated with the beverage can indicate that the beverage was selected. The user selects a cup size button 68(*a*). The visual indicator 56 associated with the cup size button 68(*a*) can indicate the selection (e.g., flashes). The user places a cup or other beverage holder of the selected size with or without ice under the nozzle. The user then presses and holds the cup size button 68(*a*) to begin dispensing the beverage and start the dispense timer. The user releases the cup size button 68(*a*) to end the dispensing and stop the dispense timer. While in the cup size calibration mode, the user can continue to repeat the process to calibrate the cup sizes for each of the beverages. The user can exit and save the dispense times by activating a button. In some embodiments, the dispense times are automatically saved after a period of time elapses. The dispense times can be stored in the memory 76 of the control unit 26 of the interface control cassette 74. The dispense times can be used to actuate the solenoid valves 24.

In some embodiments, the user enters one or more buttons on the reconfigurable control panel 28 to exit the calibration mode and return to standby mode. For example, while in calibration, the user can simultaneously press or otherwise activate two buttons (e.g., buttons labeled A1 and B2) for at least a predefined period of time (e.g., 3, 4, or 5 seconds). The visual indicator associated with the "Pour" button 68(*b*) stops flashing to indicate that the beverage dispenser 10 is no longer in calibration mode and has been returned to standby mode.

In some embodiments, the reconfigurable beverage dispenser 10 can be reset to system defaults by the user. The system defaults can include settings provided by the manufacturer or other entity. The system defaults can be customized settings for the establishment in some cases.

Example Dispensing Modes

The reconfigurable beverage dispenser 10 can be used to dispense beverages or beverage additives in any suitable number and type of dispensing mode. Some examples of suitable types of dispensing modes include: a portion-controlled dispense of a beverage, a demand pour of a beverage or beverage additive, a portion-controlled dispense of a beverage additive (e.g., dispense of flavor shot), and a portion-controlled dispense of a beverage additive and beverage.

In an exemplary portion-controlled dispense of a beverage dispensing mode, the user can select one or more buttons on the reconfigurable control panel 28 to dispense a predefined volume of a beverage. The predefined volume can be preset before installation and/or calibrated by the user. In this exemplary dispensing mode, the user can place a cup or other beverage holder with or without ice under the nozzle. The user selects a button 66 on the reconfigurable control panel 28 associated with the beverage selected for dispensing. The visual indicator 56 associated with button 66 illuminates or otherwise indicates the beverage that is selected. The user selects a cup size by pressing one of the cup size buttons 68(*a*). In response, a visual indicator 56 associated with the selected cup size will illuminate or indicate dispensing. The beverage dispenser 10 dispenses the selected beverage. The visual indicator 56 associated with the selected cup size can turn off at the end of the dispensing. The user can activate the cancel button 68(*c*) at any time during dispense to terminate the dispensing and return the beverage dispenser 10 to a standby mode.

An exemplary demand pour of a beverage or beverage additive begins with the user placing a cup or other beverage holder with or without ice under the nozzle. The user selects a button 66 on the reconfigurable control panel 28 associated with the beverage or beverage additive (e.g., flavor shot) selected for dispensing. The visual indicator 56 associated with the selected button 66 illuminates or otherwise indicates the beverage or beverage additive that is selected. The user presses and holds the pour button 68(*b*) or otherwise continuously activates the pour button 68(*b*). The visual indicator 56 associated with the pour button 68(*b*) illuminates or otherwise indicates dispensing. The dispensing of the beverage or beverage additive will be maintained as long as the pour button 68(*b*) is activated. The visual indicator 56 associated with the pour button 68(*b*) turns off at the end of the dispensing.

In an exemplary portion-controlled dispense of a beverage additive dispensing mode, the user selects one or more buttons on the reconfigurable control panel 28 to dispense a predefined volume of a beverage additive (e.g., dispensing a flavor shot). The predefined volume can be preset before installation and/or calibrated by the user. In this mode, the user can place a cup or other beverage holder with or without ice under the nozzle. The user presses and holds or otherwise continuously activates a button 66 associated with the beverage corresponding to the beverage additive until the visual indicator 56 indicates (e.g., flashes) that the beverage additive will be dispensed. This activation can occur after a suitable predefined period of time such as, for example, 3 seconds, 4 seconds, or 5 seconds. For example, the user can press and hold down the button associated with the Cola beverage for 3-5 seconds to dispense flavor shot of Cola syrup. The user selects a cup size by pressing one of the cup size buttons 68(*a*), and in response, the beverage additive is dispensed. The selected cup size can determine the volume of beverage additive dispensed. Once dispensed, the beverage dispenser 10 returns to standby mode. In this dispense mode, the solenoid valves 24 associated with the carbonated or non-carbonated water may not be activated.

In an exemplary portion-controlled dispense of a beverage additive and beverage, the user selects one or more buttons on the reconfigurable control panel 28 to dispense a predefined volume of a beverage additive (e.g., flavor shot) and beverage. The user places a cup or other beverage holder with or without ice under the nozzle. The user presses and holds or otherwise continuously activates a button 66 associated with the beverage corresponding to the beverage additive until the visual indicator 56 indicates (e.g., flashes) that the beverage additive option has been activated. This activation can occur after a suitable predefined period of time such as, for example, 3 seconds, 4 seconds, or 5 seconds. The user selects a button 66 on the reconfigurable control panel 28 associated with the beverage selected for dispensing. The selected beverage can be the same beverage associated with the selected beverage additive or a different beverage. The visual indicator 56 associated with the selected button 66 illuminates or otherwise indicates the beverage selection. The user selects a cup size by pressing one of the cup size buttons 68(a). In response, the beverage dispenser 10 dispenses the selected beverage and then after a predefined period of time, dispenses the beverage additive. The predefined period of time can be any suitable time such as 1 second, two seconds, or three seconds. Dispensing the beverage additive and beverage at the same time can improve the mixing of the beverage additive into the beverage. In one case, the beverage additive is dispensed before the beverage stops being dispensed can further improve the mixing. In this dispense mode, the timed dispense of the solenoid valve(s) associated with the beverage can be reduced to account for the volume of beverage additive dispensed. In this way, the total volume dispensed will be the same with without the beverage additive. Once dispensing of the beverage and beverage additive ends, the beverage dispenser 10 returns to standby mode.

Example Reconfigurable Beverage Dispensers

Figure 8:
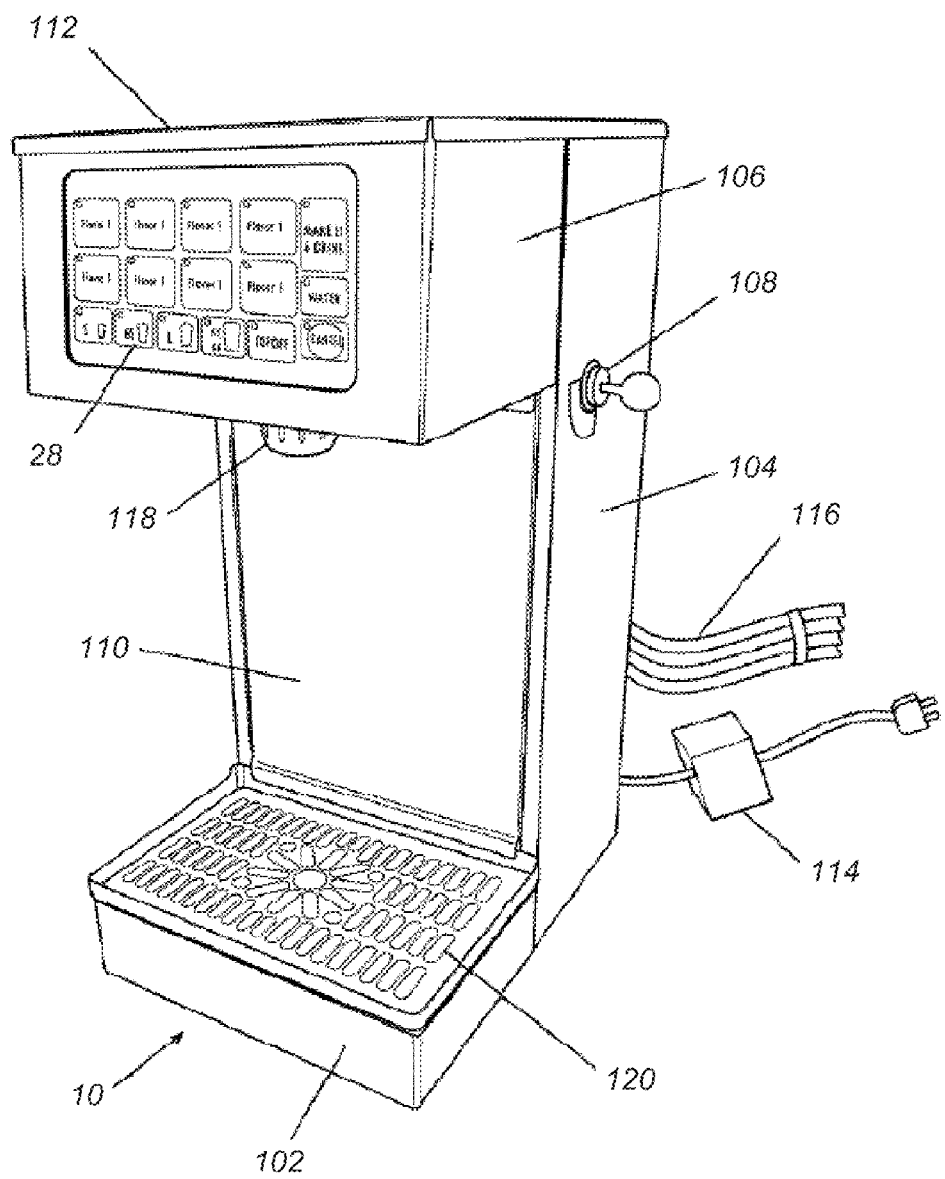
FIG. 8 is a perspective view of the reconfigurable beverage dispenser of FIG. 1.

FIG. 8 is a perspective view of a beverage dispenser 10, in accordance with FIG. 1. The beverage dispenser 10 includes a base portion 102, a trunk portion 104, and an upper portion 106. The beverage dispenser 10 also includes a lock and button mechanism 108, a front access panel 110, a top access panel 112, an electric plug assembly 114, input tubing 116, the reconfigurable control panel 28, a nozzle cap 118, and a drip pan 120.

Although the base portion 102 is free standing in the illustrate example, the base portion 102 can be fixed or removably attached to a surface such as a counter. The base portion 102 of the beverage dispenser 10 is also fixed or removably attached to the trunk portion 104. The upper portion 106 is attached to the trunk portion 104 of the beverage dispenser 10 by hinges (not shown). The hinges allow for easy opening of the beverage dispenser 10, as will be explained in greater detail below. Although hinges are used in this embodiment, other suitable mechanisms can be used to attach the upper portion 106 to the trunk portion 104. For example, a variety of screws, tabs, snaps, bolts, or other devices can be used to facilitate attachment, some of which can be fixed and others of which can be moveable.

The top access panel 112 can be removably attached on top of both the upper portion 106 and the top of the trunk portion 104. The top access panel 112 can provide protection to internal components of the beverage dispenser 10, and the top access panel 112 can also prevent the beverage dispenser 10 from being opened when it is in place. The top access panel 112 can simply rest on top of the beverage dispenser 10 or, alternatively, it can be secured in place on the beverage dispenser 10. A variety of screws, tabs, snaps, bolts, or other devices can be used to facilitate the secured attachment of the top access panel 112 to the beverage dispenser 10, and the attachment can be a fixed attachment or a moveable attachment.

Figure 9:
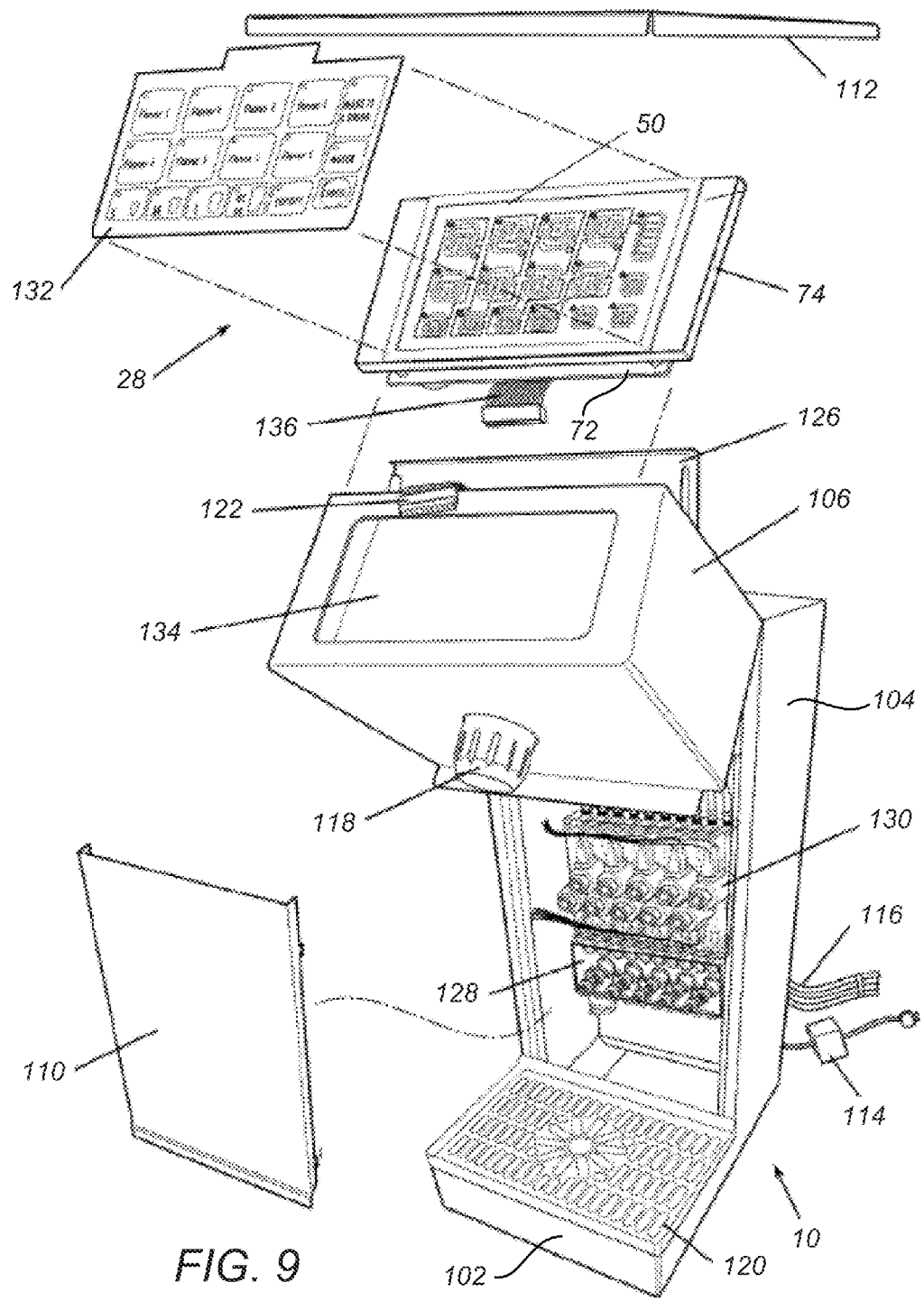
FIG. 9 is a partially exploded view of the beverage dispenser of FIG. 8.

The opening or closing of the beverage dispenser 10 and/or delivery of power to the beverage dispenser 10 can be controlled by the lock and button mechanism 108. For example, when the lock and button mechanism 108 is unlocked and the top access panel 112 is removed, the upper portion 106 of the beverage dispenser 10 can be opened upward (as shown in FIG. 9) to allow easy access to internal components of the beverage dispenser 10. Additionally, when the upper portion 106 is in an opened position, the front access panel 110 can be removed, allowing additional access to the internal components of the beverage dispenser 10. The easy access to internal components of the beverage dispenser 10 may assist in maintenance and service of the beverage dispenser 10 and its components. Further, when the upper portion 106 is in an opened position, the interface control cassette 74 can be disconnected from a dispenser plug 122 and removed from the upper portion 106 for reconfiguration (shown in FIG. 9). The front access panel 110 can be removably attached to the trunk portion 104 of the beverage dispenser 10, and the front access panel 110 may provide protection to internal components of the beverage dispenser 10. The front access panel 110 can be held in place by the upper portion 106 of the beverage dispenser 10 or, alternatively, it can be secured in place by any suitable means such as, for example, screws, tabs, snaps, or bolts. The opening or closing of the beverage dispenser 10 and/or delivery of power to the beverage dispenser 10 can be controlled by other mechanisms or devices than the lock and button mechanism 108. For example, the delivery of power to the beverage dispenser 10 can be controlled by a power switch or button situated on the beverage dispenser 10.

The beverage dispenser 10 receives electrical power from the electric plug assembly 114, which can include a standard two or three-prong electric plug. The electric plug assembly 114 can further include a power transformer that is capable of receiving a standard electrical power signal such as, for example, a power signal of approximately 120V (or approximately 240V in European applications) and supplying the beverage dispenser 10 with an appropriate power signal. The power signal provided to the beverage dispenser 10 can be a relatively low voltage signal such as, for example, a 12V power signal.

The beverage dispenser 10 receives beverage fluids (e.g., beverage additive(s), water, carbonated water, beer, wine, etc.) through the input tubing 116. The input tubing 116 can be any tubing suitable for transporting a beverage fluid to the beverage dispenser 10 such as, for example, rubber or plastic tubing. The input tubing 116 can include one or more tubes that may or may not be insulated. For example, the input tubing 116 used to transport water from a prechiller to the beverage dispenser 10 can be insulated in order to maintain the water at a desired temperature. The input tubing 116 can be insulated with any suitable insulation material capable of maintaining a beverage fluid transported through the input tubing 116 at a desired temperature.

The reconfigurable control panel 28 is used to select one or more beverage options such as type of blended beverage, cup size, flavor shot, and/or other suitable option. The reconfigurable control panel 28 can be programmed or reconfigured by the user, as described in greater detail above and below. After the beverage options are selected, the beverage is dispensed by the beverage dispenser 10 through a nozzle block 124 (shown in FIG. 10). After the beverage is dispensed through the nozzle block 124, its flow can be partially or completed directed by the nozzle cap 118 into a cup or other container (not shown). Although the nozzle cap 118 is designed to minimize splash, splatter, and overspray of the dispensed flavor shot or blended beverage, as will be described below, the drip pan 120 provided in the base portion 102 of the beverage dispenser 10 may catch any splash, splatter, or overspray by the beverage dispenser 10 and any spillover from the beverage receiving cup. The drip pan 120 can further be removable for emptying and cleaning. A drain can be provided at the bottom of the drip pan 120, and that the drain can transport any splash, splatter, overspray, or spillover away from the beverage dispenser 10.

The beverage dispenser 10 has a C-shaped body with a relatively small footprint and is easily transportable. The beverage dispenser 10 illustrated is approximately 8⅜" wide by approximately 11½" deep, and approximately 18⅜" tall. Due to its size, the beverage dispenser 10 is commonly referred to as a 2-wide valve tower. However, a reconfigurable beverage dispenser can be implemented in many different sizes and configurations. For example, a reconfigurable beverage dispenser can be integrated into a larger six or eight-wide valve tower. In such a configuration, the beverage dispenser 10 essentially replaces two nozzles of the larger beverage dispenser, such as the two center nozzles, thereby creating a combined dispenser with additional nozzles on either side of the beverage dispenser 10 portion. As another example, the reconfigurable beverage dispenser can be or fixedly or removably attached to a countertop or other surface. Such a configuration may be desirable where the reconfigurable beverage dispenser is located in a high traffic area (e.g., a bar) to prevent the beverage dispenser from being disrupted if it is impacted.

FIG. 9 is a partially exploded view of various components of the beverage dispenser 10. As shown in FIG. 9, the upper portion 106 is in an opened position, the front access panel 110 has been removed, and the top access panel 112 has been removed.

FIG. 9 also shows an upper portion access panel 126 in the upper portion 106 of the beverage dispenser 10. The upper portion access panel 126 can be opened in order to provide easy access to the interface control cassette 74 and its various components. When the upper portion access panel 126 is opened, the user can access the reconfigurable control panel 28 and reconfigure it. In many embodiments, the user can remove the interface control cassette 74 and detach it from the dispenser plug 122 when the upper portion access panel 126 is opened. The user can then reconfigure the reconfigurable control panel 28 outside the beverage dispenser 10. The upper portion access panel 126 may also provide protection to the electronics of the interface control cassette 74 and assist in preventing undesirable moisture or leakage associated with the beverage dispenser from contacting the various components of the interface control cassette 74.

The upper portion access panel 126 can be attached to the upper portion 106 of the beverage dispenser 10 by hinges (not shown) or other suitable attachment mechanism. For example, any variety of screws, tabs, snaps, bolts, or other devices could be used to facilitate the attachments, some of which can be fixed and others of which can be moveable. The use of hinges may allow for easy access to internal components; however, other forms of attachments may also be advantageous if, for example, the attachment(s) allows easy servicing of the interface control cassette 74. The upper portion access panel 126 can be removably attached to the upper portion 106 of the beverage dispenser 10. Also, the upper portion access panel 126 can be unattached to the upper portion 106 and merely rest on top.

The internal components of the beverage dispenser 10 include a flow control block 128 and a solenoid block 130. The solenoid block 130 is illustrated as being transparent so that its internal components are partially visible. Additionally, the components of the interface control cassette 74 are illustrated. The components of the interface control cassette 74 include the reconfigurable control panel 28 and the circuit board 72. The reconfigurable control panel 28 includes the reconfigurable control panel component 50 and the cover plate 132. An upper portion opening 134 in the upper portion 106 is also shown.

In operation, when a beverage fluid(s) enters the beverage dispenser 10 via the input tubing 116, the beverage fluid(s) enters the flow control block 128. The flow control block 128 includes a plurality of adjustable orifices (e.g., adjustable valves) that define the flow rate of the beverage fluid(s). The flow rate can be individually controlled for each beverage fluid and the flow rate for each beverage fluid can be set so it remains constant at a set rate for each beverage additive. When the beverage fluid(s) exits the flow control block 128, it flows to the solenoid block 130, and then from the solenoid block 130 to the nozzle block 124 (shown in FIG. 10) in the upper portion 106. The solenoid block 130 is coupled with a plurality of solenoid valves 24. Each solenoid valve 24 controls the flow path of each of the beverage additives. When a gate is opened, a beverage additive flows to the nozzle block 124, where it can be dispensed by the beverage dispenser 10. Other beverage fluids (e.g., beverage additive(s), water, carbonated water, beer, wine) flow through the beverage dispenser 10 in the same manner.

The interface control cassette 74 controls the actuation of the various solenoid valves 24 of the solenoid block 130 based on user input, thereby allowing a user of the beverage dispenser 10 to select a beverage to be dispensed from the beverage dispenser 10. The functionalities of each of these internal components will be described in greater detail below.

The interface control cassette 74 includes the reconfigurable control panel 28 and the circuit board 72, which includes the control unit 26 and the user reconfigurable switches 30. As explained in greater detail above with reference to FIG. 5, the reconfigurable control panel 28 is capable of receiving user input for the beverage dispenser 10. Other types of reconfigurable input devices can be used as an alternative to the reconfigurable control panel 28. For example, one or more liquid crystal displays (LCD's) and/or one or more touch screen displays can be used as a reconfigurable input device.

In the illustrated embodiment, the interface control cassette 74 is accessible when the upper portion access panel 126 is lifted into an opened position. In some embodiments, a user can reconfigure the reconfigurable control panel 28 through the openings in the upper portion 106. The interface control cassette 74 can be a removable cassette situated inside the upper portion 106 of the beverage dispenser 10. A user can detach the interface control cassette 74 from the dispenser plug 122 and remove the interface control cassette 74 from the upper portion 106 so that the user has access to the interface control cassette 74 outside of the upper portion 106.

In order to provide power to the interface control cassette 74 and/or to facilitate communication between the interface control cassette 74 and other components of the beverage dispenser 10 such as, for example, the solenoid block 130, the interface control cassette 74 can include a cassette plug 136 that is connected to the associated beverage dispenser plug 122.

The cover plate 132 can be inserted between the interface control cassette 74 and the front of the upper portion 106 of the beverage dispenser 10. The cover plate 132 can be a removable or interchangeable card or, alternatively, it may be affixed inside the upper portion 106. The cover plate 132 can also be affixed to the front of the upper portion 106 rather than being situated inside the upper portion 106. If the cover plate 132 is inserted inside the upper portion 106, it can be viewed and accessed through an upper portion opening 134 situated in the front of the upper portion 106.

The cover plate 132 can include indicia identifying the various beverage additives and/or beverages for dispensing from the beverage dispenser 10, the available size selections, other user selectable options, as well as marketing indicia. The indicia can be printed on the cover plate 132 and/or can be at least partially formed integrally into the cover plate 132. The beverage additives and/or beverages corresponding to those shown on the cover plate 132 can be programmed into the interface control cassette 74. When desired, such as when the beverages provided by the beverage dispenser 10 are changed and/or the control logic of the interface control cassette 74 is changed, a different cover plate can be inserted into the beverage dispenser. For example, the cover plate can be changed as the selection of flavor shots and beverages dispensed by the beverage dispenser changes.

The interface control cassette 74 can include distinct components as shown in FIG. 9 or, alternatively, some or all of the features of one of the components can be incorporated into another component. For example, the display of beverage options can be incorporated into the interface control cassette 74 by a touch screen display on the interface control cassette 74 from which a user can both view and select beverage options. As another example, the reconfigurable control panel 28 and the cover plate 132 can be disposed remote from the control unit 26 but include the ability to receive user input and transmit any received user input to the control unit 26. Other suitable input devices can be used with a reconfigurable beverage dispenser. For example, push buttons, contact switches, mouse and/or buttonboard, touch screen displays, or capacitive resistance input devices can be used in a reconfigurable beverage dispenser, and the functionality of such input devices can be reconfigured in accordance with a desired beverage dispenser configuration.

The volume of water, carbonated water, and/or beverage additive(s) dispensed by the beverage dispenser 10 can be determined by the cup size button (e.g., delineated button area 68(*a*)) that is selected. The volumes of water, carbonated water, and/or beverage additive(s) dispensed by beverage dispenser 10 can be individually programmed into the interface control cassette 74 for each cup size and beverage (e.g., blended beverage or flavor shot). The volume of a beverage additive in a flavor shot or blended beverage can be in shot size increments in some cases. Any number of flavor buttons, shot size increments, or cup sizes can be implemented, and those depicted and/or described are for illustrative purposes only.

The volume of a beverage additive(s) dispensed for a given beverage (e.g., blended beverage or flavor shot) and cup size can be defined in any suitable way and then programmed into the interface control cassette 74 in any suitable fashion. In many embodiments, a user can program into the interface control cassette 74 the volumes of a beverage additive(s) that will be dispensed for each cup size. For example, a user can program the interface control cassette 74 to dispense a flavor additive X in a one-quarter ounce shot size increment for a small cup size, in a one-third ounce shot size increment for a medium cup size, and in a one-half ounce shot size increment for a large cup size. As another example, a user can program an incremental volume increase for a beverage additive into the interface control cassette 74. An incremental volume increase refers to the increase of volume of a beverage additive dispensed between progressively larger cup sizes. For example, if an incremental volume increase of one-half ounce shot was programmed for flavor additive Y, then a one-half ounce shot would be dispensed for a small cup size, a one ounce shot would be dispensed for a medium cup size, a one and one-half ounce shot would be dispensed for a large cup size, and a two ounce shot would be dispensed for an extra-large cup size. A volumetric ratio can also be programmed into interface control cassette 74 for one or more beverages. A volumetric ratio refers to the ratio of the volume of beverage additive to the volume of the water or total volume of beverage for all cup sizes. A volumetric ratio can provide a more constituent flavor profile for a given beverage dispensed for any cup size. Providing a volumetric ratio may help avoid dispensing beverages which are weaker or stronger depending on the cup size and when the beverage is dispensed. A volumetric ratio can be programmed into the interface control cassette 74 for each beverage. A user can also calibrate a timed dispense of a beverage additive and/or water dispensed for one or more beverages, and can program the timed dispense values into the interface control cassette 74. In this way, the user can test the flavor profile of the beverage and calibrate the timed dispense accordingly. The timed dispense of a beverage additive and/or water determines the dispensing volumes and can correlate to the volumetric ratio.

Figure 10:
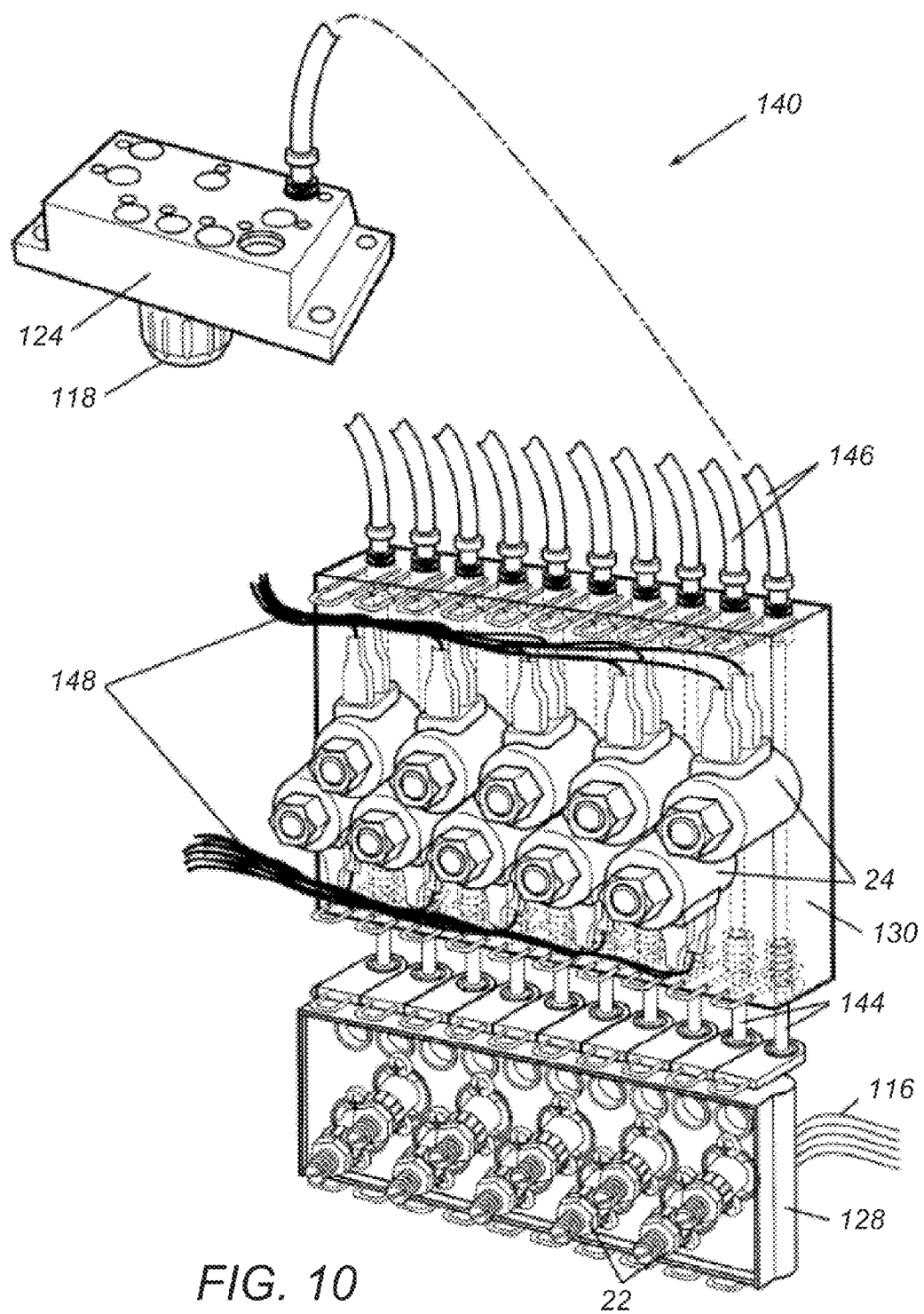
FIG. 10 is a perspective view of flow control system components for the beverage dispenser of FIG. 8.

FIG. 10 is a perspective view of a flow control system 140 of the beverage dispenser 10. The flow control system 140 includes the flow control block 128, the solenoid block 130, and the nozzle block 124. In operation, after a beverage fluid(s) enters the beverage dispenser 10 via the input tubing 116, it flows into the flow control block 128, and then to the solenoid block 130. The flow control block 128 controls the flow rate of the beverage fluid(s) into the solenoid block 130. The solenoid valves 24 in solenoid block 130 are actuated by the interface control cassette 74 to allow the beverage fluid(s) to flow to the nozzle block 124 for dispensing from the beverage dispenser 10. Although the solenoid block 130 is described herein as being situated downstream from the flow control block 128, the flow control block 128 can be situated downstream from the solenoid block 130. Also, a flow control system for a reconfigurable beverage dispenser can include a plurality of individual solenoids coupled with individual gate valves that are in fluid communication with the flow control block 128.

The flow control block 128 includes one or more flow control devices 22 (e.g., adjustable valve) or other flow rate control devices that control the flow rate of the beverage fluids (e.g., beverage additive(s), water, carbonated water, beer, wine, etc.) provided to the flow control block 128 by the input tubing 116. Although valves are shown in FIG. 10, other means for controlling flow rate can be used, for example, one or more orifices. The flow control block 128 provides an individual channel for each beverage fluid. The input tubing 116 is coupled to the flow control block 128. More specifically, each tube of the input tubing 116 is coupled to an associated or corresponding flow control device 22 of the flow control block 128. A flow control device 22 is provided for each beverage fluid provided to the flow control block 128. The flow rate is individually controlled for each beverage fluid by one of the flow control devices 22. Additionally, the flow rate for each beverage fluid can be set so that it remains constant for each beverage fluid. Any suitable device can be used for regulating the flow rate of the beverage fluids. The flow control devices 22 can be arranged or positioned in a staggered or offset array, thereby requiring relatively little space and, consequently, at least partially contributing to a relatively small footprint for the beverage dispenser 10.

A flow control device 22 for the beverage dispenser 10 can be constructed from any suitable material such as, for example, plastic, rubber, or a combination of plastic and rubber. The flow control block 128 can also be constructed from any number of suitable materials such as, for example, plastics, rubber, acrylics, metals, polymers, synthetic materials, or a combination of any such materials.

When a beverage fluid exits the flow control block 128, it is transported to the solenoid block 130 by solenoid input tubing 144. The solenoid input tubing 144, which can be insulated or non-insulated, can be any tubing suitable for transporting a beverage fluid from the flow control block 128 to the solenoid block 130 such as, for example, rubber or plastic tubing. The solenoid input tubing 144 can be terminated at the periphery of the solenoid block 130. Alternatively, the solenoid input tubing 144 can further extend into the solenoid block 130 to the solenoid valves 24 coupled within the solenoid block 130. One or more suitable devices such as, for example, pins, staples, or braces, can secure the solenoid input tubing 144 in place at the solenoid block 130. Although the flow control block 128 and the solenoid block 130 are depicted as two separate and distinct components of the beverage dispenser 10, the flow control block 128 and the solenoid block 130 can be integrally formed as a single component of the beverage dispenser 10.

Each of the solenoid valves 24 control the flow path of a beverage fluid through the solenoid block 130. A solenoid valve 24 can be provided for each beverage fluid. When a solenoid valve 24 is actuated or opened, a beverage fluid flows past the solenoid valve 24, through the solenoid block 130, and exits into an output tube 146. The output tube 146 carries the beverage fluid to the nozzle block 124, where it is dispensed by the beverage dispenser 10. The interface control cassette 74 controls the actuation of the various solenoid valves 24 based on user input, thereby dispensing a user selected beverage from the beverage dispenser 10. Control signals from the interface control cassette 74 to the solenoids 132 are electrically communicated via solenoid wires 148, which can be any type of wire suitable for communicating an electrical signal to the solenoid valves 24.

The solenoid block 130 can form a centralized manifold for the flow of beverage fluids controlled by the array of solenoid valves 24. The use of a single block (e.g., an acrylic block) may decrease leak points, help maintain steady flow rates, and reduce pressure drops across the solenoid array. An acrylic block can also be easily machined and, if a clear acrylic block is utilized, the clear acrylic block may allow for increased visibility of the internal components of the solenoid block 130, thereby providing for easier trouble shooting of the solenoid block 130. The solenoid valves 24 can be arranged in a staggered array, as illustrated. A staggered array arrangement for the solenoid valves 24 may require relatively little space, and, consequently, at least partially contribute to a relatively small footprint for the beverage dispenser 10. In the illustrated embodiment, the solenoid block 130 is an acrylic block. However, many materials besides acrylic can be used to construct the solenoid block 130.

Each solenoid valve 24 includes a coil of wire encased in a housing with a moving plunger or shaft. When electricity is applied to the coil of a solenoid valve 24, the resulting magnetic field attracts the plunger and pulls it into the solenoid body, thereby allowing a beverage fluid to pass through the associated channel of the solenoid block 130. When electricity is removed, the solenoid plunger returns to its original position via a return spring or gravity, thereby preventing the flow of the beverage fluid through the associated channel of the solenoid block 130. A variety of different solenoids can be used, including, but not limited to, AC solenoids, DC solenoids, linear open frame solenoids, linear tubular solenoids, rotary solenoids, or variable positioning solenoids. Each solenoid valve 24 can include any suitable solenoid such as, for example, a 2X1578-A solenoid manufactured by KIP, Inc.

When a beverage fluid enters the solenoid block 130 through the solenoid input tubing 144, the beverage fluid flows to the one of the solenoid valves 24 via an input channel integrated into the solenoid block 130. The solenoid input tubing 144 can extend into the solenoid block 130 as an alternative to integrating input channels into the solenoid block 130. Electricity can applied to the solenoid valves 24 by way of the solenoid wires 148. A solenoid plunger is actuated to allow a beverage fluid to flow past the individual solenoid valve 24 into an output channel integrated into the solenoid block 130 and then into an output tube 146, which then carries the beverage fluid to the nozzle block 124. Electricity can be applied to control the solenoid valves 24 according to the control logic of the beverage dispenser 10. In FIG. 10, the output tubes 146 terminate at the periphery of the solenoid block 130. However, the output tubes 146 can extend into the solenoid block 130 as an alternative to integrating output channels into the solenoid block 130. Another alternative is to couple the solenoid input tubing 144 for the non-carbonated water and/or carbonated water directly to a diffuser block (shown in FIG. 14), which repositions the solenoid valves for the water and the carbonated water closer to the dispense point. Positioning the solenoid valves for the water and the carbonated water closer to the dispense point may improve the quality of the end beverage.

The output tubing 146, which can be insulated or non-insulated, can be any tubing suitable for transporting a beverage fluid from the solenoid block 130 to the nozzle block 124 (e.g., rubber tubing, plastic tubing). One or more suitable devices such as, for example, pins, staples, or braces, can be used to secure the output tubing 146 in place relative to the solenoid block 130 and/or relative to the nozzle block 124. The nozzle cap 118 can assist in directing the flow of the dispensed beverage fluid, thereby may assist in the prevention of splash, splatter, and/or overspray during the dispensing of a beverage fluid from the nozzle block 124.

Figure 11:
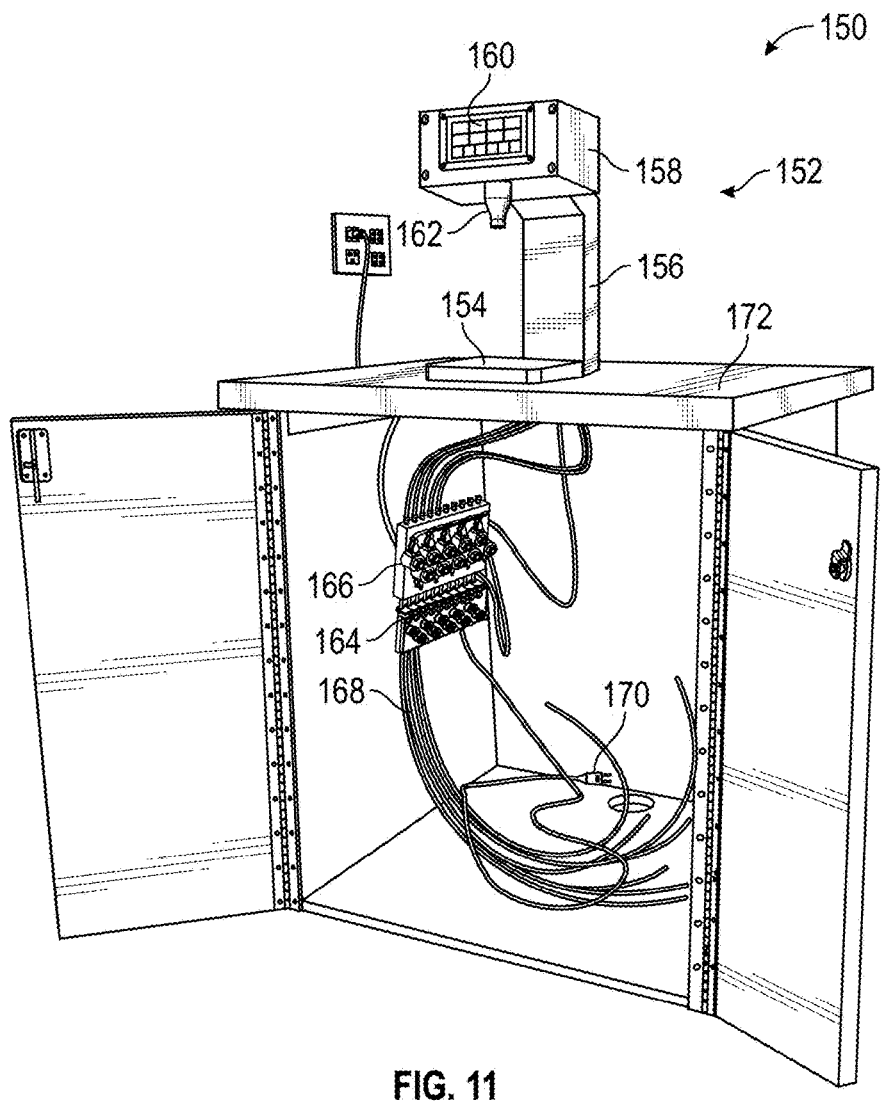
FIG. 11 shows a reconfigurable beverage dispenser, in accordance with many embodiments.

FIG. 11 is a photographic illustration of a reconfigurable beverage dispenser 150, in accordance with many embodiments. In this example, several components of the beverage dispenser 150 are separately located from an exposed portion 152 of the beverage dispenser 150. The exposed portion 152 includes base portion 154, a trunk portion 156, and an upper portion 158. The upper portion 158 includes a reconfigurable control panel 160 and a dispensing nozzle cap 162. The separately located components include a flow control block 164, a solenoid block 166, input tubing 168, and an electric plug assembly 170. The beverage dispenser 150 may be advantageous in an establishment with limited counter space.

As illustrated, the base portion 154, the trunk portion 156, and the upper portion 158 of the beverage dispenser 150 are located on a counter 172 of a cabinet. The base portion 154 can be free standing or fixedly or removably attached to the counter 172 or other surface. The flow control bock 164, the solenoid block 166, the input tubing 168, the electric plug assembly 170, and other components of beverage dispenser 150 are located within the cabinet. Alternatively, one or more of the components disposed in the cabinet can be located within the upper portion 158 of the beverage dispenser 150.

As illustrated, the flow control block 164 and the solenoid block 166 are located on a wall of the cabinet beneath the exposed portion 152 of the beverage dispenser 150. The flow control block 164 and/or the solenoid block 166 can be located on another surface of any suitable location such as a room. For example, the flow control block 164 and/or the solenoid block 166 can be located on a wall of the room near the counter where the other components of beverage dispenser 150 are located.

Figure 12:
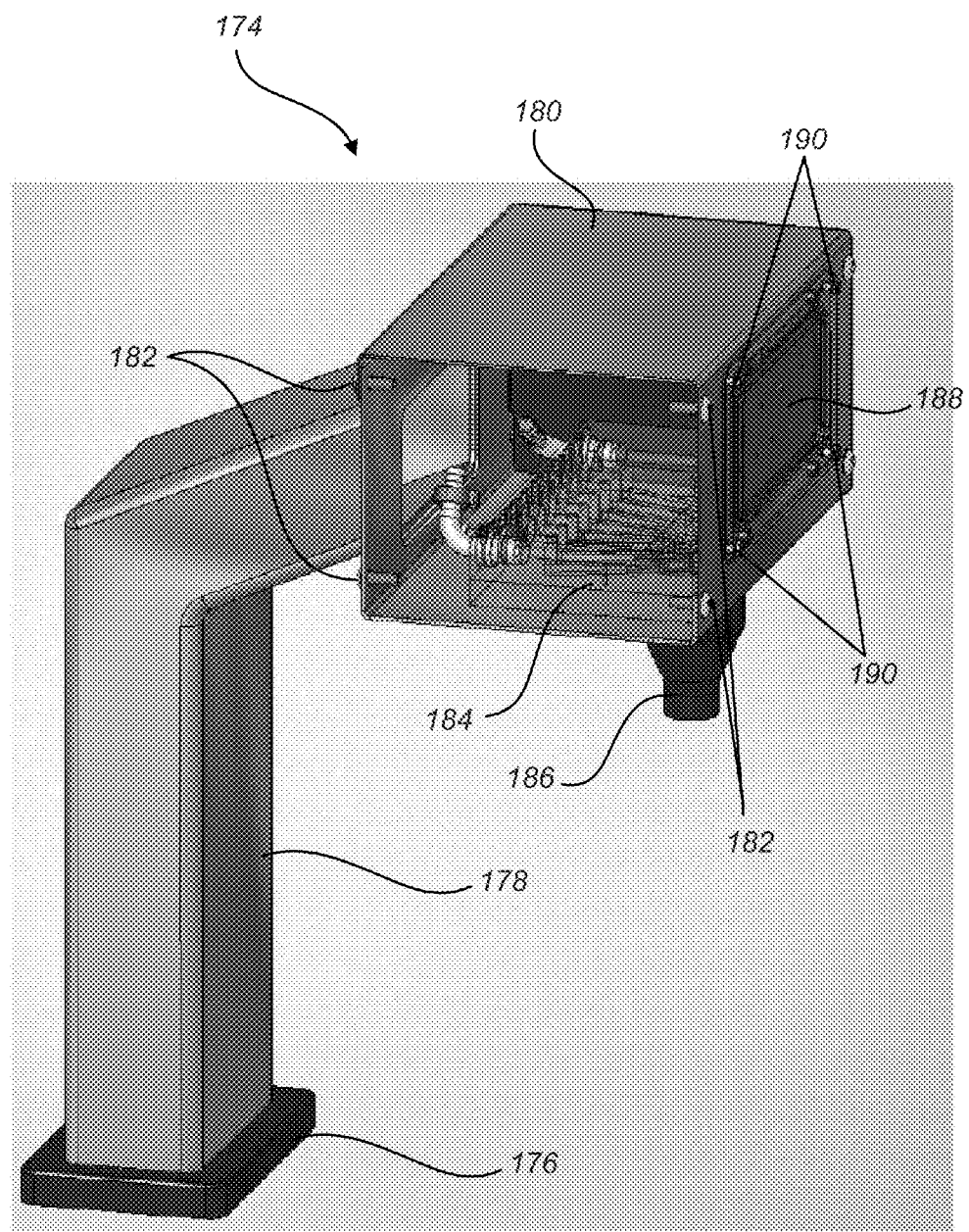
FIG. 12 is perspective view of components of a reconfigurable beverage dispenser, in accordance with many embodiments.

FIG. 12 is perspective view of an alternate exposed portion 174 for a beverage dispenser, in accordance with many embodiments. The exposed portion 174 can be used in place of the exposed portion 152 of the beverage dispenser 150 (shown in FIG. 11). The exposed portion 174 includes a base portion 176, a trunk portion 178 coupled to the base portion 176, and an upper portion 180 coupled to trunk portion 178. The base portion 176 can be free standing or fixedly or removably attached to a surface.

In this example, a side access panel (not shown) is removed to provide access to components in the upper portion 180. Any suitable method can be used to removably attach the side access panel to the side of upper portion 180. In the illustrated example, four fasteners 182 are used to attach the side access panel to the upper portion 180.

The upper portion 180 includes a diffuser block 184 for channeling beverage fluids to a dispense point within a nozzle cap 186 where they are mixed within and then dispensed through the nozzle cap 186. The upper portion 180 also includes an interface control cassette 188. In many embodiments, the interface control cassette 188 has the same components and functionality as the interface control cassette 74 discussed above. The interface control cassette 188 is attached to the front of the upper portion 180 using fasteners 190. In other embodiments, any suitable method of attachment can be used. For example, any variety of screws, tabs, snaps, bolts, or other devices can be used to facilitate the attachment, some of which allow the interface control cassette 188 to be removed and others of which allow the interface control cassette 188 to be moveable.

In operation, one or more beverage fluids (e.g., a beverage additive(s), water, carbonated water, beer, wine, etc.) are dispensed through the nozzle cap 186. When a beverage fluid(s) exits the solenoid block 166 (shown in FIG. 11), it passes through an output tube and then to the diffuser block 184, (also shown in FIG. 13) and then is dispensed through a nozzle (shown in FIG. 13) that is covered by the nozzle cap 186. After being dispensed by the nozzle, the beverage fluid(s) passes through the nozzle cap 186.

In operation, when a blended beverage is dispensed by the beverage dispenser, both a beverage additive(s) (e.g., a flavor syrup(s)) and a base beverage fluid(s) (e.g., water, carbonated water) are dispensed through the nozzle as described above. In many embodiments, the mixing of the dispensed beverage additive(s) and the dispensed base beverage fluid(s) occurs at a point below both the nozzle and nozzle cap 186. However, the mixing of the beverage additive(s) and the base beverage fluid(s) can occur within the nozzle cap 186, within the nozzle, or within the diffuser block 184 prior to dispense. In many embodiments, the brix of the blended beverage, which is defined as the ratio of a beverage additive(s) to a base beverage fluid(s), preferably does not vary by more than approximately one degree throughout the beverage.

Example Diffusers

When a blended beverage is dispensed from a beverage dispenser, two or more beverage fluids (e.g., a beverage additive(s) and water, a beverage additive(s) and carbonated water) are dispensed. In many embodiments, a diffuser 192, 194 (shown in FIGS. 13 and 14, respectively) can be used to mix the dispensed beverage fluids.

Figure 13:
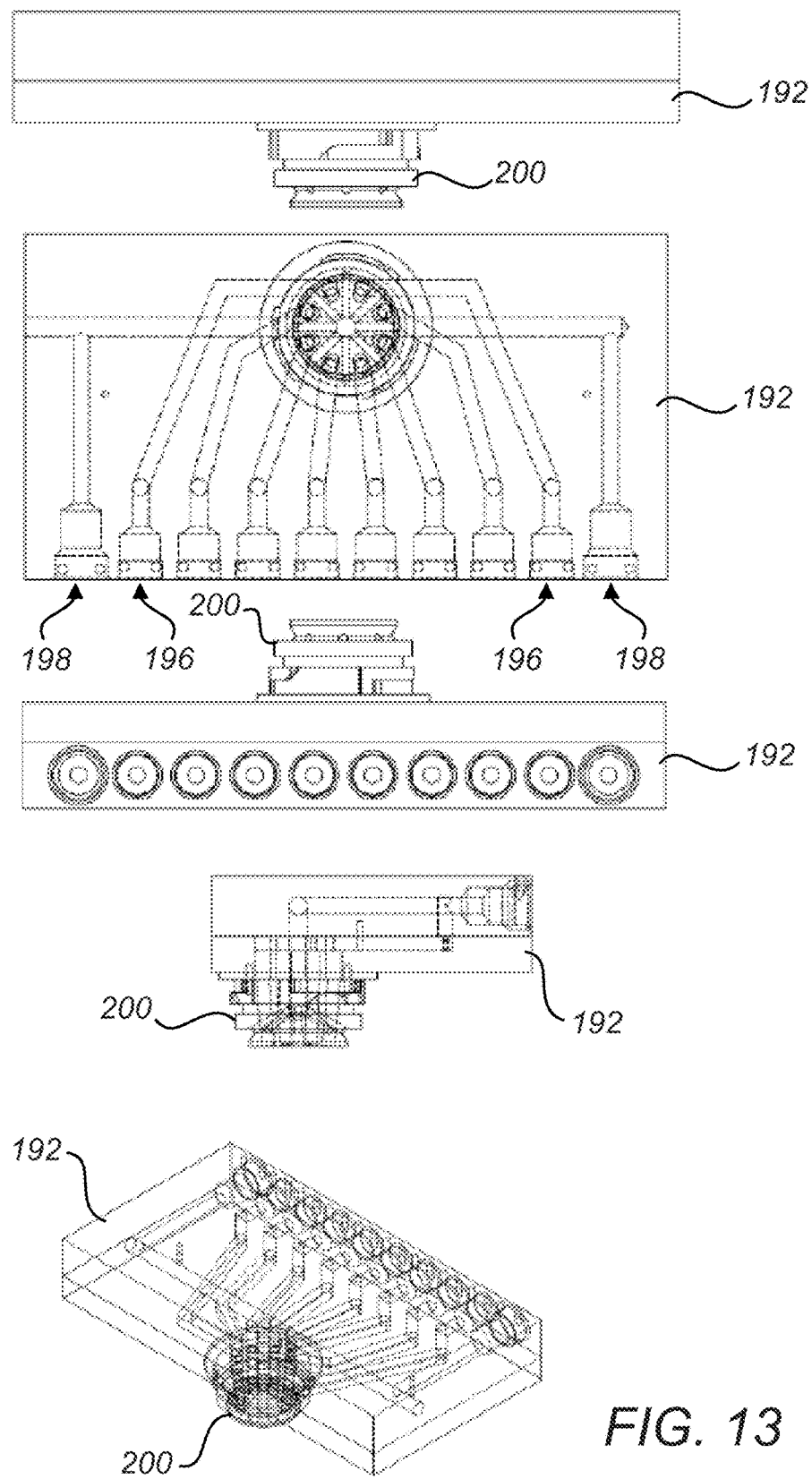
FIG. 13 illustrates views of a diffuser, in accordance with many embodiments.

FIG. 13 illustrates views of a diffuser 192, in accordance with many embodiments. The diffuser 192 includes a plurality of beverage additive fluid channels 196, and two base beverage fluid channels 198. Each of the beverage additive fluid channels 196 is configured to receive and convey a beverage additive to a nozzle 200. Each of the base beverage fluid channels 198 is configured to receive and convey a base beverage fluid (e.g., water, carbonated water) to the nozzle 200. Each of the fluid channels 196, 198 terminates at a separate dispensing orifice of the nozzle 200. The use of separate dispensing orifices may help to avoid cross contamination between the various beverage fluids (e.g., beverage additive fluids, beverage base fluids such as water, carbonated water). The diffuser 192 does not include any provisions for solenoid valves, and therefore is designed to be used in a beverage dispenser that has flow control devices located upstream of the diffuser to control the flow of the beverage additive fluids and the base beverage fluids.

Figure 14:
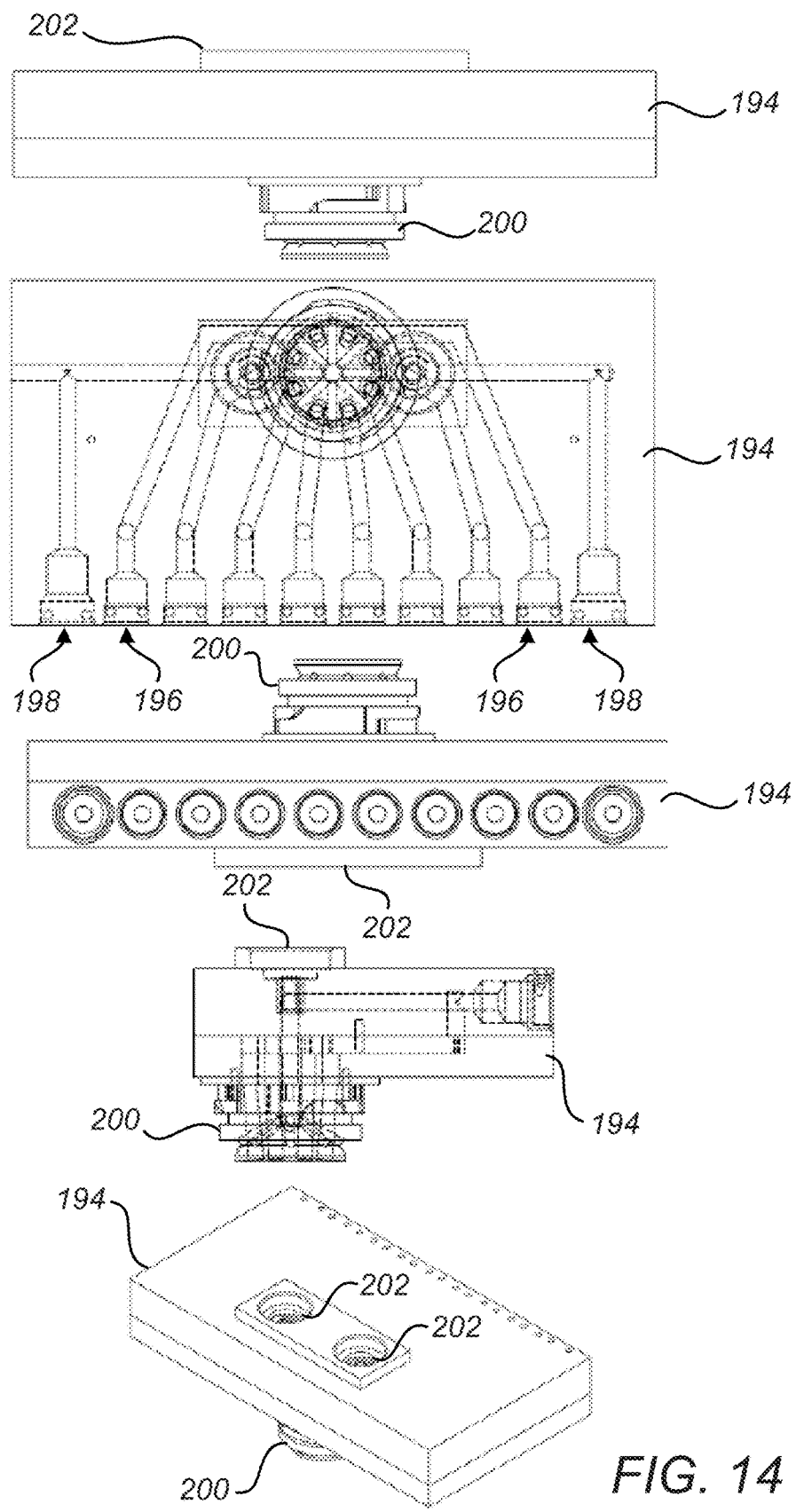
FIG. 14 illustrates views of a diffuser, in accordance with many embodiments.

FIG. 14 illustrates views of a diffuser 194, in accordance with many embodiments. The diffuser 194 is configured similar to the diffuser 192 of FIG. 13, but further includes solenoid mounting provisions 202 to mount solenoids (not shown) to control the flow of base beverage fluids (e.g., water, carbonated water) through the base beverage fluid channels 198. For example, a water solenoid valve (not shown) and a carbonated water solenoid valve (not shown) can be mounted to the diffuser 194 via the solenoid mounting provisions 202, which places the solenoid valves adjacent to the dispensing nozzle 200. Locating the carbonated water solenoid close to the dispense point may improve the level of carbonation in a carbonated beverage dispensed from a beverage dispenser. This configuration may also help control the volume of dripping following a dispensing of a beverage by preventing dripping associated with residual out-gassing of the carbonation of the carbonated water remaining in the line between the carbonated water solenoid valve and the dispense point. The flow regulators can still be located some distance away with the syrup controls.

Beverage Dispensing Methods

Figure 15:
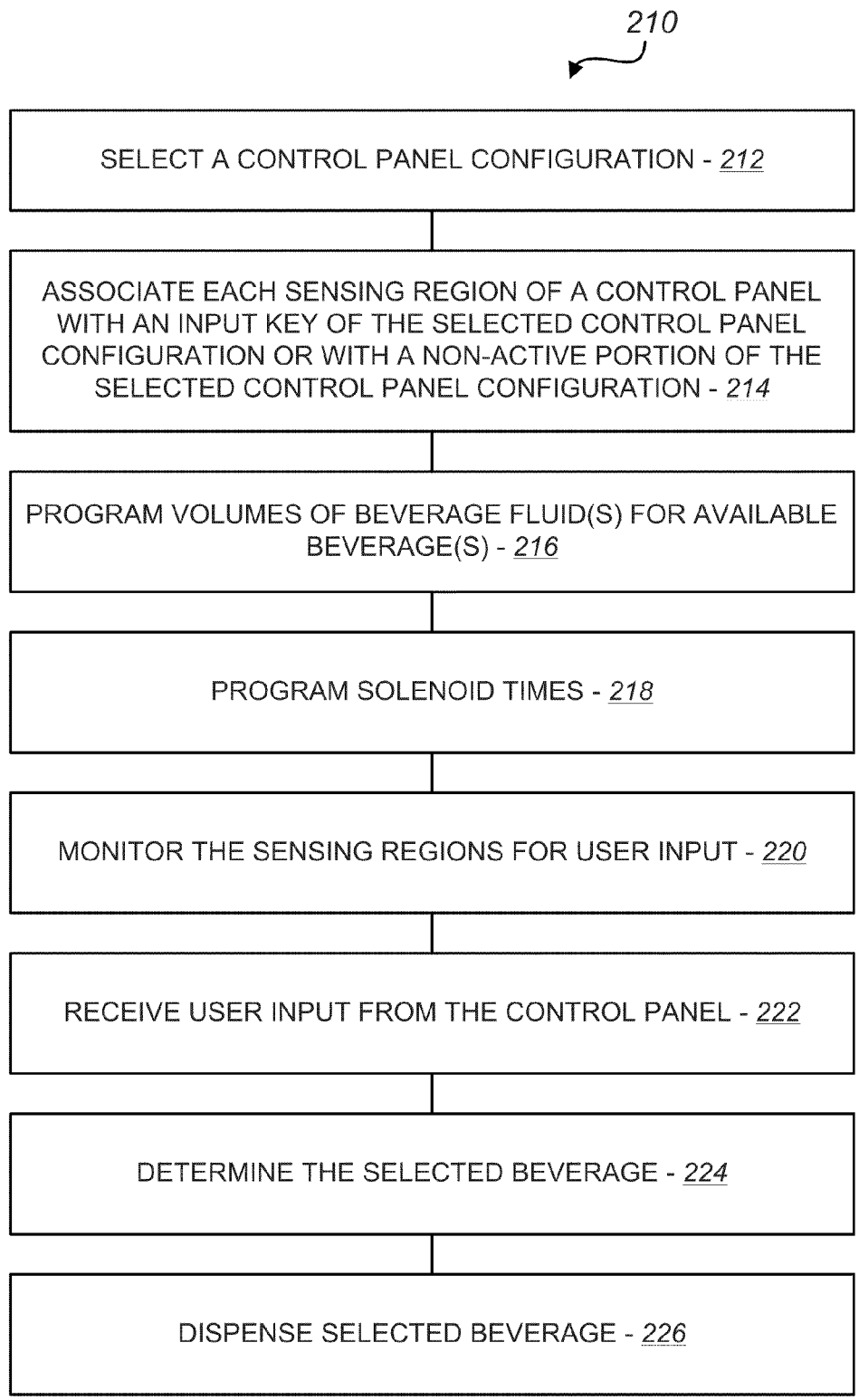
FIG. 15 is a block diagram of a method for dispensing a selected beverage, in accordance with many embodiments.

FIG. 15 illustrates a method 210 for dispensing a selected beverage, in accordance with many embodiments. The above described beverage dispensers and control systems can be configured for use in practicing the method 210. In step 212, a control panel configuration is selected. In many embodiments, the selected control panel configuration includes a plurality of input buttons to receive user input to select a beverage to dispense. In step 214, each sensing region of a control panel is associated with an input button of the selected control panel configuration or with a non-active portion of the selected control panel configuration. In step 216, volumes of beverage fluid(s) used in available beverage(s) are programmed. For example, the volume of carbonated water and the volume of a beverage additive for a carbonated beverage can be programmed into a control unit via the control panel. In step 218, the solenoid times are programmed. For example, the solenoid time for each beverage fluid in a mixed beverage can be programmed. The solenoid time programmed can include the total time that each solenoid is open, and can include any staging time used to start/stop one solenoid before/after another solenoid. In step 220, the sensing regions are monitored for a user input. For example, a control unit can be connected to the sensing regions and configured to detect when a user interacts with any active sensing region. In step 222, a user input is received from the control panel. In step 224, the selected beverage is determined. For example, the control panel can determine the selected beverage using programmed control logic and in response to the selected control panel configuration and the received user input. In step 226, the selected beverage is dispensed. For example, when the selected beverage is a mixed carbonated beverage, a beverage dispenser can be controlled to dispense the constituent beverage fluids (e.g., carbonated water and a beverage additive(s)).

Example Solenoid Valve Timings

Figure 16A:
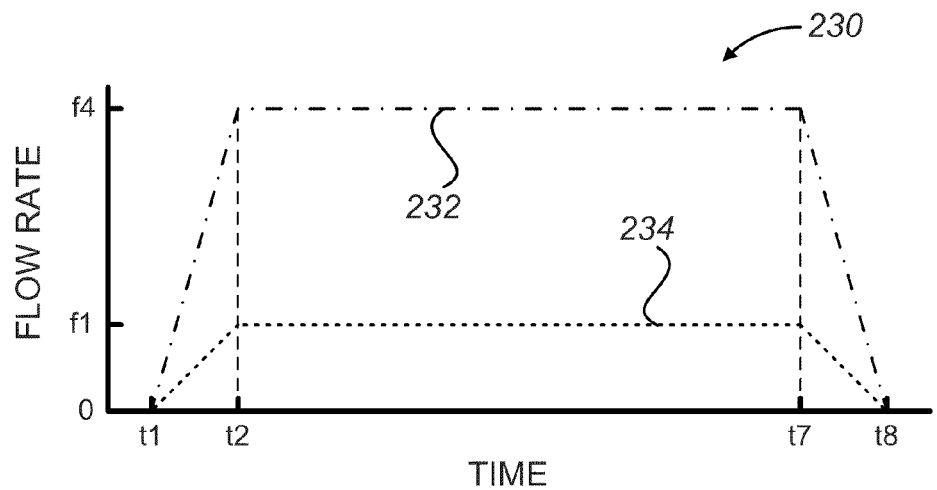
FIG. 16A illustrates a concurrent timing of solenoid valves dispensing a beverage comprising a base fluid and a beverage additive, in accordance with many embodiments.

FIG. 16A illustrates a concurrent timing 230 of solenoid valves dispensing a beverage comprising a base fluid 232 (e.g., non-carbonated water, carbonated water) and a beverage additive 234 (e.g., a flavored syrup), in accordance with many embodiments. In the concurrent timing 230, the solenoid valves for both the base fluid 232 and the beverage additive 234 start to open at time (t1), are fully open at time (t2), start to close at time (t7), and are fully closed at time (t8). The flow rate of the base fluid 232 begins at zero at time (t1), ramps up to a flow rate (f4) at time (t2), is constant at flow rate (f4) between time (t2) and time (t7), and ramps down to zero at time (t8). Similarly, the flow rate of the beverage additive 234 begins at zero at time (t1), ramps up to a flow rate (f1) at time (2), is constant at flow rate (f1) between time (t2) and time (t7), and ramps down to zero at time (t8). The times and the flow rates can be selected to dispense appropriate quantities of the base fluid 232 and the beverage additive 234 at appropriate flow rates. The concurrent timing 230 may provide for uniform mixing between the base fluid 232 and the beverage additive 234.

Figure 16B:
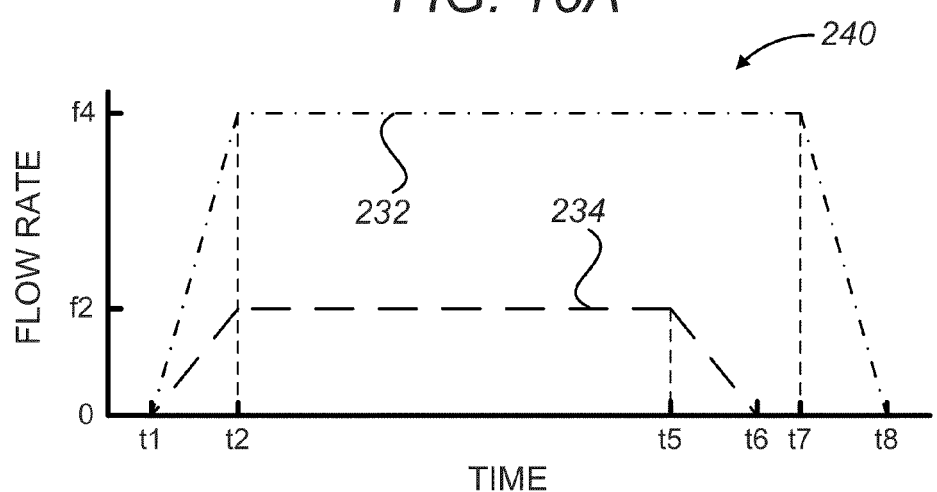
FIG. 16B illustrates a non-concurrent timing of solenoid valves dispensing a beverage comprising a base fluid and a beverage additive, in accordance with many embodiments.

FIG. 16B illustrates a non-concurrent timing 240 of solenoid valves dispensing the beverage comprising the base fluid 232 and the beverage additive 234, in accordance with many embodiments. In the non-concurrent timing 240, the solenoid valves for both the base fluid 232 and the beverage additive 234 start to open at time (t1), are fully open at time (t2), but close at different times. The solenoid valve for the beverage additive 234 closes before the solenoid valve for the base fluid 232. The solenoid valve for the beverage additive 234 starts to close at time (t5) and is fully closed at time (t6). The solenoid valve for the base fluid 232 starts to close at time (t7) and is fully closed at time (t8). The flow rate of the base fluid 232 begins at zero at time (t1), ramps up to a flow rate (f4) at time (t2), is constant at flow rate (f4) between time (t2) and time (t7), and ramps down to zero at time (t8). Similarly, the flow rate of the beverage additive 234 begins at zero at time (t1), ramps up to a flow rate (f2) at time (t2), is constant at flow rate (f2) between time (t2) and time (t5), and ramps down to zero at time (t6). The times and the flow rates can be selected to dispense appropriate quantities of the base fluid 232 and the beverage additive 234 at appropriate flow rates. The non-concurrent timing 240 provides a period of time (between time (t6) and time (t8)) where only the base fluid 232 is being dispensed, which may help to reduce possible cross-contamination of a dispensed beverage by a previously dispensed beverage, especially in beverage dispensers in which the base fluid 232 and the beverage additive 234 are mixed prior to being discharged from a common orifice.

Figure 16C:
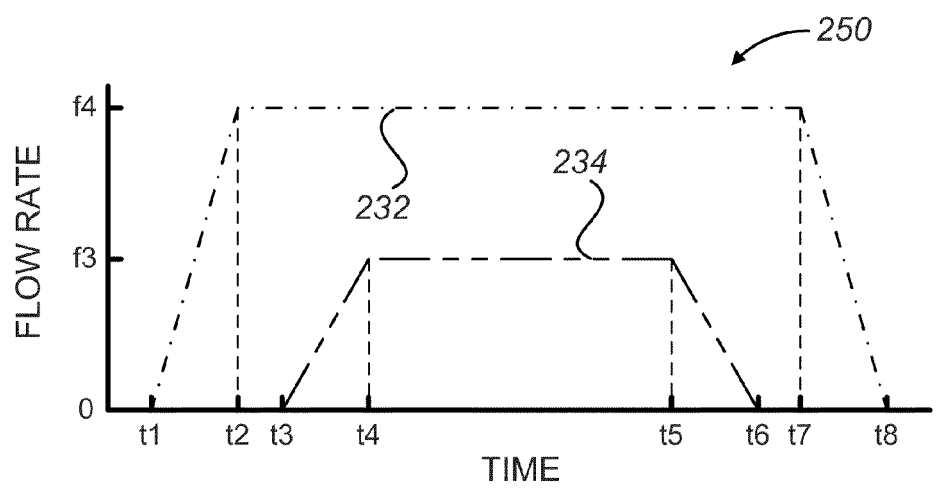
FIG. 16C illustrates another non-concurrent timing of solenoid valves dispensing a beverage comprising a base fluid and a beverage additive, in accordance with many embodiments.

FIG. 16C illustrates a non-concurrent timing 250 of solenoid valves dispensing the beverage comprising the base fluid 232 and the beverage additive 234, in accordance with many embodiments. In the non-concurrent timing 250, the solenoid valves for the base fluid 232 and the beverage additive 234 open and close at different times. The solenoid valve for the base fluid 232 starts to open first at time (t1), is fully open at time (t2), starts to close at time (t7), and is fully closed at time (t8). The solenoid valve for the beverage additive 234 starts to open first at time (t3), is fully open at time (t4), starts to close at time (t5), and is fully closed at time (t6). The flow rate of the base fluid 232 begins at zero at time (t1), ramps up to a flow rate (f4) at time (t2), is constant at flow rate (f4) between time (t2) and time (t7), and ramps down to zero at time (t8). Similarly, the flow rate of the beverage additive 234 begins at zero at time (t3), ramps up to a flow rate (f3) at time (t4), is constant at flow rate (f3) between time (t4) and time (t5), and ramps down to zero at time (t6). The times and the flow rates can be selected to dispense appropriate quantities of the base fluid 232 and the beverage additive 234 at appropriate flow rates. The non-concurrent timing 250 provides a period of time (between time (t6) and time (t8)) where only the base fluid 232 is being dispensed, which may help to reduce possible cross-contamination of a dispensed beverage by a previously dispensed beverage, especially in beverage dispensers in which the base fluid 232 and the beverage additive 234 are mixed prior to being discharged from a common orifice. The non-concurrent timing 250 also provides a period of time (between time (t1) and time (t3)) at the start of the dispensing cycle where only the base fluid 232 is being dispensed. The non-concurrent timing 250 can be used, for example, to dispense a small amount of additive, such as a vitamin supplement or highly concentrated flavoring. The benefit would be to inject such an amount during the "middle" of the dispense period to achieve optimal mixing versus placing such a small amount of additive in the bottom or top section of the cup.

Example Touch Screen Control Panel

Figure 17A:
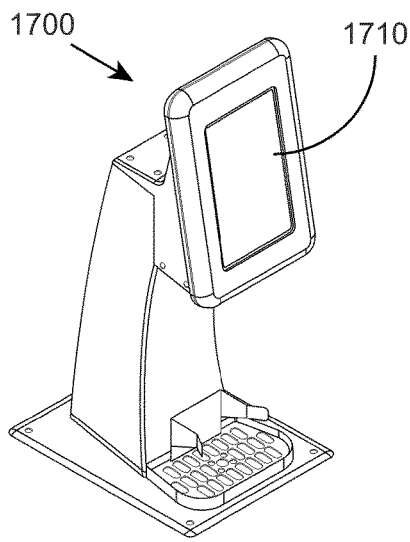
FIGS. 17A and 17B illustrate front and rear perspective views, respectively, of a remote beverage tower with a touch screen interface, according to an embodiment of the invention.
Figure 17B:
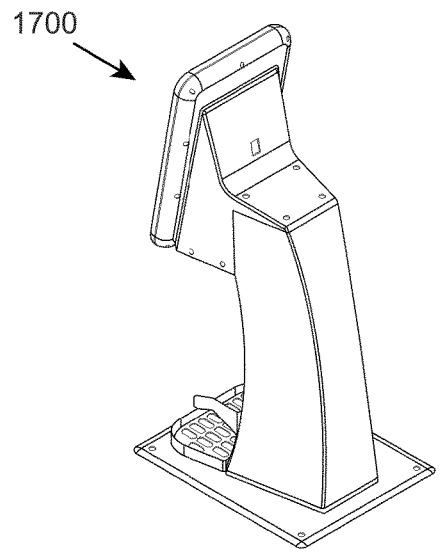
Figure 17C:
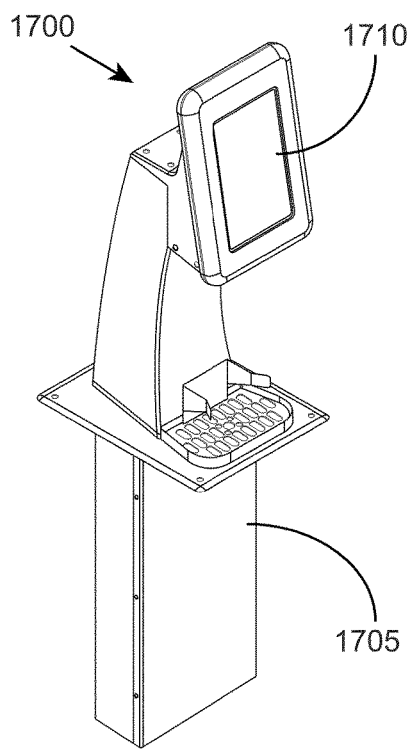
FIGS. 17C and 17D illustrate front and rear perspective views, respectively, of a integrated beverage tower with a touch screen interface, according to an embodiment of the invention.
Figure 17D:
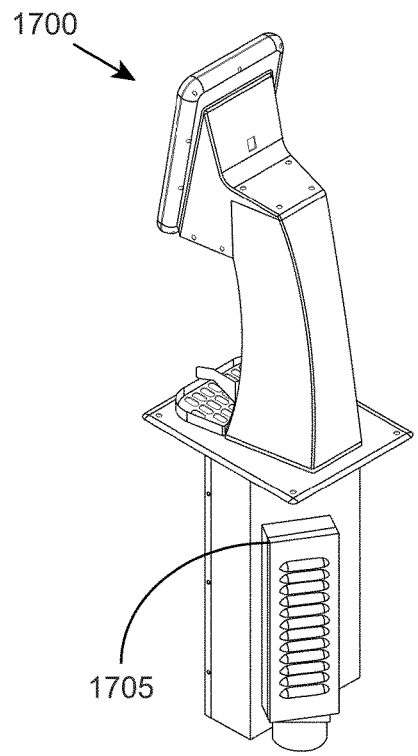

FIGS. 17A-17D illustrate views of beverage dispensers 1700, according to embodiments of the invention. Additional views are shown in the attached appendix of U.S. Provisional Application No. 61/358,858, which was previously incorporated by reference herein. The beverage dispensers may have remote towers, as shown in FIGS. 17A and 17B, which are separated from a plurality of beverage dispensing valves. Alternatively, the beverage dispensers may have integrated towers 1705, as shown in FIGS. 17C and 17D, which share a common greater housing with a plurality of beverage dispensing valves.

The beverage dispensers 1700 include touch screens 1710 for use as control panels. It should be understood that the touch screens 1710 described and shown herein are intended to be modularly compatible with the beverage dispensing systems described herein. For example, these touch screens 1710 can be used in lieu of or in conjunction with the reconfigurable control panel 28. These touch screens can be electrically coupled to a controller, such as the control system 70, to provide user inputs thereto.

Many different types of touch screens 1700 may be used in accordance with the embodiments described herein. Some examples of touch screens 1700 include resistive, capacitive, surface acoustic wave, infrared, strain gage (i.e., force panel), optical, dispersive signal, acoustic pulse, and coded LCD. Touch screens 1700 are generally attached to a beverage dispenser housing as shown. Generally, the touch screens 1700 should be compatible with a food serving environment and be resistant to liquids and common kitchen cleaning chemicals.

Figure 18A:
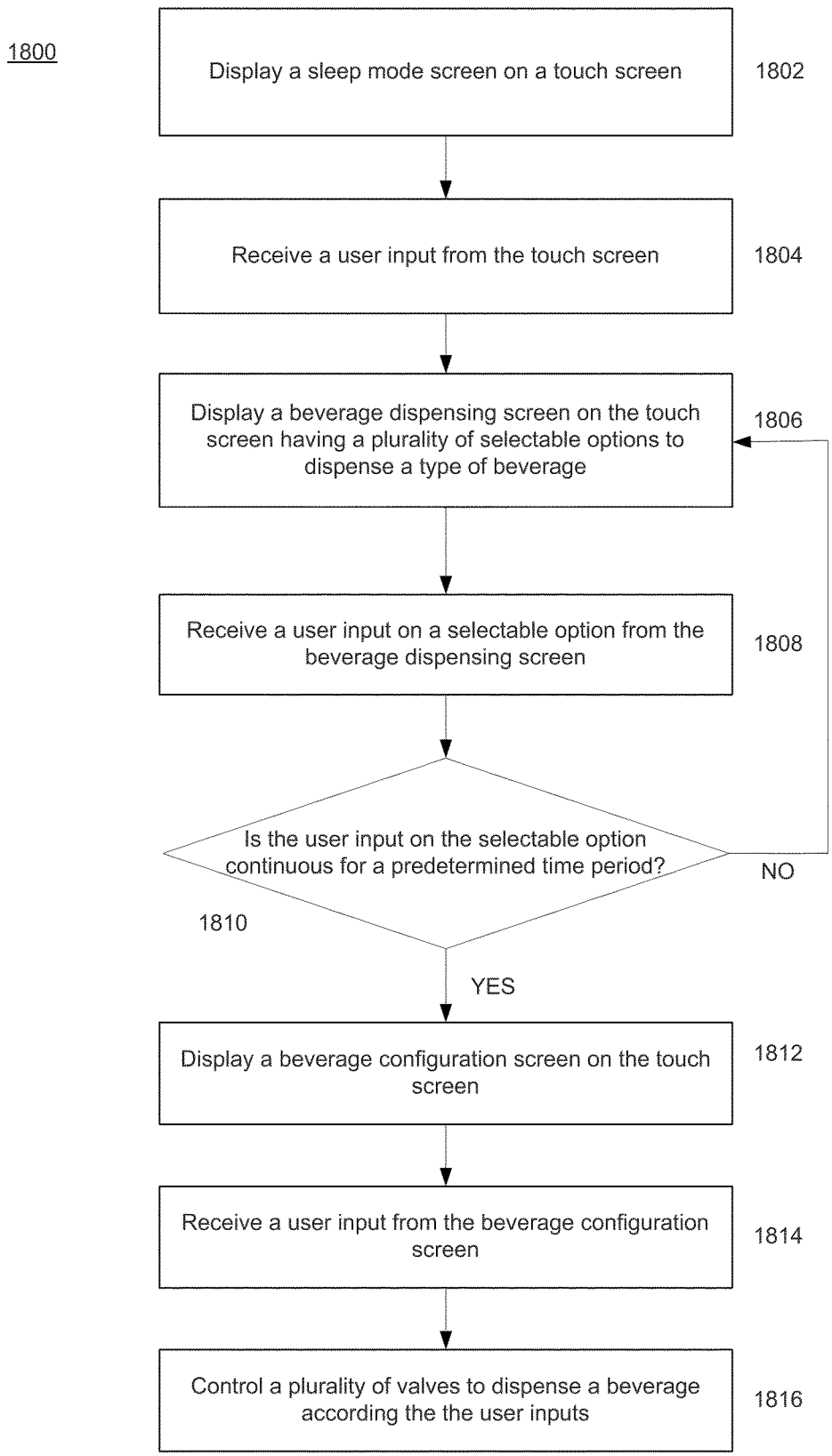
FIG. 18A illustrates a method of controlling a beverage dispensing machine to dispense a beverage, according to an embodiment of the invention.
Figure 18B:
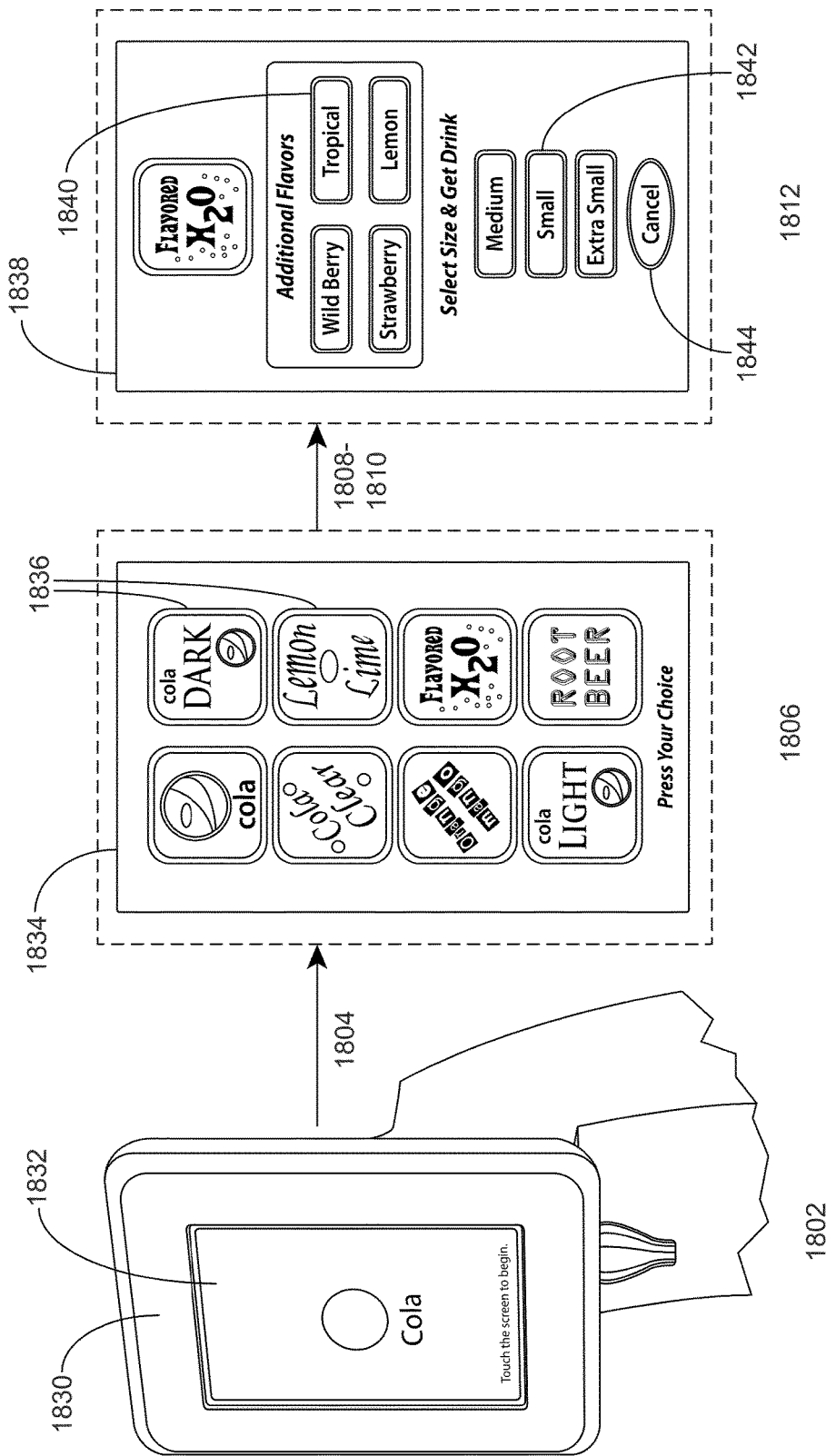
FIG. 18B illustrates a graphical embodiment of the method of FIG. 18A.

FIGS. 18A and 18B show a flow chart and images of a method 1800, according to an embodiment of the invention.

At operation 1802, a sleep mode screen is displayed on a touch screen 1830 of a beverage dispensing machine. During sleep mode, a graphical configuration 1832 is sent to the touch screen 1830 from an electrically coupled control unit for display thereon. The graphical configuration 1832 can include, for example, an advertising logo or instructions displayed in a stationary or animated pattern. The sleep mode graphical configuration can include a plurality of different images which are displayed in succession.

At operation 1804, a user touches the touch screen 1830 which causes a command signal to be sent to the control unit. In response to the received command signal, at operation 1806 the control unit sends a new graphical configuration to the touch screen. The new graphical configuration is a beverage dispensing screen 1834 which includes a plurality of selectable options. The options may be configured as discernable buttons 1836 that indicate different kinds of beverages. In the example shown in FIG. 18B, eight discernable buttons 1836 are shown, although more or less may be used depending on a desired amount of dispensable beverages.

It should be understood, that a "button" with respect to the touch screen is intended to mean a zone on the touch screen which is predetermined to respond to a touch by a user. For example, the entirety of the touch screen may be considered a button when the sleep mode is displayed, while only select portions of the beverage dispensing screen are considered buttons. Buttons may be discernable or non-discernable to a user, i.e., visible or invisible from surrounding graphics.

Further options may be configured as non-visible buttons that are invisible to the user, i.e., non-discernable from background images. These hidden buttons may be selected by those knowledgeable of their existence, to cause the control unit to enter into different configuration modes.

At operation 1808, the control unit receives a signal indicating that the user has selected one of the discernable buttons 1836 for dispensing a type of beverage. The user may select a desired beverage type by physically placing a body part, such as a finger, against one of the discernable buttons. In some embodiments, the control unit will revert the touch screen 1830 back to the sleep mode screen if no user signal is received after a predetermined amount of time has passed, for example after 30 seconds.

At operation 1810, it is determined by the control unit whether the selection of the button 1836 was continuously applied for a predetermined length of time, for example two seconds, in order for the control unit to positively determine that selection of the button is intended. This determination can be useful to avoid selection and dispensing of beverages from accidental user inputs made to the touch screen 1830.

At operation 1812, a new graphical configuration is sent from the control unit for display on the touch screen 1830. The new graphical configuration is a beverage configuration screen 1838. The beverage configuration screen 1838 can provide further beverage dispensing options available to the user to customize a beverage. In some embodiments, the beverage configurations screen can include a plurality of discernable buttons 1840 for adding various types of additional flavoring to the originally selected beverage. In some embodiments, the beverage configurations screen includes a plurality of discernable buttons 1842 for selecting the volume of beverage (i.e., cup size) to be dispensed. In some embodiments, the beverage configurations screen includes a cancel button 1844 which can cause the control unit to revert back to the sleep mode screen 1832, beverage dispensing screen 1834, or to reset the options selected on the beverage configuration screen 1838. In some embodiments, the beverage configuration screen 1838 includes an acceptance button which confirms all selections made by the user on the beverage configuration screen 1838.

In some embodiments, aspects of the beverage configuration screen 1838 are integrated into the beverage dispensing screen 1834, and thus the selectable beverage configuration screen 1838 is not implemented as a separate screen. In some embodiments, the selectable beverage configuration screen 1838 is not used, for example, when no additional flavorings are available, when only one beverage volume is offered, and/or when a beverage cup size sensor is used to determine the volume of dispensed beverage with no required user input to the touch screen.

At operation 1814, the control unit receives a further command signal from the beverage configuration screen 1838 which indicates that a complete beverage selection has been made. In response, the control unit controls a plurality of beverage dispensing valves at operation 1816 to dispense the selected beverage at a predetermined rate of time and according to a predetermined volume, from the beverage dispensing machine. The control unit may also control the plurality of beverage dispensing valves according to the selected options made on the beverage configuration screen 1838.

Figure 18C:
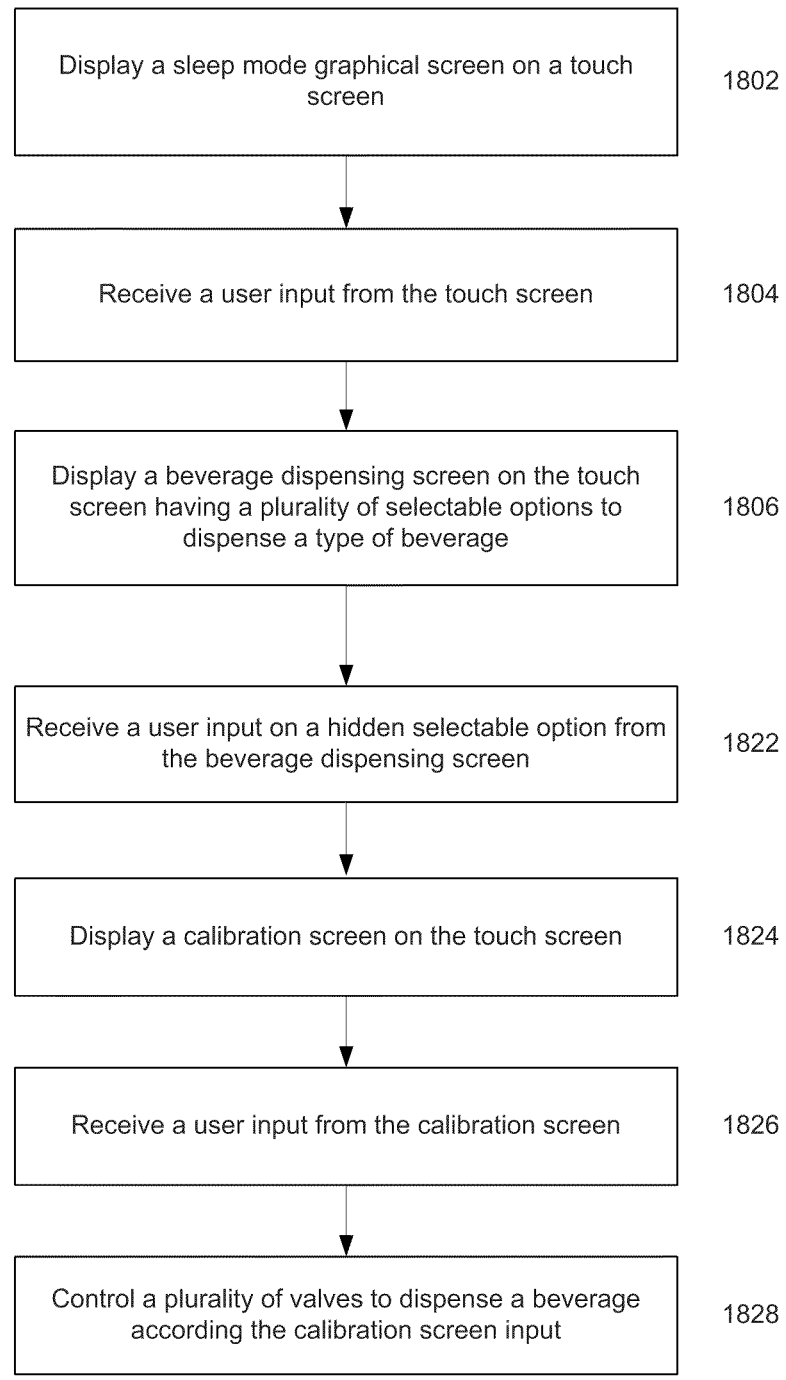
FIG. 18C illustrates a method of controlling a beverage dispensing machine for calibration, according to an embodiment of the invention.
Figure 18D:
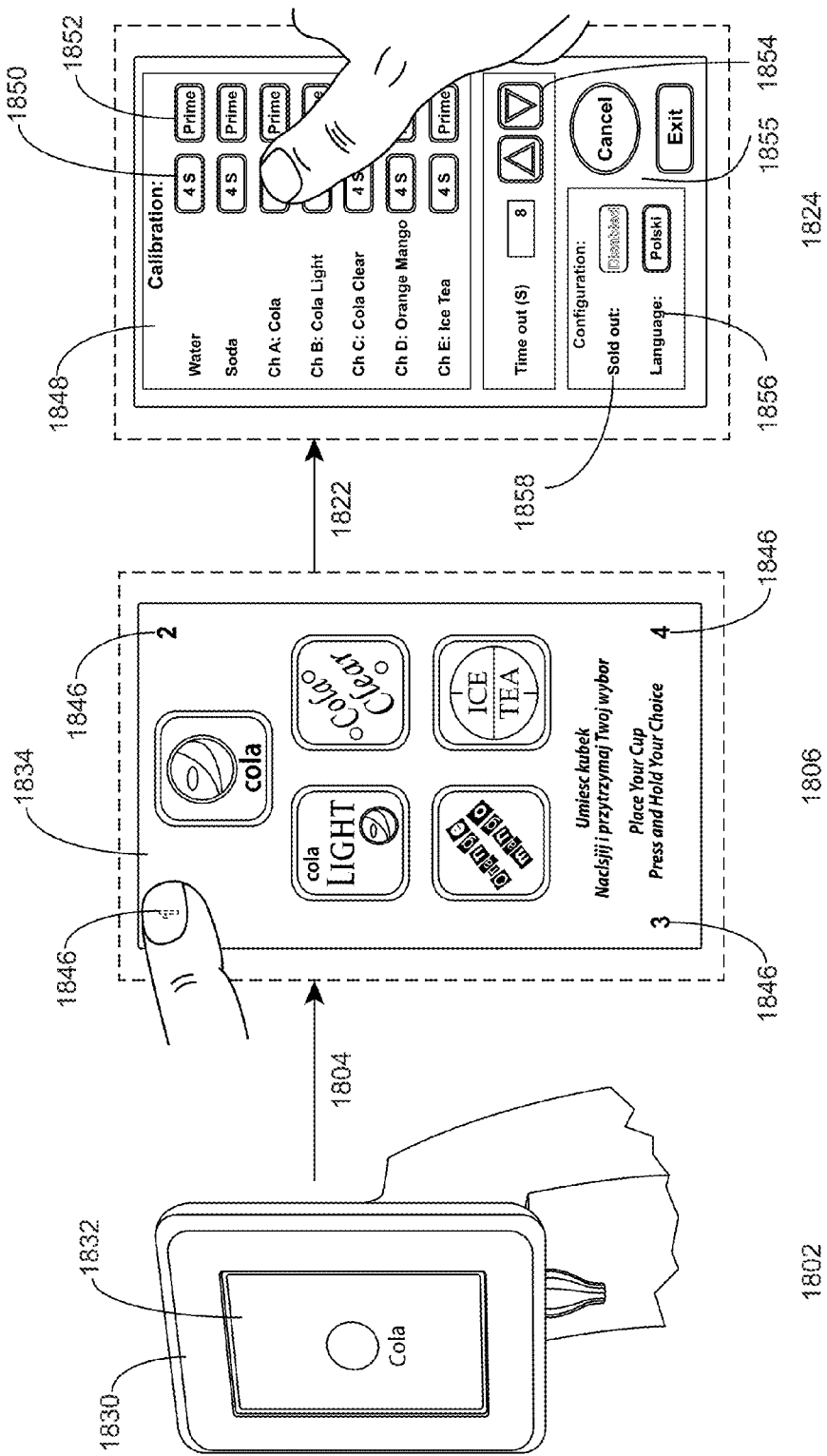
FIG. 18D illustrates a graphical embodiment of the method of FIG. 18C.

FIGS. 18C and 18D show a flow chart and respective images of a method 1820, according to an embodiment of the invention. Additional examples are shown in the appendix of U.S. Provisional Application No. 61/358,858. Shown operations 1802-1806 are generally performed as recited with respect to method 1800, which are not repeated here for the sake of brevity.

At operation 1822, the control unit receives a command signal indicating the selection of or more hidden buttons 1846, as described above. These hidden buttons 1846 are generally indiscernible from background images that are displayed on the touch screen 1830. These hidden buttons are shown in FIG. 18D as numerals 1-4, but it should be understood that these numerals are for explanatory purposes only, and are not displayed with respect to the embodiment shown. In some embodiments, the plurality of hidden buttons 1846 must be selected in a predetermined pattern/order and within a predetermined amount of time in order for the command signal to be accepted by the control unit.

In some embodiments, hidden buttons 1846 are not used and the command signal is achieved by selecting the discernable buttons in a predetermined pattern/order and within a predetermined amount of total time. In some embodiments, a combination of hidden and discernable buttons is used to provide the command signal to the control unit. It should be understood that the command signal is achieved by selecting a hidden option, whether the buttons are discernable or hidden, that is not readily apparent to a non-knowledgeable (i.e., consumer, low-level employee) user of the beverage dispensing machine.

At operation 1824, a calibration screen 1848 is sent by the control unit for display on the touch screen 1830 in response to the command signal. In some embodiments, pricing buttons 1850 are displayed to control the plurality of valves to prime individual dispensing lines. The priming buttons 1850 are used to continuously dispense a selected beverage from the beverage dispensing machine, primarily for priming the beverage lines or for cleaning purposes. In some embodiments, timed burst buttons 1852 are displayed to dispense specific beverages for short periods of time, for example four seconds. The user can then check to make sure the dispensed volume over the four seconds is at a specified amount, and adjust associated valves as necessary.

In some embodiments, time-out buttons 1854 are displayed to adjust the predetermined amount of time the control unit will allow a user to dispense a beverage when portion control is not used. In some embodiments, cancel and exit buttons 1855 are displayed to cancel and/or exit the calibration screen 1848 to revert the touch screen 1830 back to the sleep mode screen 1832 or the beverage dispensing screen 1834. In some embodiments, a language button 1856 is provided to change the displayed language. In some embodiments, a sold-out button 1858 is displayed to enable or disable an indication on the beverage dispensing screen 1834 that a beverage type is unavailable. In some embodiments, the control unit will revert the touch screen 1830 back to the sleep mode screen 1832 or the beverage dispensing screen 1834 if no user signal is received after a predetermined amount of time, for example 60 seconds.

At operation 1826, the control unit receives a further command signal from the calibration screen 1838 which indicates that a desired selection has been made. In response, at operation 1828, the control unit controls a plurality of beverage dispensing valves to dispense the selected beverage from the beverage dispensing machine.

Figure 19A:
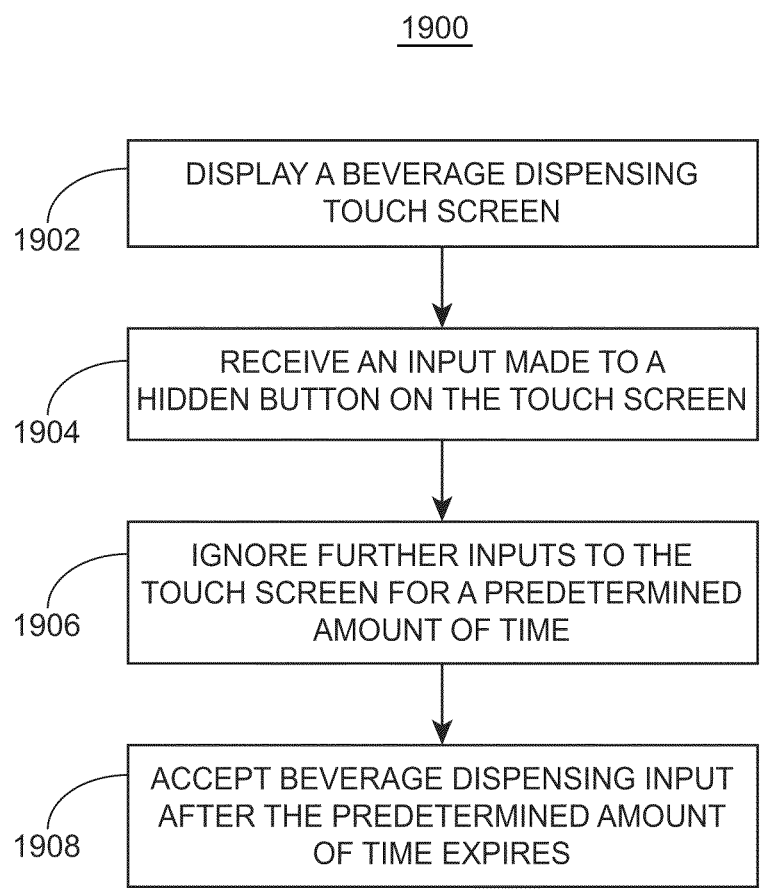
FIG. 19A illustrates a method of controlling a beverage dispensing machine to allow for screen cleaning, according to an embodiment of the invention.
Figure 19B:
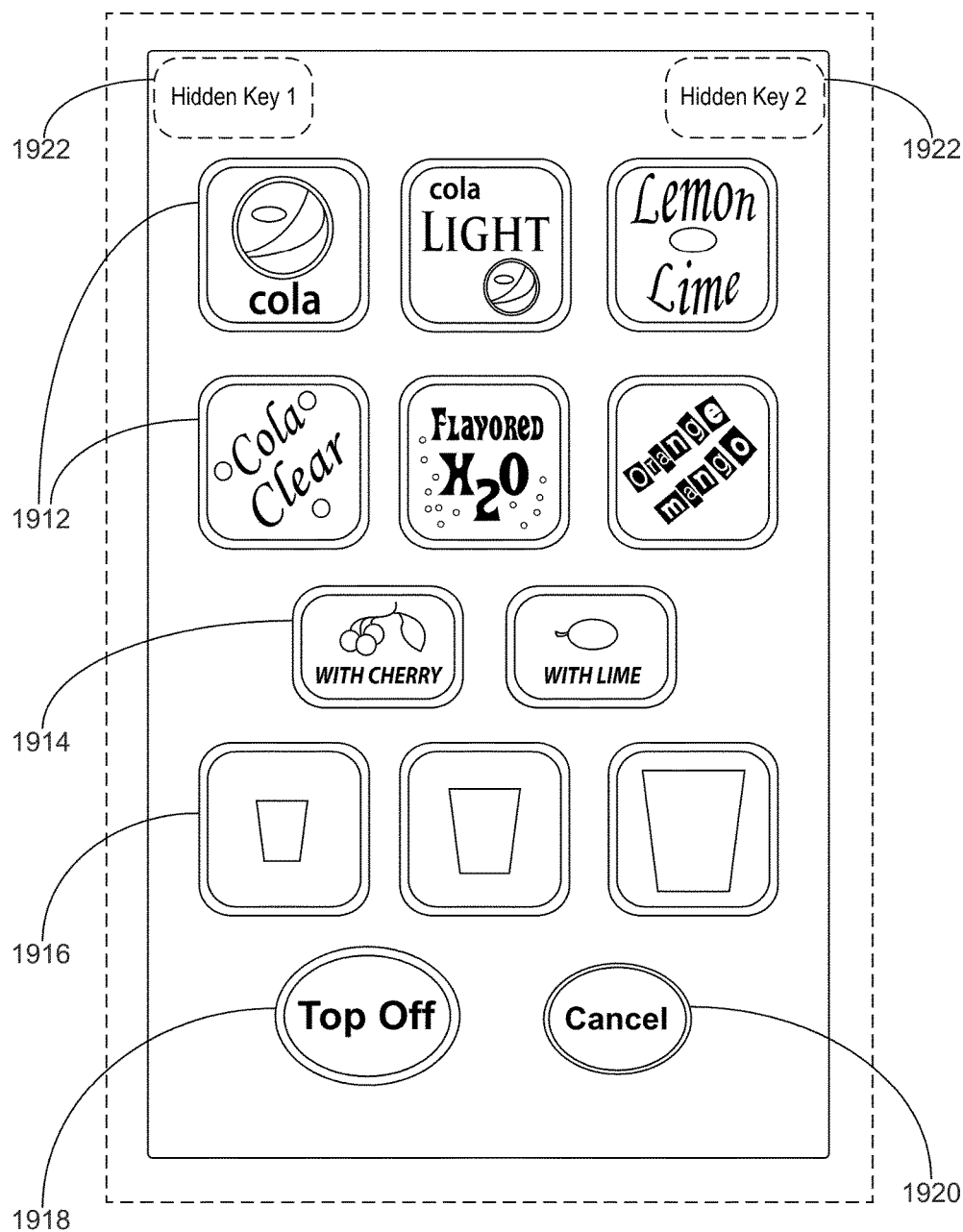
FIGS. 19C and 19B illustrate graphical embodiments of the method of FIG. 19A.
Figure 19C:
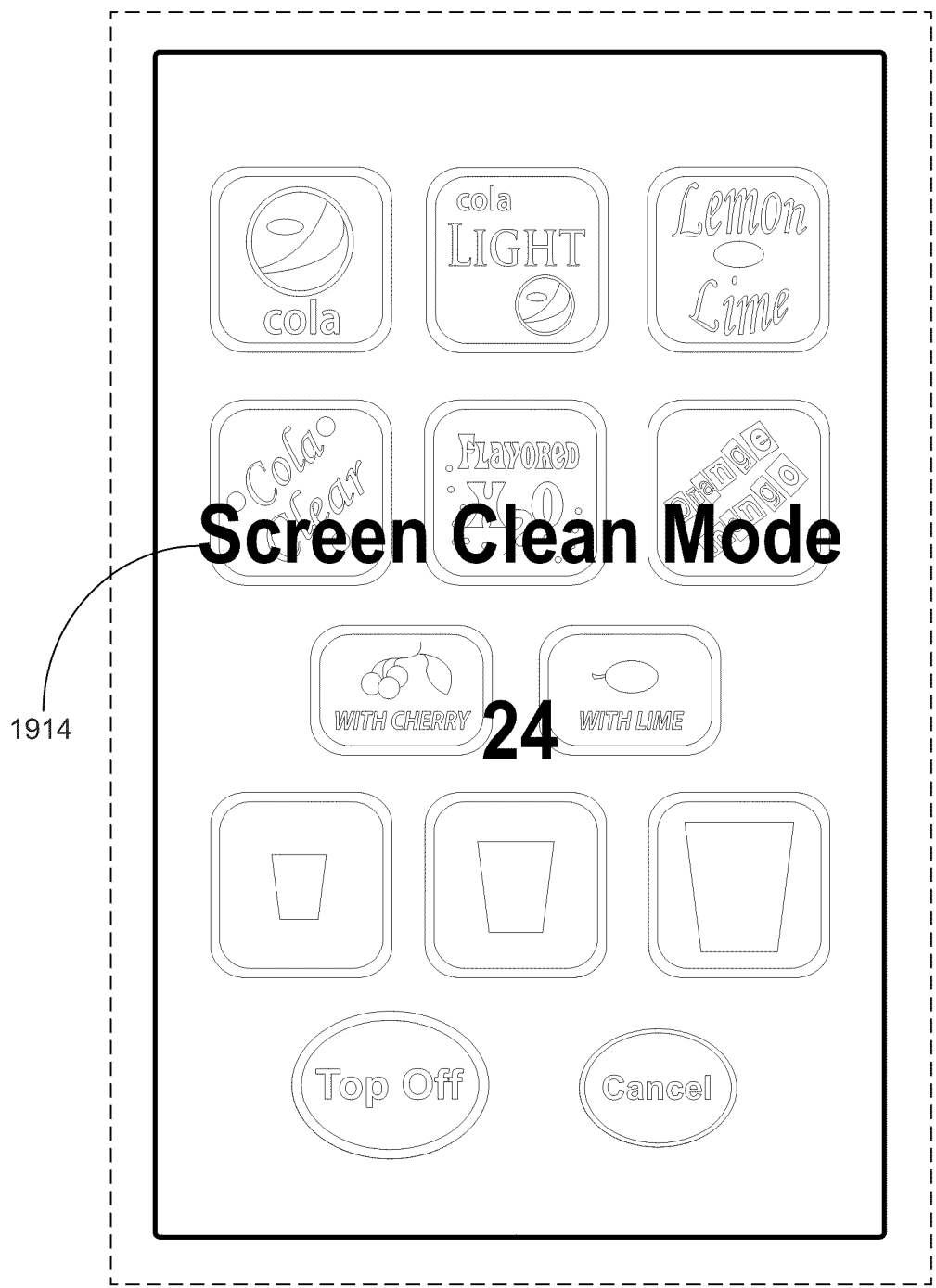

Screen Cleaning Mode:

FIG. 19A shows a method 1900, which is shown in use in exemplary screenshots of FIGS. 19B-19C, according to embodiments of the invention. At operation 1902, a beverage dispensing screen is displayed on a touch screen by a control unit, which is electronically coupled to the touch screen, as well as a plurality of dispensing valves. Examples of such beverage dispensing systems are shown throughout the instant disclosure.

Such a screen is shown in FIG. 19B, which displays a graphical configuration including beverage selection buttons 1912, flavor addition buttons 1914, beverage portion buttons 1916, a top-off button 1918, and a cancel button 1920. In this embodiment, a single screen is used for all beverage dispensing options, as opposed to the multiple screen embodiments disclosed herein. Hidden buttons 1922 are also shown. The hidden buttons 1922 represent non-discernable areas of the graphical configuration that respond to user inputs. Two buttons 1922 are shown, however, more or less may be used.

At operation 1904, an input is applied to at least one of the hidden buttons 1922. The user input may be required to be continuously applied for a specific time interval and/or applied as a pattern of user inputs to one or both of the buttons 1922. The control unit receives the user inputs and determines whether the user inputs are properly entered to enter a screen cleaning mode.

At operation 1906, the control unit has determined that the user input was appropriate and assumes a screen-cleaning mode. In this mode, further user inputs applied the touch screen are ignored by the control unit for a predetermined time period, such as a 30 second time interval. This allows a user to physically clean the touch screen, which can accumulate with food contaminates due to being in a restaurant environment, without causing unintended beverage dispensing. An animated count-down 1924 may appear during the screen-cleaning mode, as shown in FIG. 19C. When the time period ends, the screen may once again accept user inputs to dispense beverages in operation 1908.

Figure 20A:
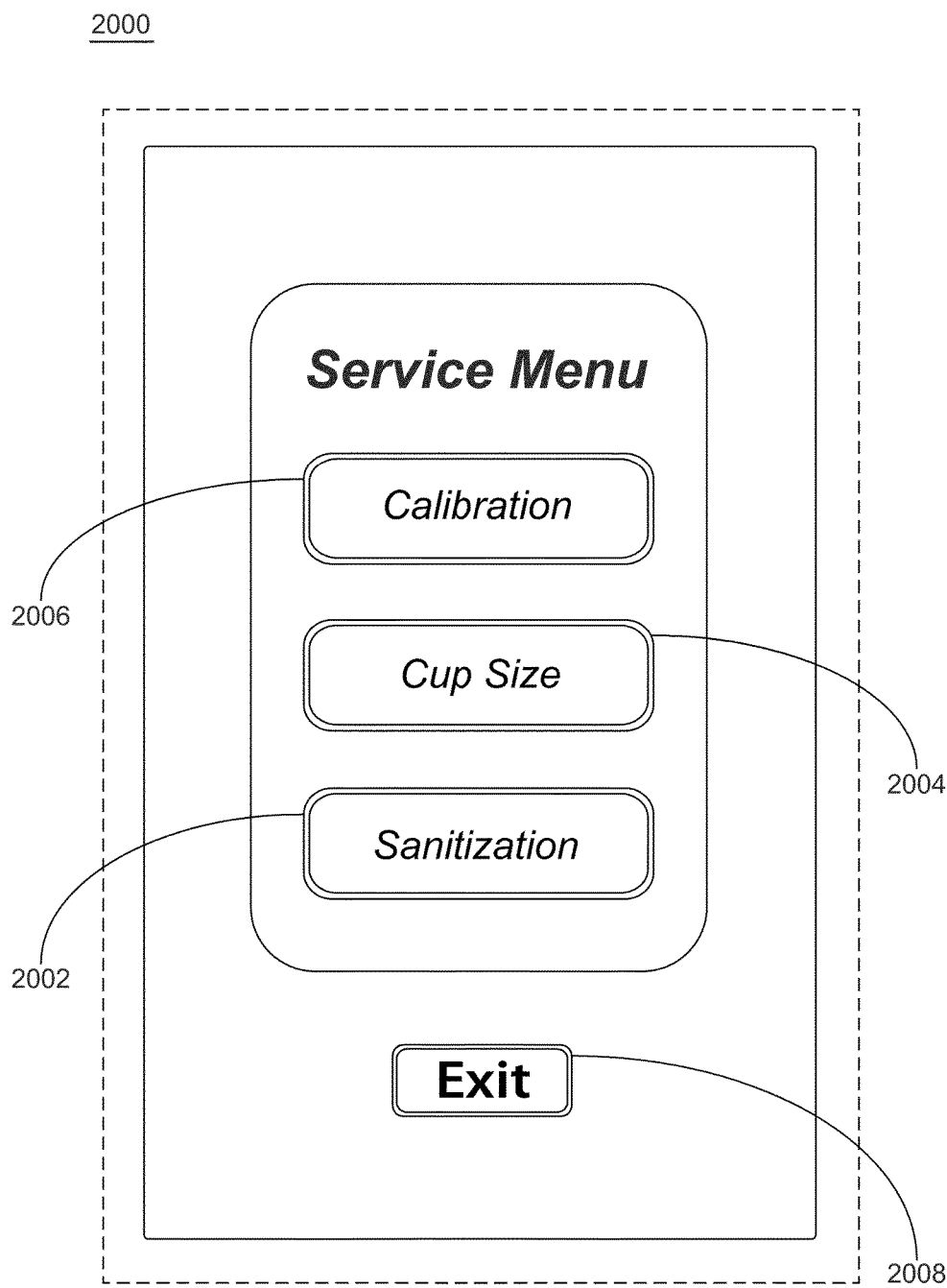
FIG. 20A illustrates a graphical depiction of a service menu screen, according to an embodiment of the invention.

Service Menu:

FIG. 20A shows a screen shot of a graphical configuration for a service menu 2000 displayed on a touch screen of a beverage dispensing system, according to an embodiment of the invention. User inputs from the touch screen are sent to a control unit. A user may enter into the service menu 2000 from a beverage dispensing menu via hidden buttons or by other methods, as disclosed herein. In the graphical configuration 2000, various buttons are displayed for entering into service submenus. Here, a sanitizing button 2002, a cup size button 2004, and a calibration menu button 2006 are shown, although more or less buttons can be displayed according to a configuration of an individual beverage dispensing system.

Figure 20B:
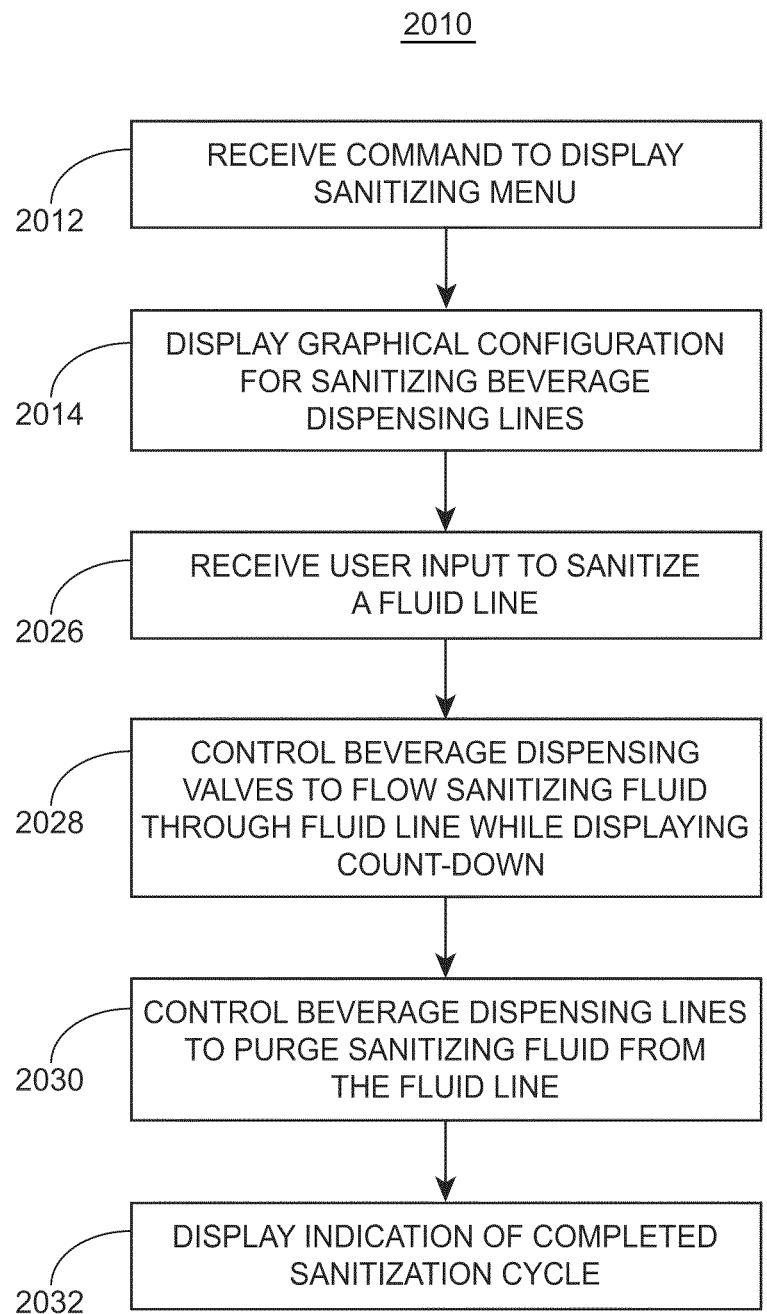
FIG. 20B illustrates a method of controlling a beverage dispensing machine to perform a sanitizing process, according to an embodiment of the invention.
Figure 20C:
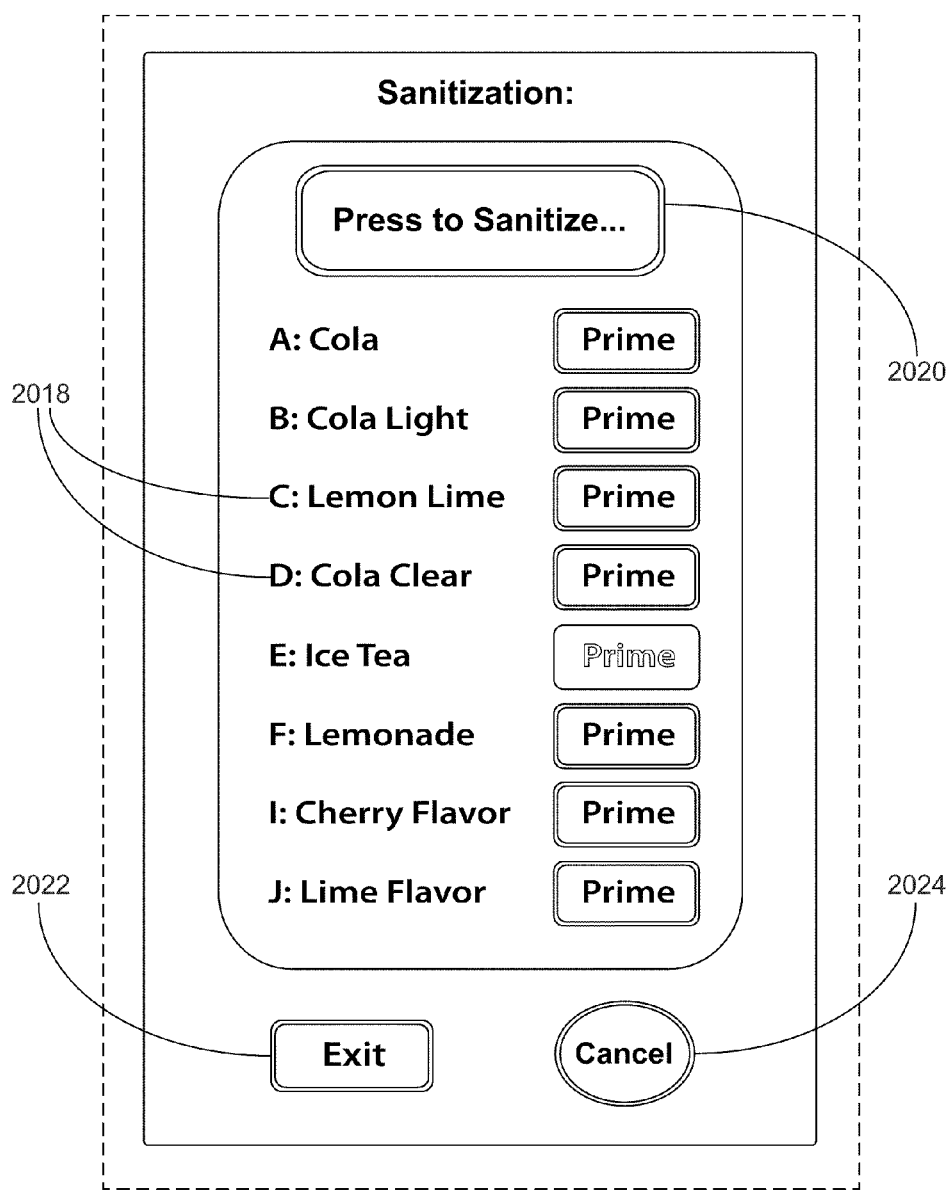
FIGS. 20C through 20E illustrate graphical embodiments of the method of FIG. 20B.
Figure 20D:
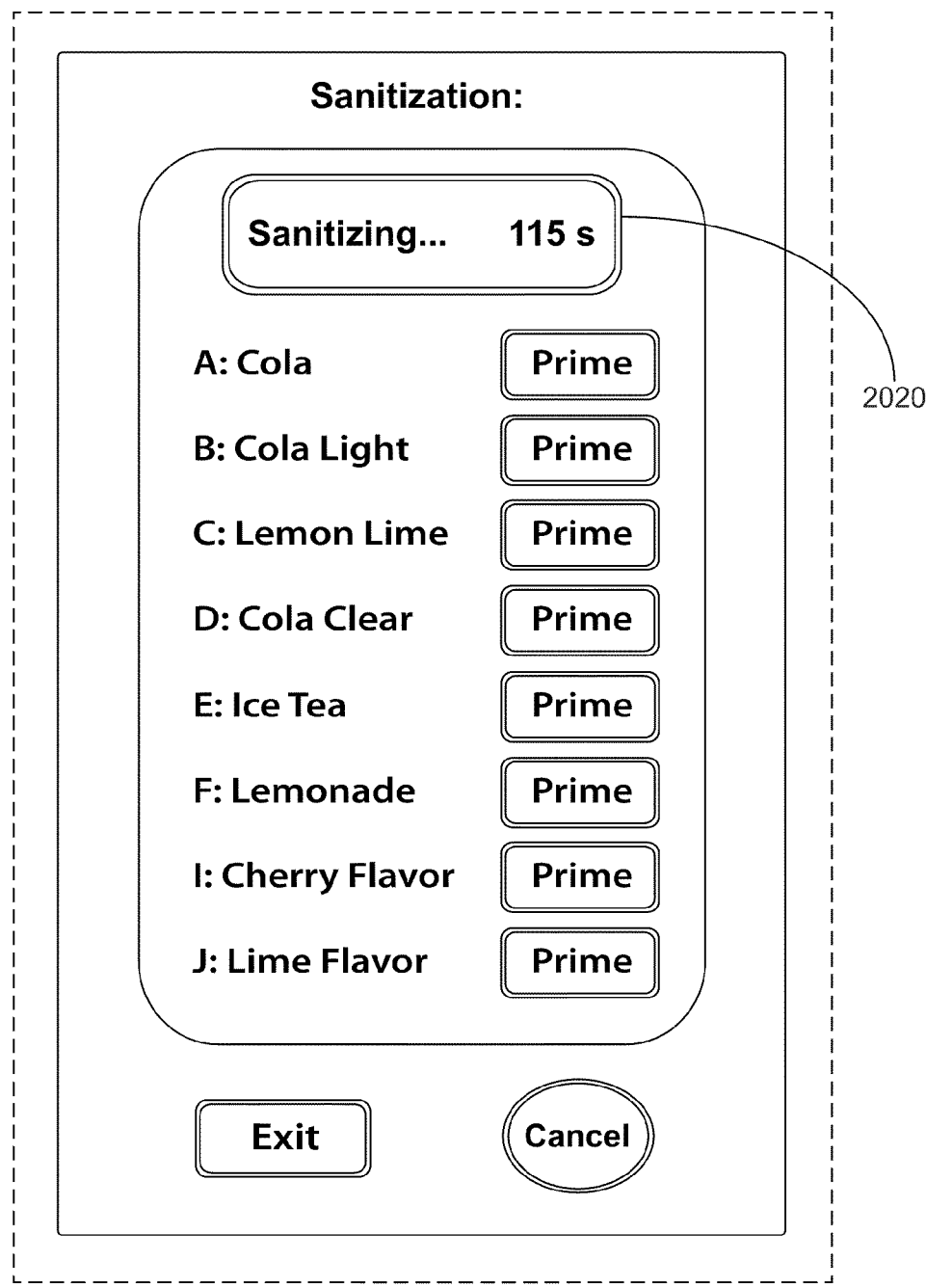
Figure 20E:
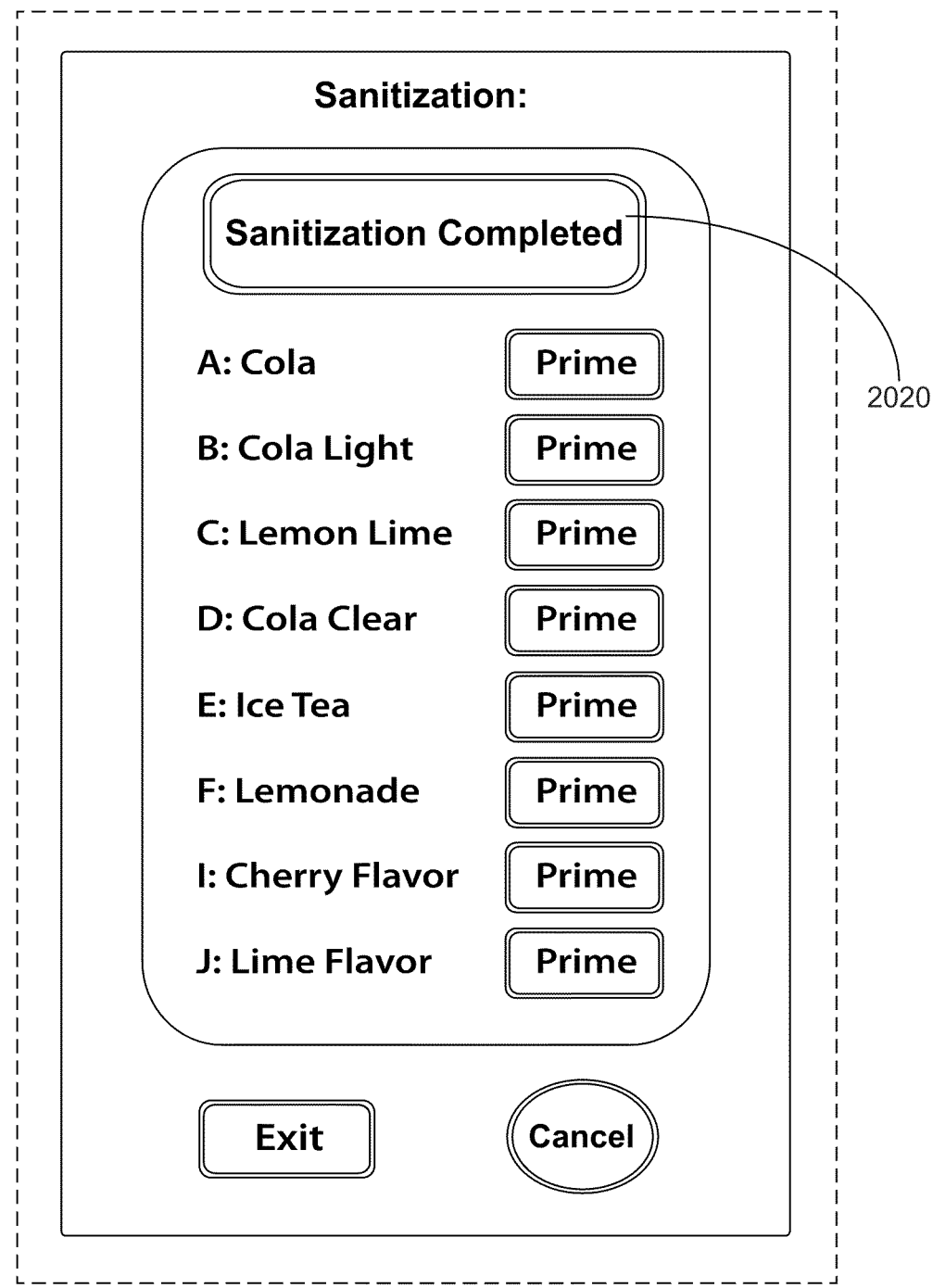

FIG. 20B shows a method 2010, which is shown in use in exemplary screenshots of FIGS. 20C-20E, according to embodiments of the invention. At operation 2012, a command is received at a control unit from the service menu 2000 to enter into a sanitizing mode via a user input to the sanitization button 2002. At operation 2014, the service menu 2000 is replaced with sanitization menu 2016, as depicted in FIG. 20C. In the sanitization menu 2016, various buttons are shown for performing a sanitizing method. A plurality of prime buttons 2018 are shown, each corresponding to a fluid line for a particular beverage. A sanitizing indicator 2020, exit button 2022, and cancel button 2024 are also included.

At operation 2026, the control unit receives a user input to sanitize at least one fluid line. This can occur from a user input for selection of one, or a plurality, of prime buttons 2018 on the sanitization menu 2016. As shown, the "iced tea" fluid line has been selected for sanitization. At operation 2028, the control unit operates beverage dispensing valves to cause sanitizing fluid to flow through the selected fluid line. The control unit can also operate the beverage dispensing valves to statically hold sanitizing fluid within the selected fluid line for a predetermined amount of time. During sanitization, an animated count-down of the sanitizing time interval can be displayed to the user, as shown in FIG. 20D by the sanitizing indicator 2020. Near the end of the sanitization cycle, the control unit purges the sanitizing fluid from the selected fluid line. After this occurs, the sanitizing indicator 2020 can display a completion message, as shown in FIG. 20E.

Figure 20F:
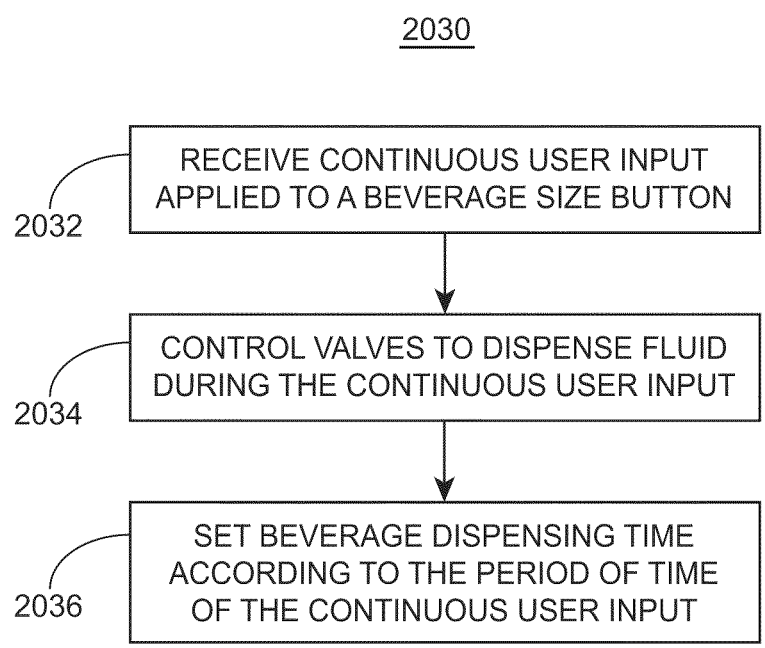
FIG. 20F illustrates a method of controlling a beverage dispensing machine for adjusting beverage dispense times, according to an embodiment of the invention.
Figure 20G:
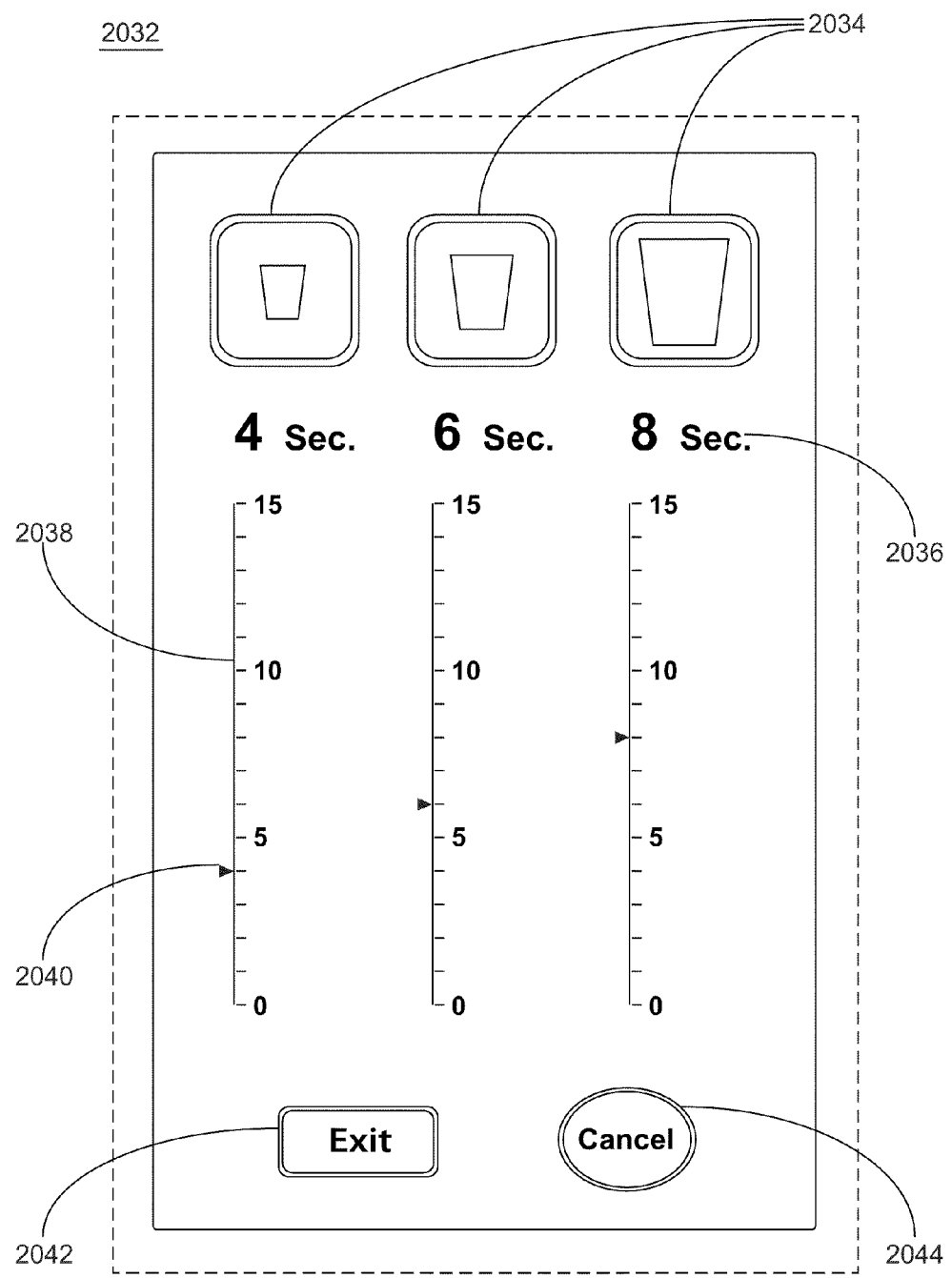
FIG. 20G illustrates a graphical embodiment of the method of FIG. 20F.

FIG. 20F shows a method 2030, which is shown in use in an exemplary screenshot of FIG. 20G, according to embodiments of the invention. Selection of the cup size button 2004 of service menu 2000 causes a graphical configuration of a cup sizing screen 2032 to appear on the touch screen, as shown in FIG. 20G. The cup sizing screen 2032 includes cup size buttons 2034, with each button representing a different size cup (e.g., small, medium, large, etc.). Under each cup size button 2034 is a time dispense indicator 2036 and a linear time scale 2038. An arrow indicator 2040 is moveable on the time scale 2038. The time dispense indicator 2036 and a linear time scale 2038 indicate to a user how long a beverage dispense time will last for a given cup size. As shown, a small cup is set to have 4 second dispense time, a medium cup is set to have a 6 second dispense time, and a large cup is set to have an 8 second dispense time.

At operation 2034, the control unit receives a continuous user input from the touch screen on one of the cup size buttons 2034. A continuous user input is defined as an uninterrupted user input to the touch screen, for example, a finger being held against a cup size button 2034 is considered continuous until the finger is removed from the cup size button 2034.

At operation 2034, the control unit controls beverage dispensing valves to dispense fluid during the continuous user input to the selected cup size button 2034. During the continuous user input, the time dispense indicator 2036 is animated to count seconds as long as the continuous user input is maintained. The linear time scale 2038 is also animated to move the arrow indicator 2040 as long as the continuous user input is maintained. During the continuous user input, the user can visually observe fluid being dispensed from the beverage dispensing system, typically into a cup or reference container corresponding to the selected cup size button 2034.

Interrupting the continuous user input (e.g., lifting the finger off of the cup size button 2034) causes the control unit to discontinue dispensing fluid and halt animation of the linear time scale 2038 and arrow indicator. The user can begin a second user input to add time to the first continuous user input. The time dispense indicator 2036 and the linear time scale 2038 will animate from the last shown time unit.

At operation 2036, the control unit sets a dispense time for the selected cup size(s) according to the time period of the continuous user input applied to the selected cup size button(s) 2034. This can occur from a user input being applied to the exit button 2042. This method is useful, since the user can rely on visual observation of a container being filled to set a corresponding dispense time for that size container. Accordingly, cup sizes changes (e.g., a size small cup changing from 240 ml to 190 ml) can be made on location by users having limited technical knowledge and without a specialized technician being present.

Figure 20H:
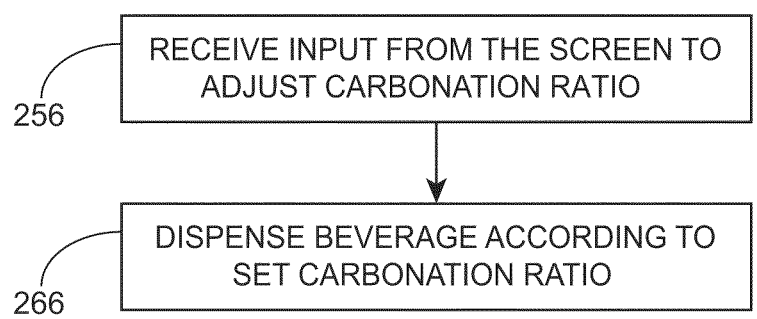
FIG. 20H illustrates a method of controlling a beverage dispensing machine for adjusting carbonation ratios, according to an embodiment of the invention.
Figure 20I:
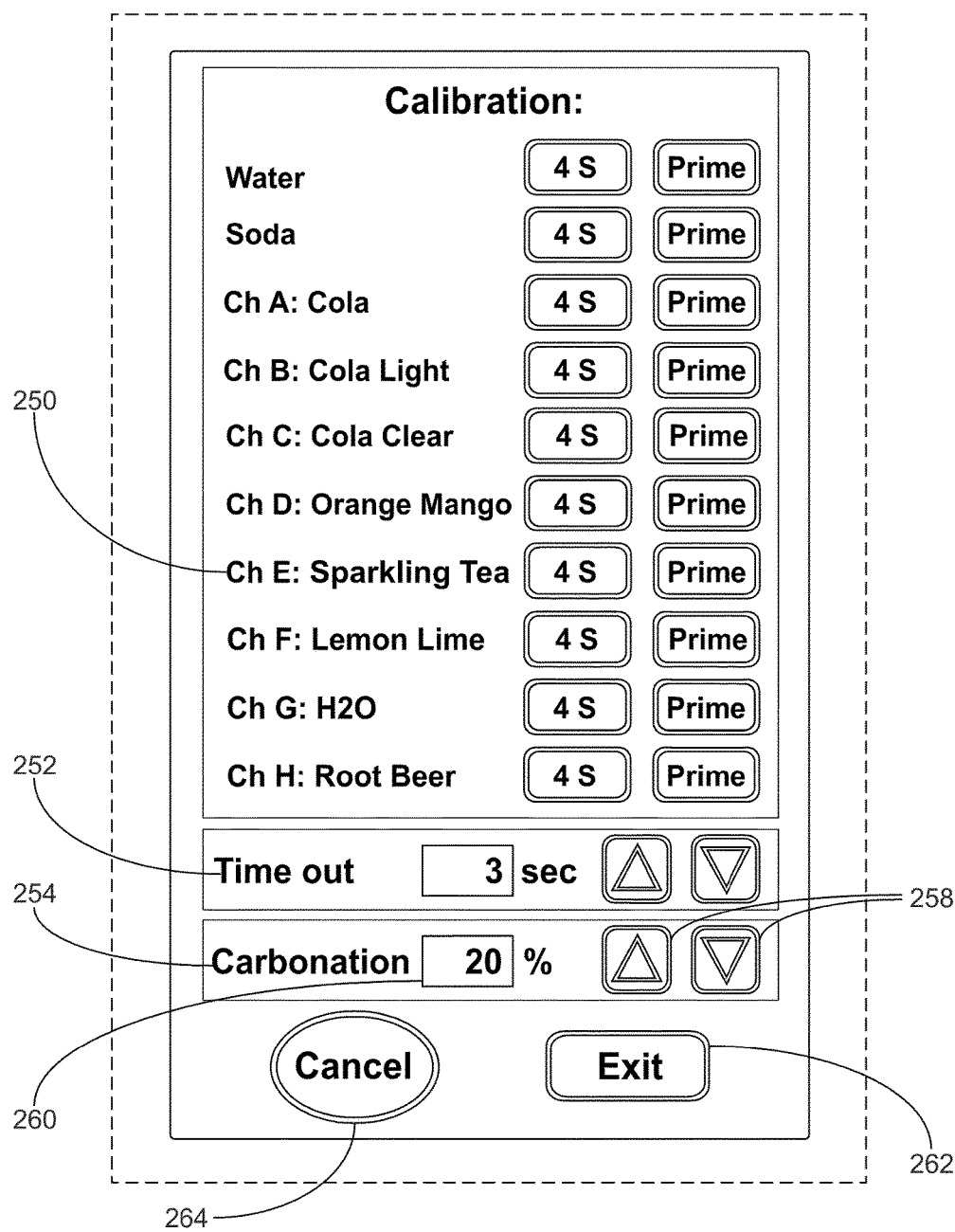
FIG. 20I illustrates a graphical embodiment of the method of FIG. 20H.

FIG. 20H shows a method 2046, which is shown in use in an exemplary screenshot of FIG. 20I, according to embodiments of the invention. Selection of the calibration menu button 2006 of service menu 2000 causes the control unit to generate a graphical configuration of a calibration screen 2048 on the touch screen, as shown in FIG. 20I.

The calibration screen 250 includes a valve calibration portion 250, which includes a 4 second and prime (continuous flow) buttons for each type of beverage. An time-out adjustment portion 252 is also shown, where the maximum dispense time allowed by the control unit is adjusted for non-size beverage dispensing controls (e.g., top off time). A carbonation adjustment portion 254 is also shown, where a carbonized water to non-carbonized water ratio can be set. Some beverages are constituted from less than 100% carbonized water. In some embodiments, three fluid lines are used to dispense such a beverage having less than 100% carbonized water. These lines can include a carbonized water line, a non-carbonized water line, and a flavor (e.g., syrup) line.

At operation 256, the control unit receives a user input from the touch screen to adjust the carbonation ratio, via the shown arrow indicators 258. The adjusted ratio can be displayed in portion 260. Exiting the calibration screen, via a user input to the exit button 262 causes the control unit to save the last displayed carbonation ratio value, which in this example is 20% or 5:1. This means that the user desires that the non-carbonized water line is configured to output five times more volume than the carbonized water line. The set carbonation ratio corresponds to one of the beverages displayed in portion 250 (e.g., "Ch E: Sparkling Tea"). However, it should be understood that several beverages may have adjustable carbonation ratios. A user input to the cancel button 264 causes the control unit to ignore any changes made using the calibration screen and maintain previously saved calibration settings.

At operation 266, the beverage corresponding to the set calibration ratio is made to dispense by the control unit. This operation can occur based on user inputs made to a beverage dispensing screen, for example, as shown in FIGS. 18D and 19B. Thus, in this example, the control unit operates beverage dispensing valves such that a flavor line is mixed with a fluid made up of 20% carbonated water and 80% non-carbonated water, via carbonated water and non-carbonated water lines. This occurs from the control unit adjusting (e.g., decreasing) flow-rate for the carbonated water line to be appropriately less than the flow-rate of the non-carbonated water line, and/or adjusting (e.g., increasing) the flow-rate of the non-carbonated water accordingly.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. None is admitted to be prior art.

What is claimed is:

1. A control system for a beverage dispenser, the control system comprising:
    a touch screen; and
    a control unit electrically coupled to the touch screen, the control unit configured to:
        send a first graphical configuration to the touch screen for display;

receive a first command from the touch screen;

send a second graphical configuration to the touch screen for display in response to the first command, wherein the second graphical configuration comprises a plurality of selectable beverage choices;

receive a second command from the touch screen with respect to the second graphical configuration, wherein the second command is derived from receiving a plurality of selections from hidden buttons on the second graphical configuration;

display a valve adjustment screen on the touch screen in response to the second command, the valve adjustment screen displaying a beverage dispense time for a corresponding cup size;

receive a third command from the touch screen with respect to the valve adjustment screen, the third command causing the beverage dispense time to change for the corresponding cup size; and alter dispense timing for at least one of a plurality of beverage dispensing valves in response to the third command.

2. The system of claim 1, wherein the control unit is further configured to receive a fourth command from the touch screen with respect to the valve adjustment screen wherein the fourth command is derived from receiving a user selection of one of a timed burst or prime button.

3. The system of claim 1, wherein the first graphical configuration is a sleep mode screen.

4. The system of claim 3, wherein the first command is derived from receiving a single user touch on the touch screen.

5. The system of claim 1, wherein the third command comprises a user touch to the touch screen, wherein the beverage dispense time is determined based on how long the user touches the touch screen during the third command.

6. The system of claim 5, wherein the valve adjustment screen comprises a time scale that is animated according to the third command.

7. The system of claim 6, wherein the time scale is animated while the user touches the touch screen during the third command and ceases to animate when the user stops touching the touch screen.

8. The method of claim 7, wherein the valve adjustment screen comprises a time scale that is animated according to the third command.

9. The method of claim 8, wherein the time scale is animated while the user touches the touch screen during the third command and ceases to animate when the user stops touching the touch screen.

10. A method comprising:

sending a first graphical configuration to a touch screen for display;

receiving a first command from the touch screen;

sending a second graphical configuration to the touch screen for display in response to the first command, wherein the second graphical configuration comprises a plurality of selectable beverage choices;

receiving a second command from the touch screen displaying the second graphical configuration, wherein the second command is derived from receiving a plurality of selections from hidden buttons on the second graphical configuration; and displaying a valve adjustment screen on the touch screen in response to the second command, the valve adjustment screen displaying a beverage dispense time for a corresponding cup size; and receiving a third command from the touch screen with respect to the valve adjustment screen, the third command causing the beverage dispense time to change for the corresponding cup size; and altering dispense timing for at least one of a plurality of beverage dispensing valves in response to the third command.

11. The method of claim 10, further comprising receiving a fourth command, wherein the third command is derived from receiving a user selection of one of a timed burst or prime button.

12. The method of claim 10, wherein the third command comprises a user touch to the touch screen, wherein the beverage dispense time is determined based on how long the user touches the touch screen during the third command.

13. The method of claim 10, wherein the first graphical configuration is a sleep mode screen.

14. The method of claim 13, wherein the first command is derived from receiving a single user touch on the touch screen.

* * * * *